United States Patent
Lert, Jr. et al.

(10) Patent No.: US 12,373,775 B2
(45) Date of Patent: Jul. 29, 2025

(54) HIGH DENSITY MICRO FULFILLMENT CENTER "HD-MFC" WITH NIGHTLY G2P STORAGE BATCH PICK REPLENISHMENT FROM STORE FLOOR AND METHOD OF OPERATING SAME

(71) Applicant: Symbotic LLC, Wilmington, MA (US)

(72) Inventors: John G. Lert, Jr., Wakefield, MA (US); William J. Fosnight, Windham, NH (US)

(73) Assignee: Symbotic LLC, Wilmington, MA (US)

( * ) Notice: Subject to any disclaimer, the term of this patent is extended or adjusted under 35 U.S.C. 154(b) by 238 days.

(21) Appl. No.: 17/927,851

(22) PCT Filed: May 27, 2021

(86) PCT No.: PCT/US2021/034584
§ 371 (c)(1),
(2) Date: Nov. 25, 2022

(87) PCT Pub. No.: WO2021/243059
PCT Pub. Date: Dec. 2, 2021

(65) Prior Publication Data
US 2023/0230031 A1    Jul. 20, 2023

Related U.S. Application Data

(60) Provisional application No. 63/030,662, filed on May 27, 2020, provisional application No. 63/060,994, filed on Aug. 4, 2020, provisional application No. 63/067,759, filed on Aug. 19, 2020.

(51) Int. Cl.
*G06Q 10/087*    (2023.01)

(52) U.S. Cl.
CPC ................................ *G06Q 10/087* (2013.01)

(58) Field of Classification Search
CPC .................................................... G06Q 10/087
See application file for complete search history.

(56) References Cited

U.S. PATENT DOCUMENTS

| 9,550,624 | B2 * | 1/2017 | Khodl | B25J 5/007 |
| 11,475,503 | B1 * | 10/2022 | Dogan | G06Q 30/0631 |
| 2007/0021863 | A1 | 1/2007 | Mountz et al. | |
| 2014/0100769 | A1 | 4/2014 | Wurman et al. | |
| 2014/0156423 | A1 | 6/2014 | Argue et al. | |
| 2015/0269520 | A1 | 9/2015 | Knapp et al. | |
| 2015/0269521 | A1 | 9/2015 | Knapp et al. | |
| 2016/0077846 | A1 | 3/2016 | Phillips et al. | |

(Continued)

OTHER PUBLICATIONS

Govindarajan, Aravind, Amitabh Sinha, and Joline Uichanco. "Joint inventory and fulfillment decisions for omnichannel retail networks." Naval Research Logistics (NRL) 68.6 (2021): 779-794. (Year: 2021).*

(Continued)

*Primary Examiner* — Nathan A Mitchell
(74) *Attorney, Agent, or Firm* — Perman & Green, LLP

(57) ABSTRACT

A micro-fulfillment center fulfills orders for goods including both in-store picking of goods and online ordering of goods. Orders are fulfilled using both a picker to goods (P2G) model and an automated goods to picker (G2P) model. In examples, goods are replenished to the automated G2P system from store shelves which also serve the P2G model.

18 Claims, 27 Drawing Sheets

(56) References Cited

U.S. PATENT DOCUMENTS

| | | |
|---|---|---|
| 2017/0043953 A1 | 2/2017 | Battles et al. |
| 2018/0134492 A1* | 5/2018 | Lert, Jr. ............. G06Q 30/0633 |
| 2018/0218322 A1 | 8/2018 | Bhargava et al. |
| 2018/0218469 A1* | 8/2018 | Lert, Jr. ............. G06Q 30/0633 |
| 2018/0247266 A1 | 8/2018 | Knapp et al. |
| 2018/0314999 A1 | 11/2018 | Nemati et al. |
| 2020/0065745 A1 | 2/2020 | Engel et al. |
| 2020/0103882 A1* | 4/2020 | Sullivan ........... G05B 19/41895 |
| 2020/0327768 A1* | 10/2020 | Rossano .................. B25J 19/06 |
| 2020/0372440 A1 | 11/2020 | Holmes et al. |
| 2021/0245956 A1* | 8/2021 | Douglas ............... B65G 1/1375 |
| 2021/0279987 A1* | 9/2021 | Koo ................... G06Q 30/0281 |
| 2024/0025647 A1* | 1/2024 | Paulson ............... B65G 1/1376 |

OTHER PUBLICATIONS

International Search Report and Written Opinion dated Sep. 21, 2021 in International Patent Application No. PCT/US2021/034584.

\* cited by examiner

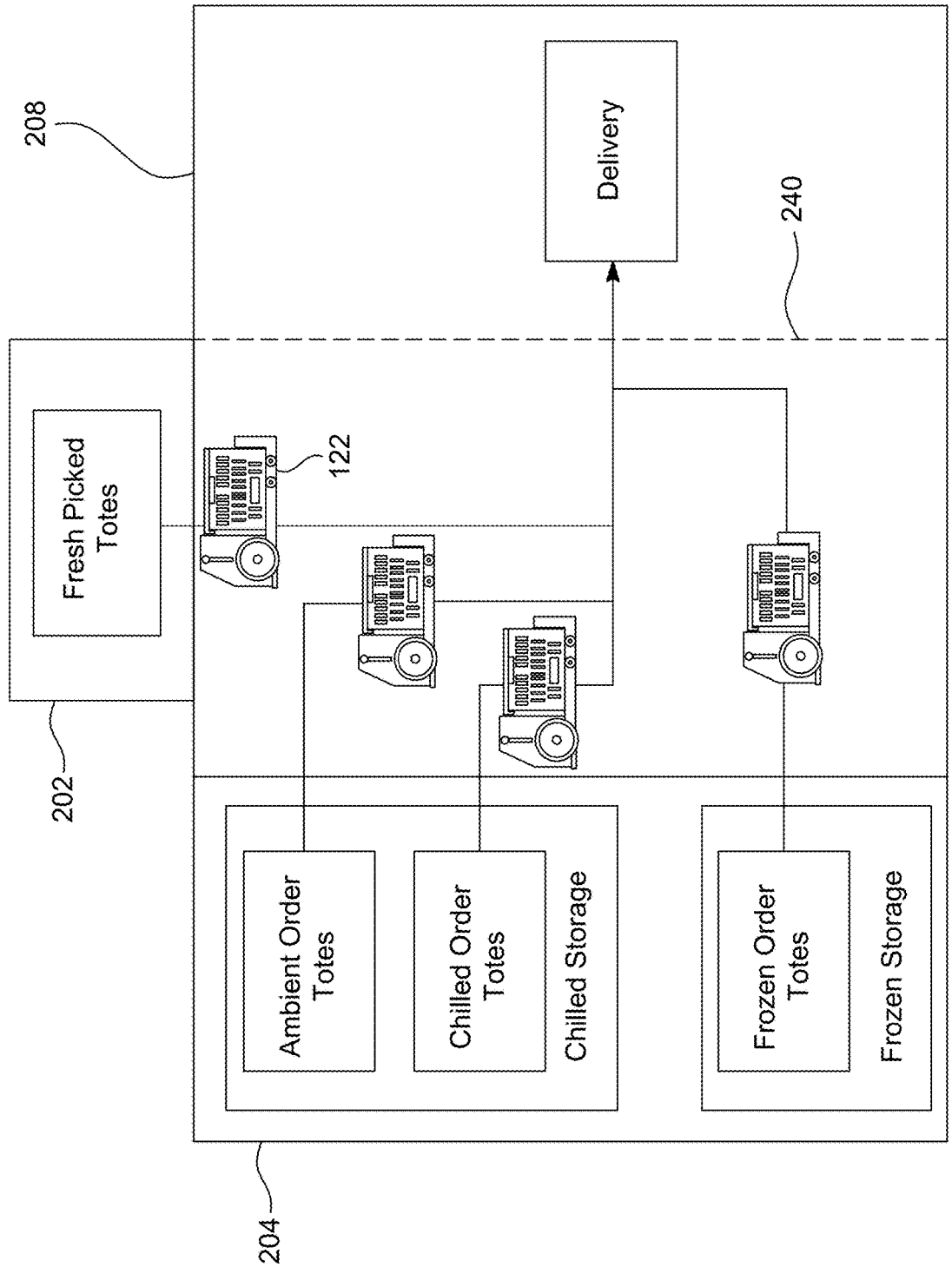

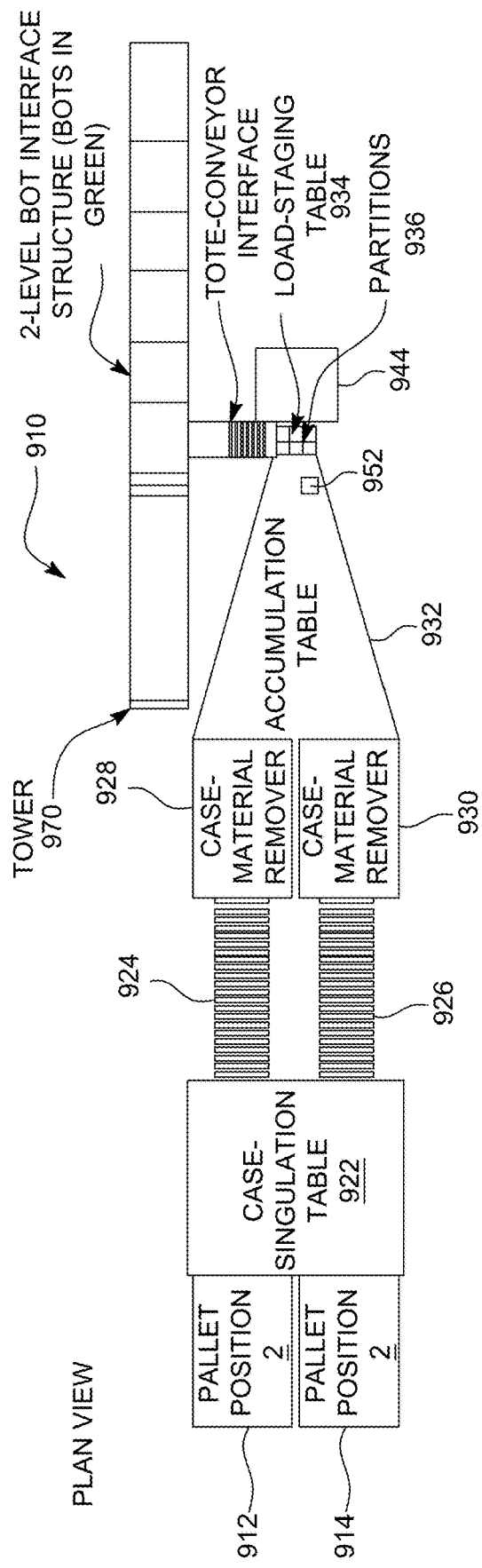
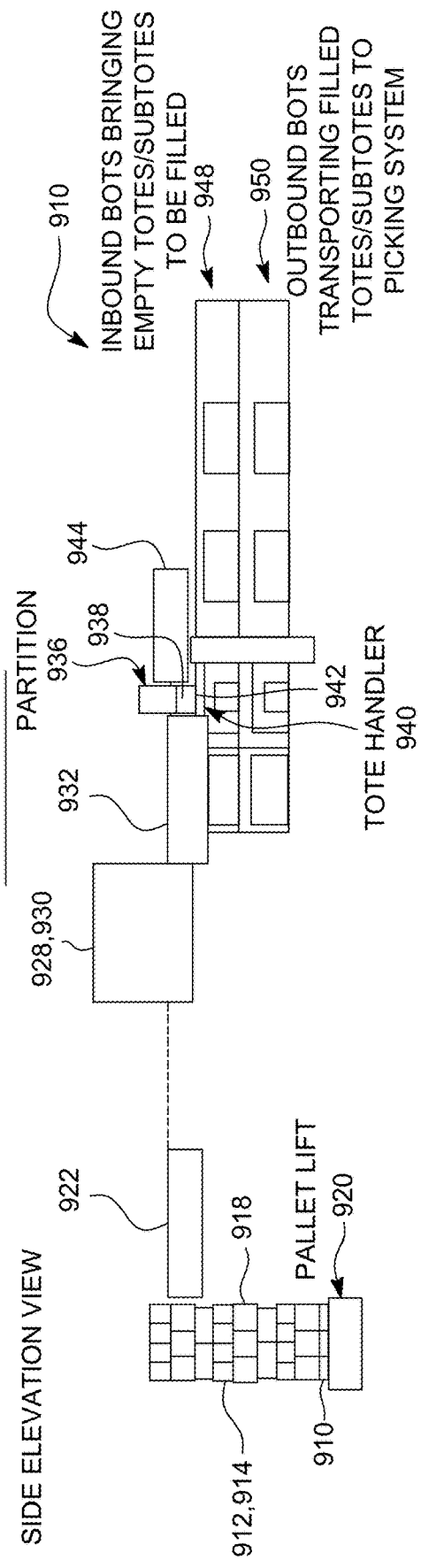
FIG. 14A
FIG. 14B

HIGH DENSITY MICRO FULFILLMENT CENTER "HD-MFC" WITH NIGHTLY G2P STORAGE BATCH PICK REPLENISHMENT FROM STORE FLOOR AND METHOD OF OPERATING SAME

PRIORITY CLAIM

The present application claims priority to U.S. Provisional Patent Application No. 63/067,759, filed on Aug. 19, 2020, entitled "High Density Micro Fulfillment Center "HD-MFC" With Nightly G2P Storage Batch Pick Replenishment from Store Floor and Method of Operating Same", which application is incorporated by reference herein in its entirety.

The present application claims priority to U.S. Provisional Patent Application No. 63/030,662, filed on May 27, 2020, entitled "Micro-Fulfillment Center and Method of Operating a Micro-Fulfillment Center", which application is incorporated by reference herein in its entirety.

The present application claims priority to U.S. Provisional Patent Application No. 63/060,994, filed on Aug. 4, 2020, entitled "Micro-Fulfillment Center with Nightly Replenishment and Order Fill of Transient Inventory and Method of Operating Same", which application is incorporated by reference herein in its entirety.

BACKGROUND

The most intractable problem facing supermarket operators today is finding a way to satisfy the growing market demand for online grocery service profitably. Their prices are based on the self-service retail model in which customers provide free labor to the retailer by picking their own orders, but the e-commerce model requires the retailer to pick the order and transfer it the customer. Further, they are constrained in raising prices to cover these additional costs by fierce competitive pressure in this highly price-driven trade category.

Fulfilling online orders from their existing self-service stores has many compelling advantages over building separate facilities for this purpose, but it also poses several challenging problems, the primary one being labor costs associated with picking and handling orders. Retailers universally use a route-picking version of picker-to-goods ("P2G") picking, and additional labor costs are incurred in storing, retrieving, and dispensing completed orders either to a customer picking up from the store or to a delivery driver. These labor costs are so high that it is virtually impossible today for retailers to realize profits from their online service with this model.

A second major problem with in-store picking is that self-service stores are fairly chaotic environments, making it very difficult for retailers to maintain accurate information about the on-hand inventory of all of the 40,000 or so products typically sold in each of their stores, so out-of-stocks are not uncommon. Self-service stores can operate successfully with relatively inaccurate inventory data, because a customer who discovers that a product is out of stock makes his/her own decision whether to buy a substitute product or to forego the purchase at that moment. However, with online ordering, that decision must be made by the retailer, and substitutions and out-of-stocks are known to be the greatest source of customer dissatisfaction with online grocery. The third key problem with in-store fulfillment is that the large multi-order carts clog up the aisles and degrade the experience for the customers who are picking their own orders (and are therefore contributing higher profit margins to the retailer than the online orders the pickers are picking). There is thus a significant risk of customers becoming so annoyed that they switch to shopping at a different retailer's store.

To overcome these challenges of in-store fulfillment, retailers are now experimenting with automation technology deployed inside or attached to their stores that performs a goods-to-picker ("G2P") order-picking process in which products to be picked are typically stored within the system in totes or other containers, and product totes containing ordered SKUs are conveyed through a picking workstations where stationary human (or robotic) pickers transfer the ordered eaches from the product totes into order containers. This technology solution addresses all three of the major problems associated with P2G picking described above. A stationary G2P picker can pick many more eaches per hour than the traveling P2G picker, so the labor costs of picking can be dramatically reduced. (Once robotic pickers are used for this task, labor cost will be reduced even further.) In addition, the automation system can store, retrieve, and dispense the completed orders, thereby reducing or eliminating labor costs associated with these additional handling tasks. Moreover, the information about on-hand inventory is much higher when the inventory is stored in an automated G2P system than when it is sitting on the shelf in the store, so substitutions and out-of-stocks are greatly reduced and customer satisfaction is thereby increased. Finally, picking in an automated G2P system removes the pickers from the store floor, thereby eliminating that source of annoyance to self-service customers.

However, retailers must solve two closely related problems associated with installing an automated G2P system in a store. The first is physical space, because a G2P system requires its own cache of inventory, separate from the self-service store, to be used as the picking stock in fulfilling online orders. Moreover, offering online customers the full range of products found in the store has been shown to be an important factor in getting them to adopt online grocery, so limiting the assortment available to online customers to include only what can fit into these small systems is a suboptimal solution competitively.

FIGURES

FIGS. 5 through 15 are materials incorporated into the present application from other applications.

DETAILED DESCRIPTION

Figure 1:
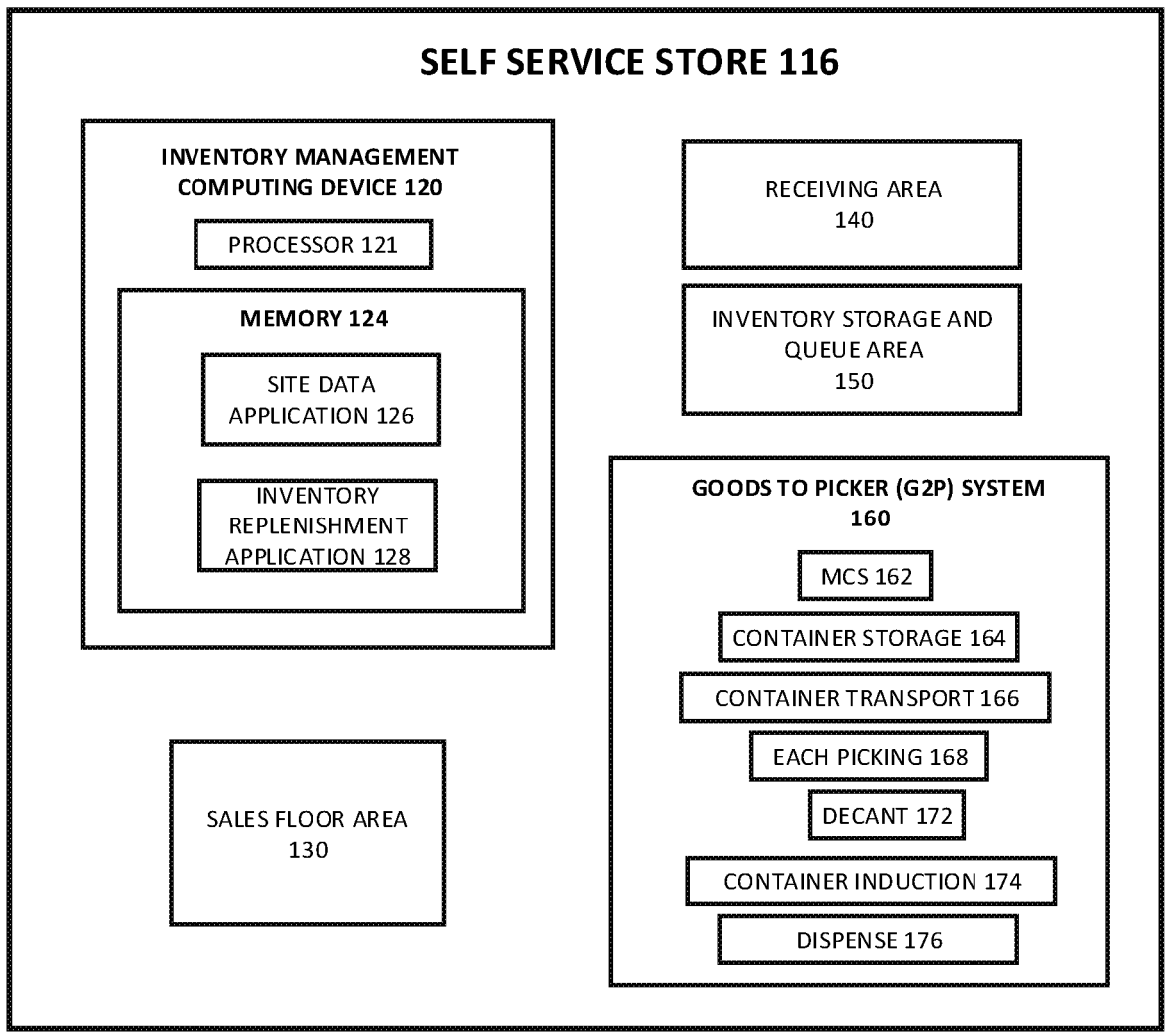
FIG. 1 is a block diagram of a store according to embodiments of the present technology.

Embodiments of the present technology will now be described with reference to the figures, which in general relate to a micro-fulfillment center and more specifically methods of operating replenishment of a micro-fulfillment center.

It is understood that the present embodiments may be embodied in many different forms and should not be construed as being limited to the embodiments set forth herein. Rather, these embodiments are provided so that this disclosure will be thorough and complete and will fully convey the invention to those skilled in the art. Indeed, the embodiments are intended to cover alternatives, modifications and equivalents of these embodiments, which are included within the scope and spirit of the invention as defined by the appended claims. Furthermore, in the following detailed description, specific details are set forth in order to provide an understanding of the present embodiments.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation. Also, as used herein, the terms "substantially" and/or "about" mean that the specified dimension or parameter may be varied within an acceptable manufacturing tolerance for a given application. In one non-limiting embodiment, the acceptable manufacturing tolerance is ±2.5%.

The store formats, operating systems and methods disclosed may be used in conjunction with robotic picking system(s) and robotics, for example, as disclosed in U.S. Patent Publication Number US2017/0313514 A1 having publication date Nov. 2, 2017 and entitled "Order Fulfillment System" which is incorporated by reference herein in its entirety. Similarly, the store formats, operating systems and methods disclosed may be used in conjunction with a robotic picking system(s) and robotics that are deployed in conjunction with retail store formats, for example, as disclosed in U.S. Patent Publication Number US2018/0134492 A1 having publication date May 17, 2018 and entitled "Automated-Service Retail System and Method" which is incorporated by reference herein in its entirety. Further, the store formats, operating systems and methods disclosed herein may be used in conjunction with different elements of full or partially automated supply chain systems, for example, as disclosed in the following: U.S. Patent Publication Number US2018/0150793 A1 having publication date May 31, 2018 and entitled "Automated Retail Supply Chain and Inventory Management System"; U.S. Patent Publication Number US2018/0194556 A1 having publication date Jul. 12, 2018 and entitled "Interchangeable Automated Mobile Robots with a Plurality of Operating Modes Configuring a Plurality of Different Robot Task capabilities"; U.S. Patent Publication Number US2018/0247257 A1 having publication date Aug. 30, 2018 and entitled "Inventory Management System and Method" and U.S. Patent Publication Number US2018/0341908 A1 having publication date Nov. 29, 2018 and entitled "Fully Automated Self Service Store", all of which are incorporated by reference herein in their entirety.

The store formats, operating systems and methods disclosed may be utilized in the foregoing examples and further by way of non-limiting example in applications such as summarized in FIG. 1, where FIG. 1 is a block diagram illustrating an example inventory replenishment management system 110 in a self-service store 116 in which some example embodiments of this disclosure may be implemented. The example inventory replenishment management system 110 may be implemented in a self-service store 116 and include an inventory management computing device 120, a sales floor area 130, a receiving area 140, an inventory storage and queue area 150 and a goods to picker (G2P) system 160, database, and network (not shown). Self-service retail store 116 is configured to fulfill retail orders in a "self-serve" model where customers select goods from sales floor area 130, pay for the goods and thereby fulfill their respective order in a "self-serve" model. Self-service retail store 116 is further configured to fulfill retail orders in an "e-commerce" model where customers select goods from a software application that may be computer, cellular or other device based which allows the customer to select goods in the order from the application to be fulfilled by self-service retail store 116 from inventory selected from within the G2P system 160 either alone or in combination with inventory selected from sales floor area 130. Instead of goods being picked and compiled into an order (from off of the sales floor) by the customer, goods that make up orders in an "e-commerce" model are typically picked and compiled onto an order by associates (or proxy or automation) from sales floor area 130 or G2P system 160 and delivered to the customer where the customer picks up or takes delivery of the order after it has been compiled.

G2P system, or area, 160 has material control system (MCS) 162, container storage 164, container transport 166, each picking module 168, decant module 172, container induction module 174 and dispense module 176. In one example, the G2P system 160 may be an order-fulfillment system for automated fulfillment of orders, for example received via an e-commerce model. The embodiments of the G2P system may for example include a multi-level rack structure that holds picking stock. The G2P system further includes workstations at which human or robotic pickers receive cases or containers of eaches for transport of the eaches into order containers. Mobile vehicles or robots are further provided, which are autonomous vehicles that perform various transfer and transport functions in the G2P system, including handling the movement of containers of goods between storage locations within the rack structure and the workstations. The G2P system may further include a centralized control system, comprising computers, software, and communications components, which manages the operation of the entire system. The G2P system may also include one or more input/output interfaces where cases or individual goods are inducted into the system to replenish the picking stock and completed orders are discharged from the system to be delivered eventually to customers. Containers used to transport goods in the G2P may be referred to herein as totes. Such totes may include subtotes, which are smaller totes, dividers or compartments within the totes for separating goods of different SKUs within a tote. It is understood that the G2P system may include a variety of other components, in addition to or instead of those described above.

The inventory management computing device 120 may be a local server or a computer terminal located in the retail store 116. The inventory management computing device 120 may be the centralized control system, or it may work in conjunction with the centralized control system. The inventory management computing device 120 may include a processor 121 and a memory 124.

The example inventory replenishment management system 110 may maintain a database storing product information for each of the products in the whole inventory of the retail self-service store 116. The product information may include a product name, a product code, a location code (e.g., zone, aisle, shelf, bin, etc.), a frozen status or chilled status, a quantity of the product displayed on a sales floor, a category, a department, a priority to be dispensed, a quantity of the product to be dispensed, a time to be dispensed, a scheduled pickup time, stock status, and a product supplier. The product code of each of the products can be a Universal Product Code (UPC) code, a Quick Response (QR) code or other standard codes associated with the product information saved in the database having site data application 126 stored in the memory 124. Products are delivered to the retail self-service store 116 and unloaded at a receiving area where products may be received packaged on pallets in cases. Each of the pallets may have common cases packaged thereon or alternately may have mixed cases packaged thereon. Data associated with the products received can be scanned and read where once the product is scanned as received by the retail self-service store 116 in the database, various information regarding the product may be retrieved from the database. For example, a location code of a product may be where the product is displayed in the sales floor 130, such as zone, aisle, shelf, bin, etc. Similarly, a location code of a product may also be where the product is stored in the G2P system 160 etc. The stock status of a product may be indicated as "out of stock", "low stock", or "regular stock". The frozen or chilled products may have a higher unloading priority to be dispensed to the sales floor 130 or G2P system 160. The product information may further include product specifications, such as dimensions, weight, shape, color, etc. The database may store other product information, such as scheduled pickup times, pending customer orders, historical sales data, current and seasonal velocity or other attributes associated with each product sold in or fulfilled from the retail self-service store 116.

The inventory replenishment application 128 may be software modules or applications stored in the memory 124 and executed by the processor 121 of the inventory management computing device 120. The inventory replenishment application 128 may be configured to rank and order products received in receiving area and staged in inventory storage and queue area 150 to determine a priority, a time, and a quantity of each product to be dispensed to the sales floor 130 or G2P system 160 of the self-service retail store 116 as will be described in greater detail below. Further, The inventory replenishment application 128 may be configured to rank and order products already dispensed to the sales floor 130 to determine a priority, a time, and a quantity of each product to be dispensed again to replenish the G2P system 160 of the self-service retail store 116 as will be described in greater detail below. Inventory replenishment application 128 may be configured to analyze historical sales data of products sold to obtain sales patterns of the products. Further, the inventory replenishment application 128 may determine which products are needed for replenishment along with a quantity and a time for product replenishment. A sales pattern of a given product may include a sales amount, a velocity or sales rate, other sales information, or combinations of two or more of such sales information. The sales pattern of a product may be associated to timing information, such as a time of day, a time of week, a time of month, and a time of year. For example, some products might have higher sales amounts over weekends as compared to weekdays. Holidays may affect the sales patterns of certain products. The inventory replenishment application 128 may be configured to rank the products to determine a priority, a time, a quantity of each product to be dispensed to the sales floor 130 or G2P system of the self-service retail store 116 or other locations, based on sales patterns and the product information of each of the products. The inventory replenishment module 128 may determine the order of products to be moved based on the sales pattern and current stock status of the products to be ordered. Alternately, the inventory replenishment application 128 may be configured further as will be described or otherwise.

Figure 2A:
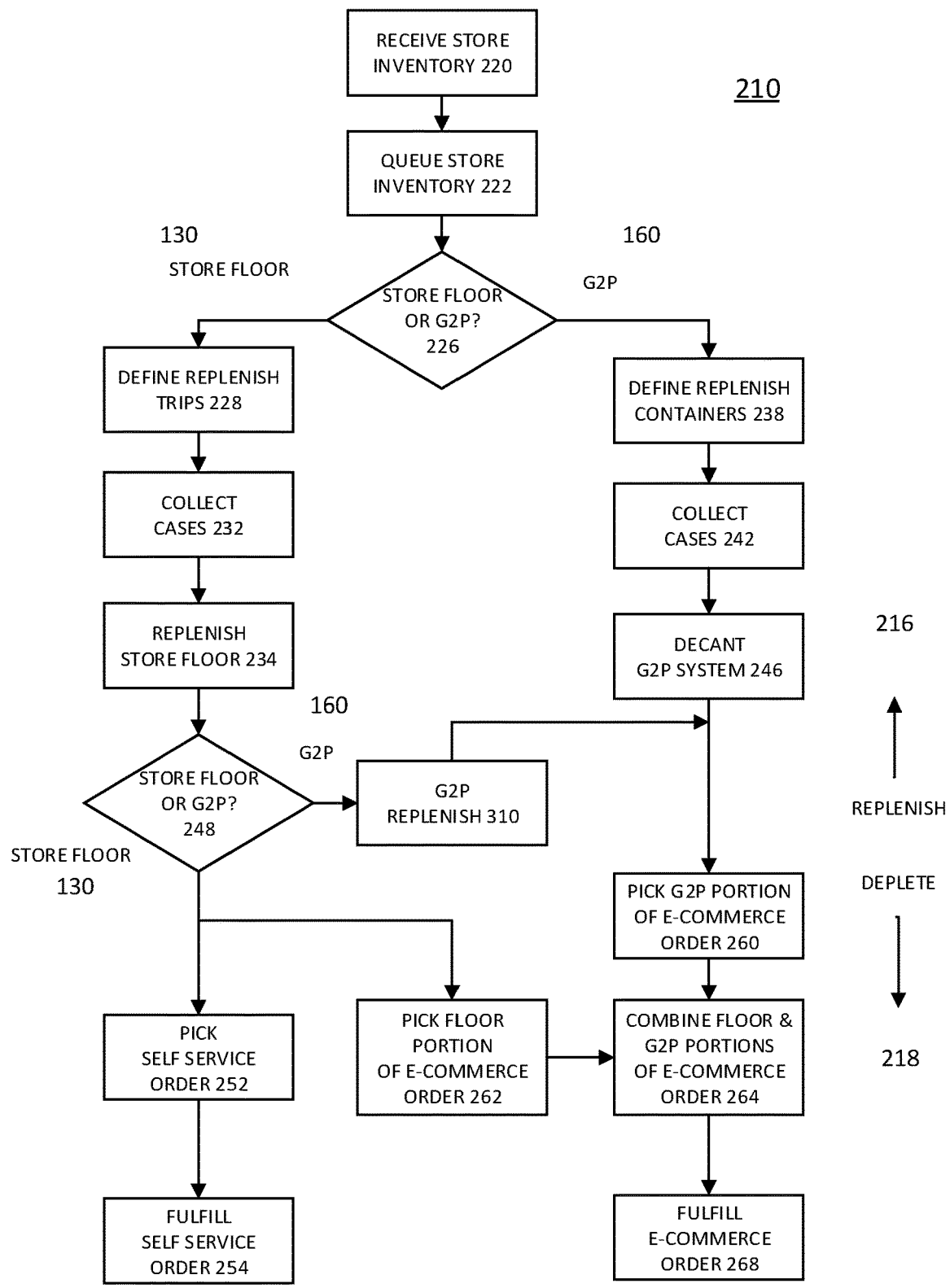
FIGS. 2A-2C are flowcharts showing store-wide replenishment and depletion of inventory according to embodiments of the present technology.

Referring now to FIG. 2A, there is shown flow diagram 210 illustrating an example inventory replenishment management system 110 in a self-service store 116 in which some example embodiments of this disclosure may be implemented. The upper portion 216 represents store inventory replenishment whereas the lower portion 218 represents store inventory depletion. In practice, inventory replenishment and depletion may happen sequentially or more typically in parallel over time. Alternately, inventory replenishment and depletion may happen both sequentially and in parallel over time.

Store replenishment inventory may be received 220 at receiving area 140 and queued 222 at inventory storage and queue area 150. Inventory replenishment application 128 diverts 226 the inventory, primarily in case form, to either the store floor 130 or the G2P system 160. Inventory diverted to the store floor 130 makes up the sum of: 1) inventory needed to fulfill self-service orders, 2) inventory needed to replenish the G2P system that has been diverted to the floor and 3) inventory needed to make up the floor picked portion of e-commerce orders fulfilled by the store. The inventory needed to replenish the G2P system that has been diverted 226 to the sales floor 130 is typically made up of lower velocity (lower sales rate; ex: units or SKU's/day) inventory needed for e-commerce orders. In contrast, the inventory needed to replenish the G2P system that has been diverted 226 to the G2P system 160 is typically made up of higher velocity (higher sales rate; ex: units or SKU's/day) inventory needed for e-commerce orders. The replenishment inventory diverted 226 to the sales floor 130 and the replenishment inventory diverted 226 to the G2P system 160 may be mutually exclusive; i.e. different SKU's are diverted 226 to the sales floor 130 than those diverted 226 to the G2P system 160, for example, where the velocity of the SKU's diverted 226 to the sales floor 130 are low and sufficient to meet both the demand of both self-service orders and e-commerce orders. Similarly, the replenishment inventory diverted 226 to the sales floor 130 and the replenishment inventory diverted 226 to the G2P system 160 may be common; i.e. where cases of the same SKU's are diverted 226 to both the sales floor 130 and to the G2P system 160, for example, where the velocity of the SKU's diverted 226 to both the sales floor 130 and to the G2P system 160 are high such that stocking both locations with higher quantities is warranted based on the demand the self-service orders and e-commerce orders individually.

Inventory diverted 226 to the store floor 130 is replenished by defining replenishment trips 228, collecting cases of inventory 232 based on those trips and stocking shelves 234 on the store floor to replenish the store floor. Inventory diverted 226 to the G2P system 160 is replenished by defining the replenishment containers or totes 238 that will contain the inventory, collecting cases of inventory 232 based on those containers or totes 238 that will be filled with the inventory and decanting 246 the inventory into the G2P system by stripping the cases of external packaging, loading the inventory contents into the totes through a decant process at decant portion 172 and inducting 174 the totes into the container storage structure 164 of G2P system 160. To complete replenishment of the G2P system, the inventory needed to replenish the G2P system that has been diverted 226 to the sales floor 130 needs to further be diverted 248 back to the G2P system to complete P2G replenishment 310 as will be described with respect to FIG. 3.

Fulfillment of orders occurs in two models, self-service and e-commerce models. In the "self-serve" model, customers select or pick 252 goods making up an order from sales floor area 130, pay for the goods and thereby fulfill 254 their respective order in a "self-serve" model. In the "e-commerce" model, customers select goods from a software application that may be computer, cellular or other device based which allows the customer to select goods in the order from the application to be fulfilled by self-service retail store 116 from inventory picked 260 from within the G2P system 160 either alone or in combination with inventory picked 262 from sales floor area 130. Instead of goods being picked and compiled into an order (from off of the sales floor) by the customer, goods that make up orders in an "e-commerce" model are typically picked and combined 264 onto an order by associates (or proxy or automation) from sales floor area 130 or G2P system 160 and delivered to the customer where the customer picks up or takes delivery of the order to fulfill 268 the e-commerce order after it has been compiled.

Almost all packaged-goods SKUs in a supermarket are replenished by cases, i.e. the original containers into which eaches are packed at the supplier's factory for shipment to the retailer's distribution center. In order to minimize the number of replenishment transactions per day per store, and thus the labor cost of replenishing, the quantity of eaches in each case represents for the vast majority of SKUs a number of weeks of supply. While this relative overstocking saves replenishment-labor costs, it does require sufficient shelf space to store a full case quantity plus a safety buffer. The lowest-cost method of replenishing the G2P picking system is to leverage this existing infrastructure and also replenish by cases, but this will require an essentially equivalent volume of eaches in totes within the G2P storage structure as we see on the shelves of the center store.

In order to maximize the number of SKUs that can be stored within a given number of totes, the interior volume of individual totes can be subdivided into separate compartments through the use of either partitioning panels ("dividers") or interior containers ("subtotes") to create multi-SKU totes in which each SKU is contained in a separate compartment. The smaller the average compartment size, the greater will be the "SKU density", measured as the average number of SKUs per product tote (total number of SKUs divided by total number of product totes in storage).

Replenishing by case across a typical store's packaged-goods assortment results in a SKU density of about two (2) SKUs per tote, i.e. the eaches in an average-size case fit into a compartment that is one-half of the tote's total volume. Cases of higher-velocity SKUs typically contain more product than lower-velocity SKUs, so the density for those SKUs is less than the average, while the density for lower-velocity SKUs is higher than that average. By way of example, this average density would mean that the 37,000 SKUs in an example would require roughly 18,500 product totes, and few stores would be able to accommodate a system that large.

The first step in solving the problem is in the selection of SKUs that will be picked manually (P2G) in the store to fill customer orders. Based on the discussion of the SKU-velocity strategy presented above, one strategy for doing this is an "all-or-nothing" approach whereby the store is divided into zones, and all customer order-lines for the SKUs in each zone are either all picked P2G or all are picked by G2P, because this preserves the pick density for all pick-to-cart routes and ensures the assumed savings from picking by automation will be fully realized. There are two portions of the conventional supermarket that are clearly the best candidates for all-manual picking: the "fresh market" that may be along the perimeter of the store, and the freezer aisles that may be within the center store.

The fresh market includes products such as produce, meats, seafood, flowers, etc. In a store that has an assortment of 40,000 SKUs, these fresh goods might represent only 3,000 SKUs but typically account for 20%-25% of eaches ordered online. Picking these products manually from the store floor actually has three features over picking in the G2P system. The first derives from the fact that, unlike packaged goods, eaches of the same product differ significantly one from another. For example, one steak is not identical to another in marbling, and produce items can differ in ripeness and blemishes. To maintain customer satisfaction with fresh goods, then, pickers may exercise judgement in selecting individual eaches of high quality, and it is cost-effective for this time-consuming selection process to be done on the store floor than at a G2P picking station where the additional operator time would be limiting machine throughput. Further, many of these products are "catchweight" items requiring the selected quantity to be weighed in order to be priced. Once again, performing this process at a G2P workstation would slow down system throughput and therefore would be more costly than weighing on the floor. Finally, the high perishability of these products and the potential for contamination to other products make it a candidate to keep these products out of the G2P system and on the store floor easily accessible and visible to store associates. Here, the location of the fresh market along the perimeter of the store means that travel distances are much shorter for the order-pickers than within the labyrinthine center-store aisles filled with packaged goods, and pick density will be far higher given the high velocity of these SKUs, so allocated travel cost per order-line/each pick will be lower in the fresh market than other zones.

The second-most logical zone in which to perform all-manual P2G picking is the freezer aisle(s) within the center store. In a typical US supermarket, frozen SKUs account for about 10% of all packaged-goods SKUs and 12%-15% of packaged-goods eaches sold. Like the fresh market, the freezer aisle has a relatively high P2G pick density spread over a limited travel distance, so the cost per order-line/each will be lower in this zone than in any other section of the center store. Moreover, frozen SKUs tend to be larger than non-frozen SKUs, which reduces SKU density in the G2P system, and the extra space required for the refrigeration equipment and air circulation can further reduce the total volumetric space available for product storage in the system.

All of the non-frozen packaged goods ("NFPG"), which comprise roughly 33,000 of the total 40,000 SKUs in an example store, are distributed throughout the rest of the center store. It is possible to determine the potential labor savings to be realized in each aisle and use that metric to determine which set of aisles to dedicate to G2P vs. P2G picking, but it is still difficult to fit enough product within a small system to achieve sufficient labor savings to justify the investment. However, there is another approach to integrating a small, automated G2P each—picking system into a self-service store that makes it possible to pick all order-lines for NFPG SKUs within the G2P system. We can call this the "SKU-Density" strategy. Although features of the disclosed embodiments may be applied to picking a subset of eaches required to fulfill a given e-commerce order in the G2P system, the disclosed may alternately be applied to pick full or complete orders from the G2P system or any combination of eaches from the G2P system.

This system and method abandons replenishing the G2P system by the case except for a small subset of highest-velocity SKUs, with the remaining vast majority of SKUs being replenished by individual eaches. By way of example, instead of selecting a subset of NFPG SKUs to store in the system, the disclosed method largely abandons case-replenishment of the G2P system in favor of replenishing by eaches, i.e. the replenishment quantity for the vast majority of SKUs in the G2P system is less than the case quantity. Only a small subset of the high-velocity SKUs would be diverted 226 to the G2P system 160 to be replenished by case, for example only those SKUs that sell more than one-half case per day to online customers- and all of the remaining SKUs would be replenished by eaches (from G2P replenishment 310 from store floor 130). The reduction in the replenishment quantity makes it possible to store SKUs in smaller compartments within multi-SKU totes, so SKU density is greatly increased, and the same number of totes can hold many more SKUs. Going back to the example store with 33,000 NFPG SKUs, only the 1,000 highest velocity SKUs might be replenished by cases and loaded into full totes as well as into half-tote and third-tote compartments, achieving an average density of roughly 1 SKU per tote and thus requiring roughly 1,000 totes in the G2P system. The other 32,000 SKUs would be replenished by eaches using one-quarter-tote and one-sixth-tote compartments, for an average density of five (5) SKUs per tote. These 32,000 SKUs, then, would require only an additional 6,400 totes in the G2P system. The combined total of 7,400 product totes required to hold the entire 33,000-SKU NFPG assortment with this "SKU-density" strategy is thus only about 2,400 more tote positions than would be required for the 5,000 highest-velocity SKUs under the SKU-velocity strategy at a 1-SKU-per-tote SKU density. This is a small enough volume of additional storage capacity to still fit into most stores.

This approach may be counterintuitive as replenishing by eaches is inherently more labor intensive than by cases and replenishing the G2P system by eaches from distribution centers designed to ship cases would be impractical and expensive. Fortunately, there is another very practical source of eaches readily at hand that can be picked to replenish the system, i.e. the shelves of the store. The key innovation in this method of integrating G2P automation into stores is manually picking eaches from the store shelves to replenish the G2P instead of to fill customer orders at much higher labor efficiency. Over a long time span, the same number of eaches will be picked for these replenishment orders as would have been picked for the customer orders for the same SKUs, but the method and timing and resulting efficiency of the picking are dramatically different.

Figure 2B:
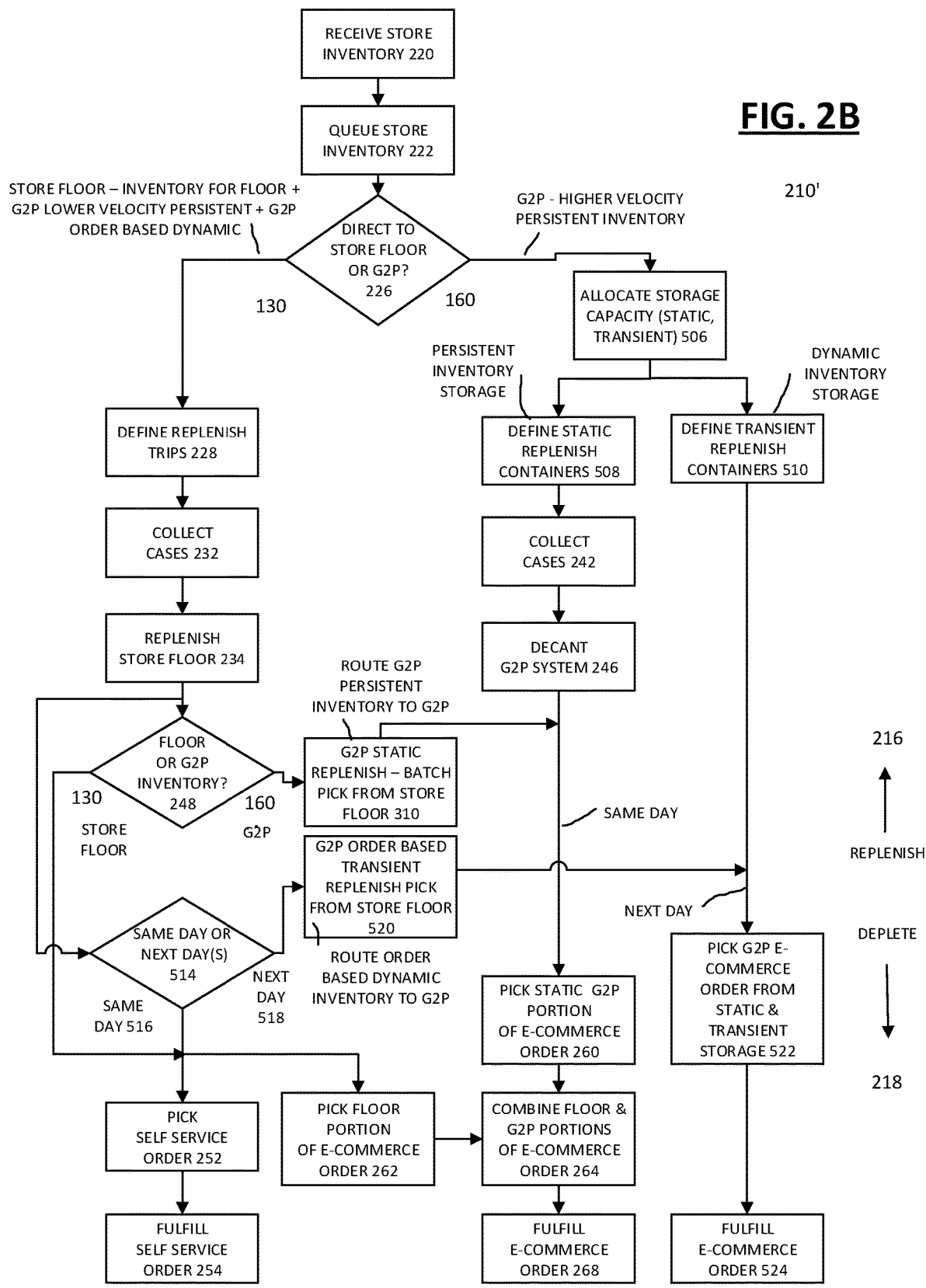
Figure 2C:
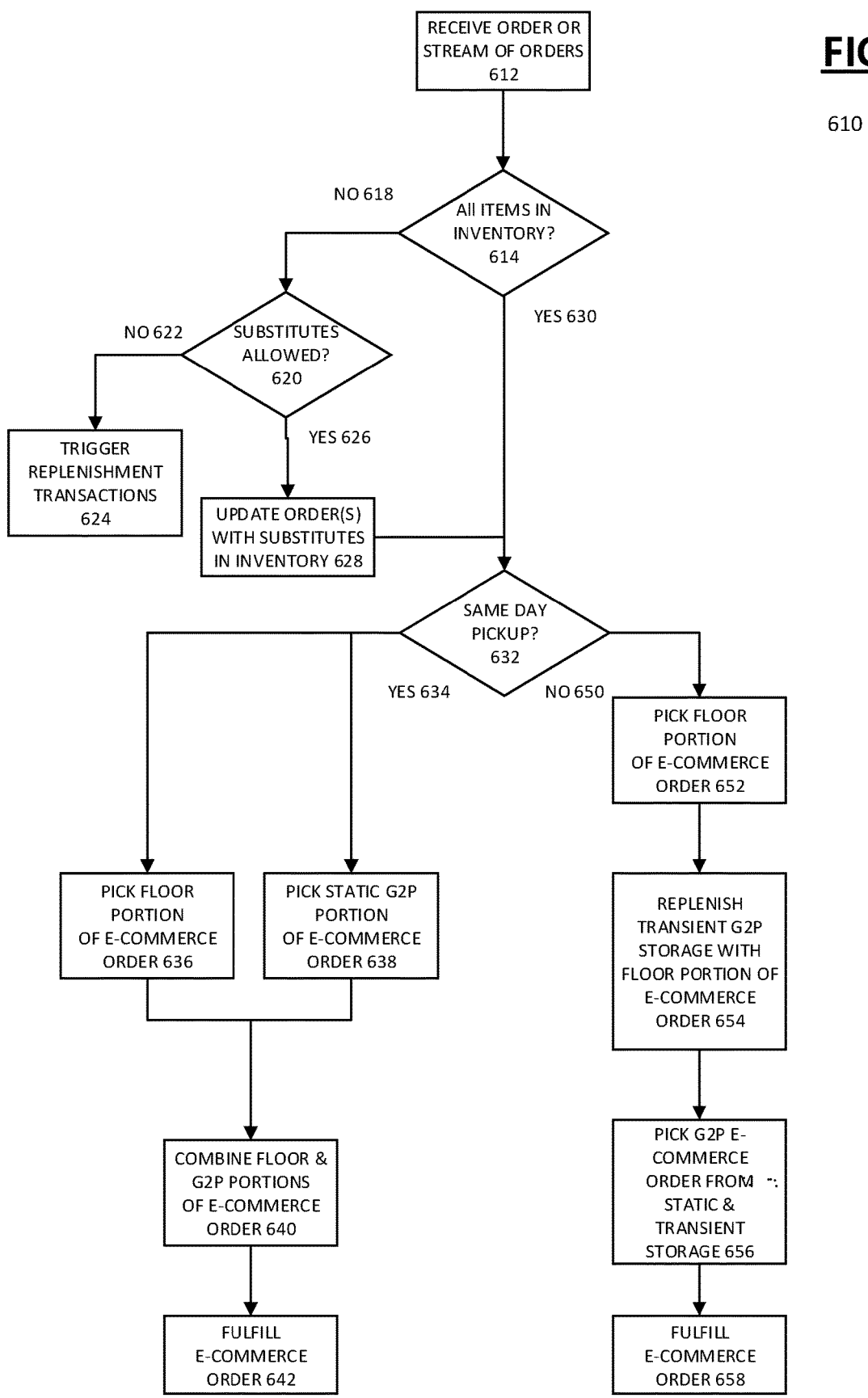

Referring now to FIGS. 2B and 2C, there are shown flow diagrams illustrating an example inventory replenishment management system in a self-service store in which some example embodiments of this disclosure may be implemented. In the high-density Micro Fulfillment Center (MFC) model, the nightly batch-picking to replenish the MFC's inventory makes possible the concept of "virtual inventory". In addition to allocation of storage capacity to hold "fixed" or "static" inventory that is used to fulfill future (anticipated) orders, a portion of storage capacity is also allocated to hold "transient" or "dynamic" inventory to fulfill specific known orders after a short time frame, e.g. non-same day orders. In the G2P system: static storage corresponds to persistent inventory (inventory with higher velocity that gets replenished by the case in a normal decant cycle and/or inventory with lower velocity that gets replenished at a subcase level from the store floor in a normal batch pick replenishment cycle), whereas transient storage corresponds to dynamic inventory (inventory that gets determined by non-same day orders which is put in the G2P system to satisfy only the given order(s), for example at night or on off peak hours). In accordance with the present technology, the store fulfills same day orders by combining picks from (a) the G2P static storage and (b) directly from the floor, whereas the store fulfills non-same day orders by taking what would have been (b) picked from the floor (as if it were a same day order) and inducting (b) into the transient storage of the G2P system, for example overnight, and then the next day (or whenever it needs to be fulfilled) picking the entire order (a)+(b) from the G2P system.

The specific composition of allocated storage capacity in the G2P system, in terms of number of totes, and number and sizes of sub-totes, would be determined algorithmically and can change from day to day. The product assortment that the retailer offers to customers for same-day pickup or delivery will only include the SKUs with static inventory in the MFC, plus SKUs that are picked to order from the store floor and combined. However, the product assortment offered to customers for pickup or delivery the next day or later may include all of the totable products in the store and in the static inventory storage of the G2P system where the combination can be picked entirely from the G2P system as will be described. Each night, store associates perform a batch-picking process to replenish most of the SKUs in the static inventory with eaches picked from the store floor. (A number of the highest-velocity SKUs are replenished by case rather than by this batch-pick process). Each SKU in this assortment has persistent inventory, though the size of subtote and replenishment quantity can change with every replenishment transaction. In general, the system will seek to replenish the maximum number of eaches that will fit into the specified size of subtote for each SKU in order to minimize replenishment transactions. SKUs that are included in the assortment with dynamic inventory, and therefore do not have persistent inventory, are replenished only as needed to fill known orders placed for later pickup or delivery, e.g. the next-day, so that they can be batch-picked in the same sweep through the store that collects eaches to replenish static inventory. A hybrid approach is also possible whereby static inventory is held for a given SKU, but only the number of eaches expected to be ordered for same-day pickup/delivery, and all overnight orders are replenished into dynamic inventory for immediate fulfillment. "Batch picking" in this context is contrasted with "picking to order". As will be described in greater detail below with respect to FIGS. 2B and 2C, batch picking may be utilized where all eaches may be picked to fulfill a given set of orders where the eaches may be picked in product sequence and aggregated/put in a common container or tote having subtotes (ex: a single sku/subtote but having multiple eaches per subtote to fulfill a set of orders) where these batch picked totes are then inducted as inventory into the G2P system and subject to a "secondary sort" within the G2P system where a "pick to order" sequence then occurs to pick specific orders where specific orders are picked from inventory within the G2P system and placed into order totes. Further, in this context, static or persistent storage and inventory may refer to inventory stored awaiting future unknown orders and replenished when running low, for example by case in the G2P system for high velocity sku's (160—see FIG. 2B) and by subcase from the floor to the G2P system for low velocity sku's as described in FIG. 2A (also 520—see FIG. 2B). The common element for static or persistent storage and inventory is that it is provided and awaiting future unknown orders. By way of contrast, in this context, transient or dynamic storage and inventory may refer to inventory stored in response to existing or future known orders and by its nature are replenished within the G2P system as a reaction to orders, for example, as inventory batch picked (520—See FIG. 2B) for next day or non-same day orders, inducted into the G2P system for subsequent pick to order (522—See FIG. 2B) operations conducted to fulfill specific orders. Here, batch picking may be utilized to replenish static or persistent inventory with predetermined stocking levels (310—See FIG. 2B) or alternately to replenish transient or dynamic inventory with stocking levels (520—See FIG. 2B) to meet a given set of orders. By way of non-limiting example, in the transient or dynamic inventory batch pick replenishment with subsequent pick to order secondary sort example, and as will be described in greater detail below, if n next day orders require m each of sku xyz then n×m of sku xyz will be batch picked 520 overnight to replenish the G2P system dynamic inventory for next day pick to order operations and where during the next day, n pick to order operations will occur depleting the n×m skus from the product tote(s) containing the xyz skus transferring the xyz skus to order totes to fulfill the n orders. As will be described, the G2P system may as a result for next day orders offer for e-commerce delivery and contain "virtual inventory" reflecting the entire inventory of the entire store (floor+G2P static/persistent) capable of being stored within the G2P system without maintaining all of the skus on the floor within the G2P system that are not included in G2P static/persistent inventory. As a result, a much higher variety of sku's may be offered through the G2P system without maintaining such a diverse G2P static/persistent inventory in the G2P system as is maintained on the floor of a self-service store floor.

Referring now to FIG. 2B, there is shown flow diagram 210' illustrating an example inventory replenishment management system in a self-service store in which some example embodiments of this disclosure may be implemented. Flow diagram 210' has features similar to flow diagram 210 but adds concepts of allocating storage capacity in the G2P system for transient replenishment and picking G2P order based replenishment from the store floor for non-same day orders as will be described in detail below. As with flow diagram 210, the upper portion 216 represents store inventory replenishment whereas the lower portion 218 represents store inventory depletion. In practice, inventory replenishment and depletion may happen sequentially or more typically in parallel over time. Alternately, inventory replenishment and depletion may happen both sequentially and in parallel over time.

Store replenishment inventory may be received 220 at receiving area 140 and queued 222 at inventory storage and queue area 150. Inventory replenishment application 128 diverts 226 the inventory, primarily in case form, to either the store floor 130 or the G2P system 160. Inventory diverted to the store floor 130 makes up the sum of: 1) inventory needed to fulfill self-service orders, 2) lower velocity persistent inventory needed to replenish the G2P system that has been diverted to the floor and 3) inventory needed to make up the floor based portion of e-commerce orders fulfilled by the store. As will be described, the inventory needed to make up the floor based portion of e-commerce orders fulfilled by the store may be picked directly from the floor to fulfill same day orders or alternately diverted to the G2P system for order based G2P dynamic inventory to fulfill non-same day orders by the G2P system. The inventory needed to replenish persistent inventory of the G2P system that has been diverted 226 to the sales floor 130 is typically made up of lower velocity (lower sales rate; ex: units or SKU's/day) inventory needed for e-commerce orders. In contrast, the inventory needed to replenish the G2P system that has been diverted 226 to the G2P system 160 is typically made up of higher velocity (higher sales rate; ex: units or SKU's/day) inventory needed for e-commerce orders. The replenishment inventory diverted 226 to the sales floor 130 and the replenishment inventory diverted 226 to the G2P system 160 may be mutually exclusive; i.e. different SKU's are diverted 226 to the sales floor 130 than those diverted 226 to the G2P system 160, for example, where the velocity of the SKU's diverted 226 to the sales floor 130 are low and sufficient to meet both the demand of both self-service orders and e-commerce orders. Similarly, the replenishment inventory diverted 226 to the sales floor 130 and the replenishment inventory diverted 226 to the G2P system 160 may be common; i.e. where cases of the same SKU's are diverted 226 to both the sales floor 130 and to the G2P system 160, for example, where the velocity of the SKU's diverted 226 to both the sales floor 130 and to the G2P system 160 are high such that stocking both locations with higher quantities is warranted based on the demand the self-service orders and e-commerce orders individually.

Inventory diverted 226 to the store floor 130 is replenished by defining replenishment trips 228, collecting cases of inventory 232 based on those trips and stocking shelves 234 on the store floor to replenish the store floor. Inventory initially diverted 226 to the G2P system 160 is destined for static storage within the G2P system. Here, storage capacity within the G2P system is allocated 506 based on static and transient capacity and allocated to defined static containers 508 and defined transient containers 510 where the defined containers reflect their respective allocation. The higher velocity persistent inventory is allocated to the static replenishment containers. Higher velocity persistent inventory diverted 226 to the G2P system 160 is replenished by defining the static replenishment containers or totes 508 that will contain the inventory, collecting cases of inventory 242 based on those containers or totes 508 that will be filled with the inventory and decanting 246 the inventory into the G2P system by stripping the cases of external packaging, loading the inventory contents into the totes through a decant process at decant portion 172 and inducting 174 the totes into the container storage structure 164 of G2P system 160. To complete static replenishment of the G2P system, the lower velocity persistent inventory needed to replenish the G2P system that has been diverted 226 to the sales floor 130 needs to further be diverted 248 back to the G2P system to complete G2P replenishment 310 as will be described with respect to FIG. 3.

Fulfillment of orders occurs in three models, self-service, same day e-commerce and non-same day e-commerce models.

In the "self-serve" model, customers select or pick 252 goods making up an order from sales floor area 130, pay for the goods and thereby fulfill 254 their respective order in a "self-serve" model.

In the same day "e-commerce" model, customers select goods from a software application that may be computer, cellular or other device based which allows the customer to select goods in the order from the application to be fulfilled by self-service retail store 116 from inventory picked 260 from within the G2P system 160 either alone or in combination with inventory picked 262 from sales floor area 130.

Instead of goods being picked and compiled into an order (from off of the sales floor) by the customer, goods that make up orders in a same day "e-commerce" model are typically picked and combined 264 onto an order by associates (or proxy or automation) from sales floor area 130 or G2P system 160 and delivered to the customer where the customer picks up or takes delivery of the order to fulfill 268 the e-commerce order after it has been compiled.

In the non-same day "e-commerce" model, customers select goods from a software application that may be computer, cellular or other device based which allows the customer to select goods in the order from the application to be fulfilled by self-service retail store 116 from inventory picked 260 from within the G2P system 160 either alone or in combination with inventory picked 262 from sales floor area 130. Instead of goods being picked and compiled into an order (from off of the sales floor) by the customer, goods that make up orders in a non-same day "e-commerce" model may be finally picked from the G2P system where the G2P system utilizes a combination of the static inventory (higher velocity persistent G2P inventory+lower velocity persistent G2P inventory diverted from the store floor) in combination with transient inventory picked from the store floor specifically to fill non-same day "e-commerce" orders, for example, where the inventory picked from the store floor for transient G2P replenishment may be picked at night or during off peak hours. Here, store floor inventory 130 may be diverted 514 for next day orders 518 to replenish 520 G2P order based transient stock picked from the store floor. Note that floor-based inventory needed to fulfill self-service or same day e-commerce orders 516 stays on the floor for picking 252, 262 as described. Non-same day "e-commerce" orders can then be completely picked from the G2P system 522 drawing inventory from the combination of persistent static inventory and dynamic transient inventory now within the G2P system to fulfill the non-same day e-commerce order 524 after it has been compiled from the G2P system.

Referring now to FIG. 2C, there is shown flow diagram 610 further illustrating the two models described for the fulfillment of e-commerce orders; same day e-commerce and non-same day e-commerce models. An order or stream of orders 612 may be received by the fulfillment location or center. Typically, inventory is checked 614 to determine availability of the items. If inventory is not available 618 then the items not available are checked against the order to determine if substitutions are allowed 620. If substitutions are not allowed 622 then a replenish transaction may be triggered 624 and the order may proceed less the missing item or hold pending the missing item. If substitutions are allowed 626 then the substitution is similarly checked for inventory and with all items in inventory or otherwise available 630 the order may proceed to fulfillment. The given order is screened for same day pickup 632. If the order is for same day pickup 634 then the floor portion of the e-commerce order is picked 636, the static G2P portion of the e-commerce order is picked and the two combined 640 and the e-commerce order is fulfilled 642. If the order is for non-same day pickup 650 then the floor portion of the e-commerce order is picked 652 and transient G2P storage is replenished with the floor portion of the e-commerce order 654. At this point, the entire (floor based+G2P based portions) e-commerce order is held within static and transient storage within the G2P system. In advance of fulfillment, the entire e-commerce order is picked from static and transient storage 656 in the G2P system and fulfilled 658. In alternate aspects, in addition to the items picked from the G2P system, a given e-commerce order may be supplemented and combined with items picked from the floor or otherwise, for example, items that do not fit within the G2P system or that were subsequently added to the order with insufficient time. In alternate aspects, if a given customer does not pick up or cancels a given order and inventory in transient storage is then in excess, a "reverse pick" may be envisioned where the relevant inventory in transient inventory of the G2p system may be diverted out of the G2P system and back to the floor. "Same day" in the context of this description may equate to a time period that does not allow for order-based replenishment 520 and subsequent picking 522. As such, "same day" may equate to, for example, time less than a few hours or otherwise and "next day" or "non-same day" may equate to, for example, time greater than a few hours or otherwise regardless of whether it occurs on the same or next day.

Figure 2D:
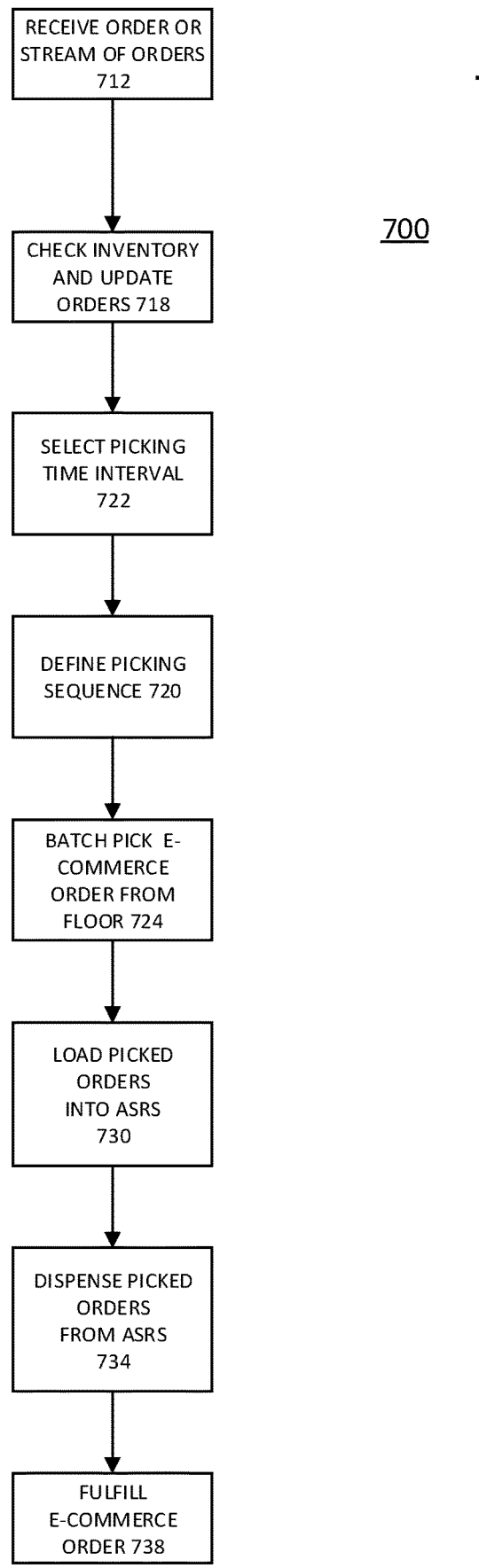
FIG. 2D is a flowchart showing a method utilizing a manual pick to order with automated storage and dispense of the picked orders.

Referring now to FIG. 2D, there is shown a flow diagram 700 illustrating an example order fulfillment system flow. The method will be described as a system where orders are picked and put into the automation where the method may be utilized alone or in combination with earlier described methods. Here, the picking to order is already done on the floor and hence for these orders a separate pick operation prior to fulfilling these orders is not required (whereas in the HD-MFC, subsequent to a floor based batch pick or replenishment operation, a separate pick to order operation is performed by the G2P system or AS/RS having the separate picking capability. Here, storage capacity that may or may not be automation and that does not incorporate picking operations may be utilized to fulfill orders. Alternately, a G2P system as described may be utilized but without utilizing the picking automation for this subset of orders (ex: picking workstation) within the G2P system for this particular method. In alternate aspects, the methods demonstrated in FIGS. 2A-D may be combined to leverage a given G2P system with different fulfillment models.

By way of example, loading order into an ASRS/G2P system that then interfaces directly to a customer as described with respect to FIG. 2D is a different but potentially complementary model to one employing loading inventory into an G2P system that creates orders that are dispensed to customers; these are two different but potentially complimentary models. The first is disclosed with respect to FIG. 2D. The second use of a given G2P system is core to the HD-MFC model. The picking sequence of FIGS. 2B and 2C demonstrates the sequence of batch-picking eaches (520) followed by a secondary sortation (522) where a goods-to-person each—picking system is being used to perform this secondary sortation process. By way of contrast, the method disclosed in FIG. 2D utilizes a floor-based pick to order followed by storage within an ASRS for awaiting subsequent fulfillment.

Method 700 shown in FIG. 2D demonstrates a model where up to 100% of the goods come from the store floor inventory as described below. The AS/RS can be Alphabot (a 3D shuttle), 2D shuttles, 1D shuttle, or even a paternoster stocker or other suitable ASRS system. Here, orders are fulfilled by picking from the store inventory, at store level and loading into an AS/RS for direct to customer dispense. The AS/RS for direct customer dispense may be as disclosed in US Patent Publication Number US2017/0313514A1 with publication date Nov. 2, 2017 and entitled "Order Fulfillment System" hereby incorporated by reference in its entirety. Alternately, any AS/RS system may be utilized, for example, for storing containers capable of holding eaches that make up pre-picked orders. In the method of FIG. 2D, general merchandise is picked forming orders and loaded to an ASRS for dispense of completed orders. An overnight or off peak picking schedule may be utilized to pick the order(s) and a rack based batch pick cart may be utilized to perform the pick to order alone or in combination with a batch pick as the case may be, for example, for automated loading and unloading of totes or containers to and from the AS/RS. Unloading may also be direct to parking lot dispense from the same AS/RS filled from the interior store. Racks and hardware for direct customer dispense may be as disclosed in US Patent Publication Number US2018/0194556A1 with publication date Jul. 12, 2018 and entitled "Interchangeable Automated Mobile Robots with a Plurality of Operating Modes Configuring a Plurality of Different Robot Task Capabilities" incorporated by reference herein in its entirety.

In method 700 shown in FIG. 2D, customer orders are received 712 the day before they are to be picked up, for example, before 10 pm, a predetermined time or otherwise. Inventory is checked 718 for example as described with respect to FIG. 2C and order lines compiled where orders are a known and where optimized routes may be defined for the pickers. The picking sequence 720 may be as described with respect to FIG. 3 below, but where the order lines are defined to fulfill orders as opposed to replenish inventory and also where the containers are provided to contain picked orders as opposed to replenishment inventory. Picking of the orders may be over a given selected picking time interval 722 which may vary by season, time of week or otherwise, for example, picking time interval between 10 pm and 4 am, where pickers manually pick 724 items from the store shelf inventory. Here, this pick period could be adjusted to accommodate store replenishment before or after this batch picking period. The night batch picking has features including where batch pickers can pick very efficiently since all orders are known and optimized routes may be defined for the pickers. Further, the pickers have more orders to pick, so they can have very efficient picking routes defined. Further, store customers are not impeding the picking operation due to off peak hour picking (here, retail customers may or may not be present). This feature also improves the customer shopping experience by picking at night or during off-peak hours so as not to impede customer traffic with the pickers and picking carts. An additional feature is provided where night batch or pick to order picking or off-peak picking allows a given picker to achieve higher pick rates and hence higher cost efficiency, for example, batch or pick to order night picking may provide and expected 250 eaches per hour or more, as opposed to daytime order picking of 80-100 eaches per hour. Upon completion of a given batch pick, batch pickers load 730 the picked orders into an AS/RS, which may be a mobile robot-based system or other suitable ASRS. In one aspect, the cart or rack used for batch picking may be attached to the Alphabot structure to allow direct unloading of totes containing full customer orders and reloading with empty totes for the next batch pick run. Such a system is described in U.S. Provisional Patent Application No. 63/013,504 with filing date Apr. 21, 2020 and entitled "Transport Rack Cartridge" incorporated by reference herein in its entirety. The storage AS/RS may have ambient, chilled and frozen temperature zones. Alternately, the storage AS/RS may have an all ambient temperature zone and contain Passively Cooled Totes (Chilled and Frozen), for example, as disclosed in U.S. patent application Ser. No. 16/831,468 with filing date Mar. 26, 2020 and entitled "Tote Handling for Chilled or Frozen Goods" incorporated by reference herein in its entirety. When the order is ready to be fulfilled, orders are then dispensed 734 from the ASRS and the order then can be fulfilled 738. In the embodiment disclosed and by way of example, the AS/RS may have the ability to present the fully consolidated order directly to the customer, thereby eliminating the significant labor cost associated with dispensing orders to customers manually. In alternate aspects, the order may be fulfilled to the customer by any suitable method.

Figure 2E:
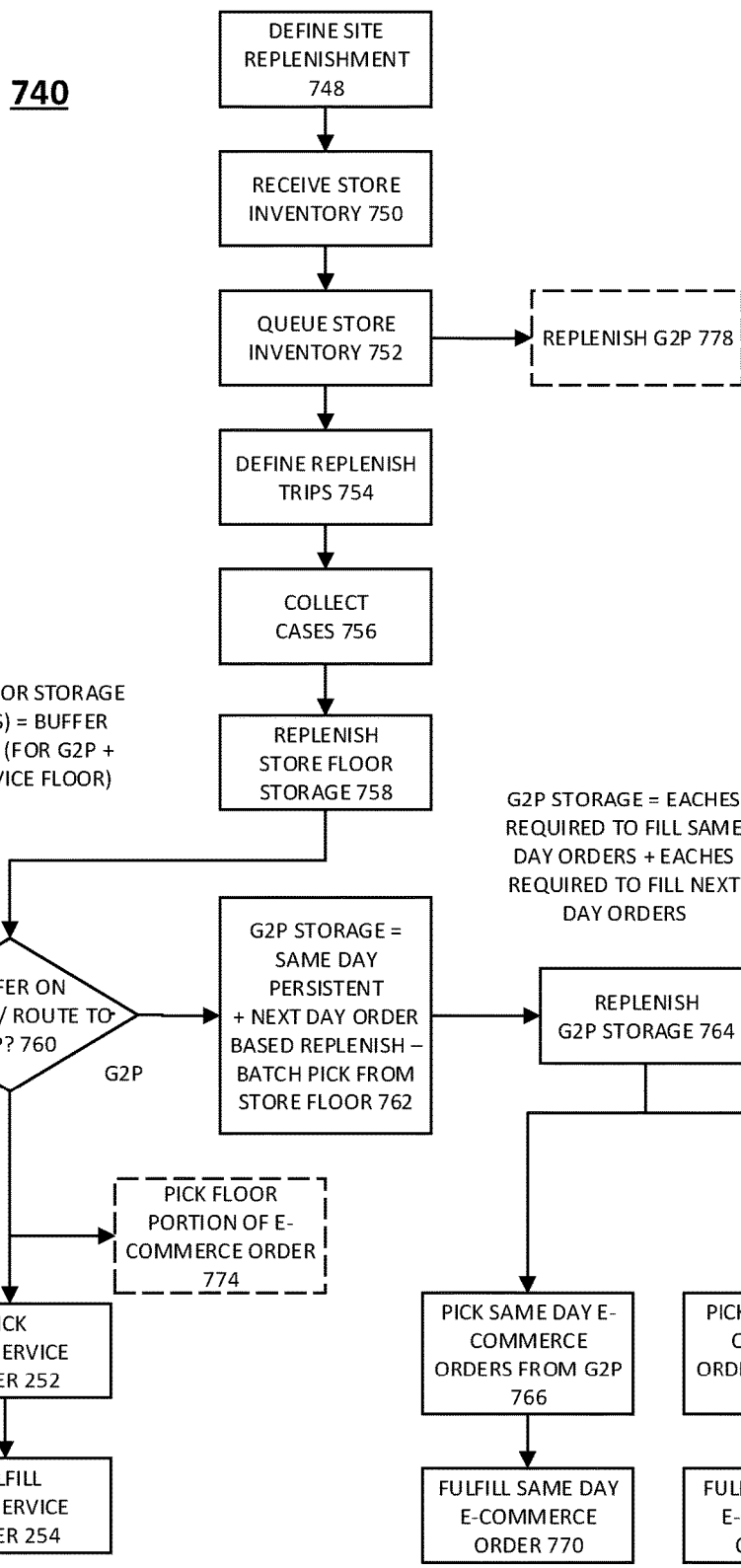
FIG. 2E is a flowchart illustrating an example HD-MFC storage management and inventory replenishment system in a self-service store.

Referring now to FIG. 2E, there is shown flow diagram 740 illustrating an example storage management and inventory replenishment management system in a self-service store 116 in which some example embodiments of this disclosure may be implemented, in particular the "HD-MFC" methods as described below. By way of introduction, a "reference MFC system operating method" may be characterized by the method shown in FIG. 2A but with removing block 310, i.e. without the G2P replenish portion 310. Here, the Bots in the G2P system would pick at 260 as much of the "tote-able" packaged-goods assortment that fit into the G2P system. The fresh goods and the remainder of packaged goods would be picked 262 manually from the floor. Using case replenishment at the store (Floor may be replenished by case or break-pack from DC, G2P may be replenished 246 by case or break-pack from DC), a G2P system could support, by way of non-limiting example, between 15,000 and 20,000 SKUS. Alternately, with sub-tote replenishment from a DC, the G2P system could accommodate twice that number, which could encompass nearly the entire assortment of grocery packaged goods. By way of contrast to the "reference MFC system operating method" described above, the operating method evolves as disclosed to what can be referred to as a "high-velocity" method, whereby the G2P automation system is used to pick the highest-velocity SKUs, for example, targeting 80% of ordered eaches, and slower-moving SKUs continue to be picked to order manually from the floor. This approach as described may be referred to as the High Velocity Micro Fulfillment Strategy or "HV-MFC" method. An alternate method that may be called the "high-density" operating method (High Density Micro Fulfillment Center or "HD-MFC") operating method is refined as will be described in greater detail below. This method may be applied where a large "GM" (General Merchandise) assortment is provided in stores while furthering the objective of integrating that assortment with grocery as part of Pickup & Delivery by way of example.

Figure 4:
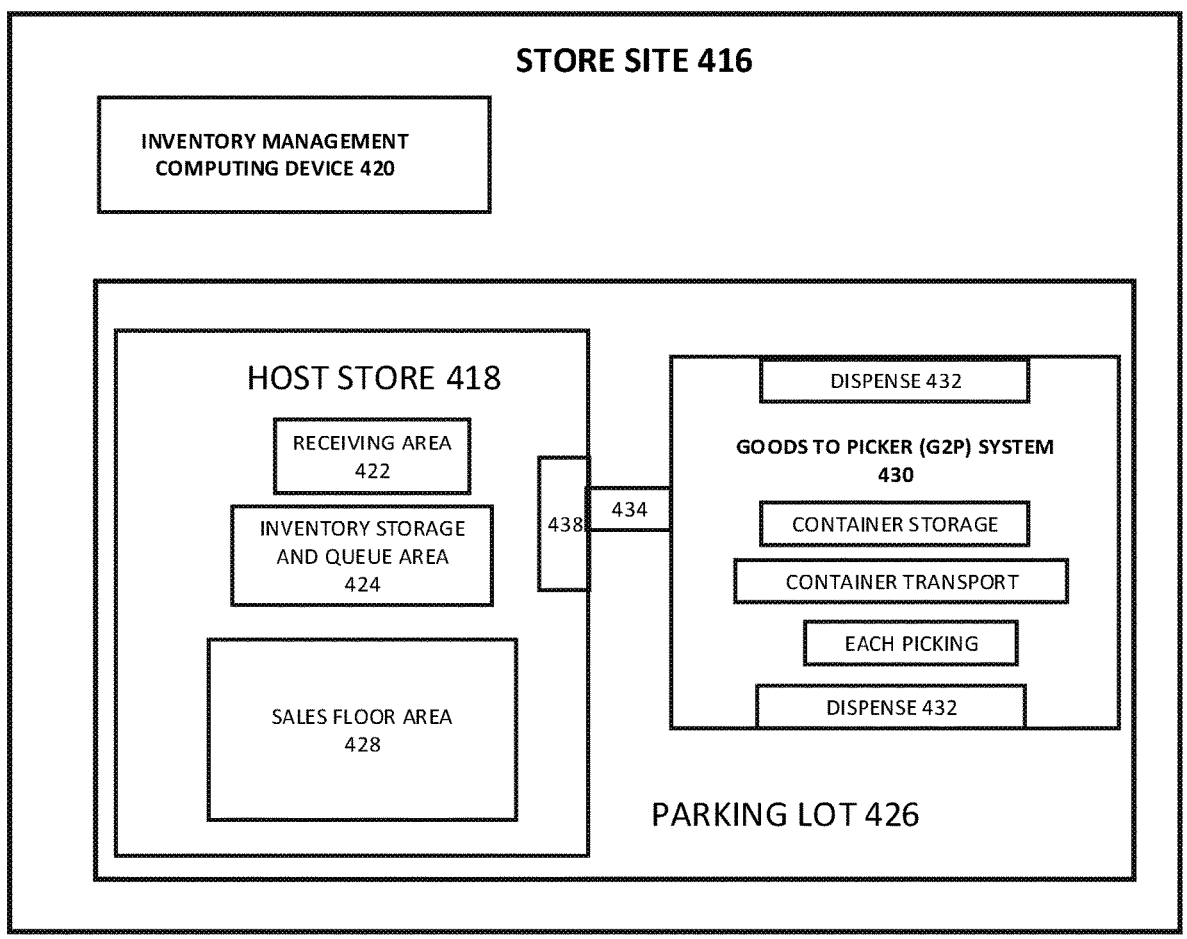
FIG. 4 is a block diagram showing an exemplary store site format according to embodiments of the present technology.

The HD-MFC Method may utilize a G2P system (or suitable ASRS system with each picking) that provides an example goods-to-picker automation system where such system (in an Alphabot G2P system example) may operate with no single point of failure and having fully random access by all robots to all storage and workstations in a 3-dimensional workspace. The Alphabot G2P system is designed to be compact and space efficient through efficient use of vertical space, and it includes a product-storage architecture that maximizes SKU density. The design of the operating method addresses how best to use this capability to reduce operating costs of fulfilling online orders in a store. The HD-MFC may be used with a store format with an integrated "in store" G2P system as shown in FIG. 1 or with an on-site or local G2P system as shown in FIG. 4 or otherwise. As described in detail below, the HD-MFC may be compared to an HV-MFC by features:

1. HD-MFC requires smaller space claim and lower capital cost (important feature for in-store MFCs).
2. HD-MFC has comparable or lower labor costs.
3. HD-MFC simplifies replenishment of the MFC, whereas HV-MFC has a higher level of replenishment complexity.

4. HD-MFC more effectively eliminates in-store order-picking as an irritant to self-service customers.
5. HD-MFC enables faster order-completion times to improve customer experience.
6. HD-MFC enables higher-density packing of orders, fewer order-totes per order, and lower dispense and delivery costs.
7. HD-MFC can be more effective in reducing substitutions and out-of-stocks.
8. HD-MFC will more cost-effectively integrate the general merchandise assortment with grocery P&D, achieving higher service levels at a more affordable cost.

Referring to FIG. 2E, there is shown flow diagram 740 illustrating an example storage management and inventory replenishment management system in a self-service store 116 in which some example embodiments of this disclosure may be implemented. The HD-MFC embodiment method described with respect to FIG. 2E is shown for simplicity and may combine features as disclosed with respect to other embodiments. The upper portion 216 represents store inventory replenishment whereas the lower portion 218 represents store inventory depletion. In practice, inventory replenishment and depletion may happen sequentially or more typically in parallel over time. Alternately, inventory replenishment and depletion may happen both sequentially and in parallel over time. With the HD-MFC model, overall site replenishment 748 is defined as customer demand for the store or facility. Here, if the store is replenished properly based on the store's demand then the G2P system within the store format is replenished properly where there are different classifications of storage, for example, store shelve based or G2P tote and sub-tote based. Store replenishment inventory may be received 750 at receiving area 140 and queued 752 at inventory storage and queue area 150. Inventory replenishment application 128 sends the inventory, primarily in case form, primarily to the store floor. Inventory sent to the store floor may be diverted to shelves or other storage where the store floor storage (shelves) equates to buffer storage for both the G2P system and the self-service floor. Although "buffer storage" is described as shelves on the store floor, the shelves and/or buffer storage may include any suitable storage that may or may not be included on the store floor accessible by self-serve customers. Inventory sent to the store floor is replenished by defining replenishment trips 754, collecting cases of inventory 756 based on those trips and stocking shelves 758 on the store floor to replenish the store floor. To replenish the G2P system, the inventory needed to replenish the G2P system is drawn 760 from the sales floor and diverted the G2P system to complete P2G replenishment 764 as will be described with respect to FIGS. 3A and 3B below.

Figure 3A:
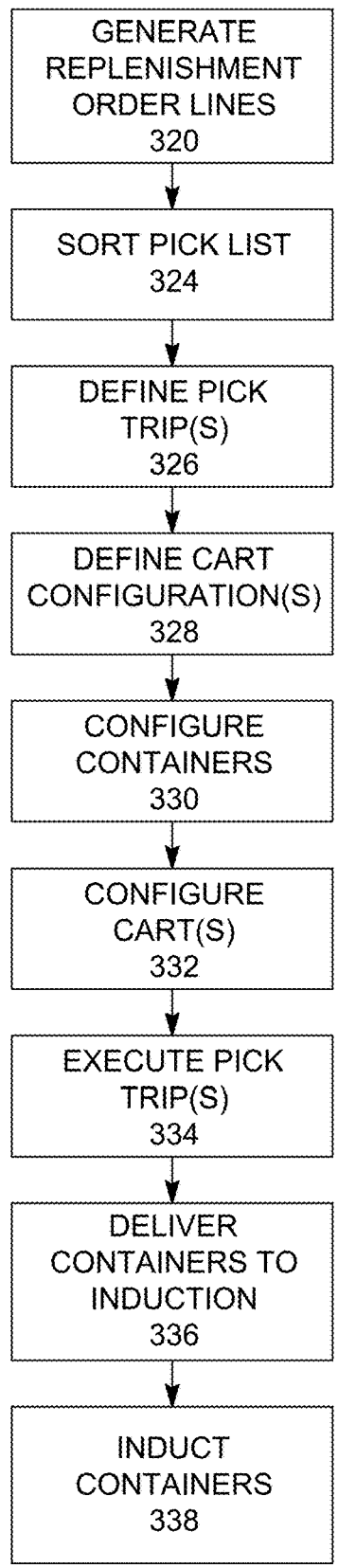
FIGS. 3A and 3B are flowcharts showing replenishment order picking of inventory according to different embodiments of the present technology.

Referring now to FIG. 3A, there is shown the P2G replenishment-order picking process 310 having the following steps. On intervals, for example, each day, software in the G2P automation generates a list of replenishment order-lines 320, with each order-line specifying the identity of the SKU to be replenished, the shelf-position within the store where the SKU is located, the desired number of eaches to be picked from the shelf, and the size of the compartment into which the eaches are to be placed (e.g., either ¼-tote or ⅙-tote, though can be other sizes, such as for example ⅓-tote). This pick list is then sorted 324 based on shelf-location of the SKUs and subdivided 326 into trips, each trip requiring a picker to push a cart on a specified path and pick the order-lines on the pick-list in the sequence of location. The number of trips and the path of each trip will depend on the number of order-lines, the mix of defined 330 compartment sizes into which the eaches will be placed, and the number of totes (containers) that can be loaded onto the cart 328 for each trip. A cart is then set up and configured 332 for each trip. With few exceptions, every cart on every trip will be loaded with the maximum number of totes that it can carry, though the mix of totes with ¼-tote compartments and ⅙-tote compartments will vary depending on the requirements for each trip. These totes will typically come out of the G2P system following a defragmentation process that consolidates empty compartments into these replenishment totes. Each tote and each compartment within the tote have some form of indicia with a unique identifier (e.g. barcode), all of which are registered within the system along with the association/configuration between totes and compartments. Ideally, each cart is configured to include a storage array that holds all of the totes to be filled on the trip, and a receiving shelf that holds two totes at an ergonomically optimal height, one tote configured with ¼-tote compartments and the other with ⅙-tote compartments. A picker then executes 334 each trip by pushing the cart along the specified path, stopping sequentially at the location of every SKU on the location-sorted pick list, and transferring up to the specified number of eaches of every SKU into a compartment of the specified size in one of the two totes on the receiving shelf (provided that the requested eaches are actually on the shelf available to be picked). Note that any compartment of the correct size in the receiving tote can be used, and once a receiving tote has been filled, it is returned to the storage section of the cart and a replacement with the same size compartments placed on the receiving shelf to be filled next. A computational device mounted to the cart (or worn by the picker) provides to the picker the necessary information for each pick (SKU identity, shelf location, number of eaches, and size of compartment in which to put the picked eaches), and the picker would use a barcode scanner to scan both the GTIN barcode present on the picked eaches and on the compartment into which the eaches are put. (A highly advantageous scanner configuration would be a finger-mounted "ring" scanner that provides the picker full use of both hands at all times.). Once a trip has been completed, the picker pushes and delivers 336 the cart full of filled totes to an induction station 174 connected to the G2P picking system 160, and transfers the totes from the cart into the G2P system to be placed into tote storage 164 as product totes ready to supply eaches to be picked at the G2P picking station to fill future customer orders. The procedure by which these totes are inducted into the G2P system will be specific to the system. All of this replenishment can be done during normal operation or off peak alternately allowing for better floor flow to the store customers and less congestion overall.

On the surface, this process model appears to violate a common rule of material-handling system design, which is to minimize the number of times an item is touched. In both P2G and G2P picking with case replenishment, an each is touched only twice: once on replenishment when it is either put onto a shelf or loaded into a tote, and a second time when it is picked to the customer order. In the disclosed model, all eaches that are picked to replenishment orders as described above are touched three times: once when placed on the shelf, again when picked from the shelf to a replenishment order, and finally at the G2P picking station when picked to a customer order. Here, less-than-case store replenishment typically requires eaches to be touched twice: once at the distribution center when they are removed from the shipping case for shipment to the store, and a second time when they are placed on the shelf in the store. In contrast, the disclosed form of less-than-case replenishment is where both touches occur in the store.

This design makes economic sense because it both solves the space constraint that prevents a large assortment with case replenishment and it is far more labor efficient than P2G customer-order picking of center-store SKUs, even with the extra touch. Moreover, unlike the model of picking only high-velocity SKUs in the G2P system, this design actually delivers an attractive return on the investment in automation. Both high-velocity SKUs (possibly stored in low density totes) and low-velocity SKUs (possibly stored in high density totes) may be efficiently stored and picked from the G2P picking location.

One reason why this design solves the core problem of economically fulfilling online orders in stores is the much higher labor efficiency achievable with P2G picking of replenishment orders compared to P2G picking of customer orders, even when the latter uses multi-order zone picking as described above. This efficiency differential is due to several key differences between the two picking applications. Orders for (possibly low velocity) goods which would conventionally be picked from the shelves in a P2G model may now be fulfilled from the G2P picking side, thereby increasing efficiency of fulfilling orders.

One difference is that picking of every customer order must be timed to be completed prior to the expected arrival of the customer to pick up the order or the departure of a delivery vehicle. Given the limited number of totes that can fit on a cart and relatively limited space available to store filled order totes pending transfer to customer or vehicle, there is little ability to batch orders together in order to pick more efficiently. As a result, it will be necessary to send pickers on multiple trips through the same parts of the store each day to pick the order-lines for different sets of orders as required by the completion deadlines. This will result in many fewer order-lines per trip and much greater total travel distance to pick than when all order-lines that need to be picked on a given route can be picked on one single pass, as is the case with replenishment picking. Furthermore, customer-order picking needs to occur during daytime hours when self-service customers are also shopping in the store within those zones, which will slow down pickers and require considerably more travel time to cover those greater distances traveled that would be true if customers weren't present. By contrast, replenishment picking is not tied at all to order deadlines, so all replenishment order-lines can be picked in batch on a single pass through the store, resulting in the minimum possible total travel distance and the maximum possible order-line density. Moreover, replenishment picking can occur at night when no customers are shopping. As a result, the speed at which replenishment pickers can travel this minimum possible distance is much greater than when picking customer orders during the day. For both of these reasons, the total travel-time per order-line picked will be far lower for replenishment-order picking than for customer-order picking.

Another difference between these two applications is with respect to the average number of eaches to be picked per order-line. With individual customer orders, most order-lines are for a single each, and the average is typically about 1.2 or 1.3 eaches per order-line. With replenishment orders, by contrast, every order-line typically calls for as many eaches as can fit into the specified size of subtote (within certain limits) in order to minimize replenishment frequency, and the average will typically at least 3 eaches per order-line. This difference will reduce the labor cost per each picked in two ways. First, since over time the same number of eaches of this set of NFPG SKUs will need to be manually picked for both customer and replenishment orders, the number of order-lines necessary for that picking will equal the total number of eaches divided by the average number of eaches per order-line. Accordingly, based on the values above, picking customer orders will require 2.5 times the number of order-lines than picking replenishment orders (3/1.2=2.5). Second, as discussed above, the second and higher eaches in an order-line have a much lower incremental cost than the first each. With customer-order picking, only about 23% of the eaches picked (0.3/1.3=0.23) are these lowest-cost eaches, while 67% of the eaches (⅔=0.67) picked to replenishment orders are lowest-cost eaches. Moreover, even though there are more eaches to be removed from the shelf, putting those eaches into the order tote takes considerably less time with replenishment picking because the order-lines do not have to be placed into any specific tote, just into a compartment of a specific size. The picker can thus continuously place eaches from sequential order-lines into the totes on the receiving shelf, swapping out totes once they have been filled. In picking customer orders, by contrast, eaches from every order-line must be placed into a specific order tote, so the picker must first access that tote-which will typically be different with every order-line-and then place the each(es) into one of the bags in that tote. This a much more time-consuming process.

Another difference between these two picking applications is that the "overhead" labor cost associated with setting up and handling the picking carts is significantly greater for customer-order picking than for replenishment-order picking. One reason for this is that the size and carrying capacity of the replenishment-order cart can be significantly larger because picking occurs during nighttime hours when there are no customers in the aisles to be annoyed by or interfere with the picker. Even more importantly, every replenishment-order tote will receive many times more eaches than a customer-order tote, so the number of total eaches that can be loaded into the cart on a single trip will be the product of the cart's tote-carrying capacity in number of totes times the average number of eaches received by each order tote. Since both of those factors will be significantly larger for replenishment-order picking than for customer-order picking, the difference will be compounded such that customer-order picking will require many times more carts to be set up and moved to and from the store floor to collect a given quantity of eaches.

For the reasons above, the labor cost of picking eaches to replenish the G2P system will be far lower than for picking those same eaches to fill customer orders, so much so that even with the additional (very low) labor cost of picking all of these eaches again within the G2P system, total labor costs to pick the online orders for these NFPG SKUs is reduced quite substantially compared to all P2G customer-order picking. Of course, fresh goods and frozen packaged goods would still be picked using P2G picking, but as explained above, these products have the lowest P2G picking costs to begin with because of their localized concentration within the store, so the cost of picking NFPG SKUs is the largest factor in the high cost of picking online orders.

It should also be noted that picking all of these NFPG products in the G2P system provides four other very significant advantages compared to the SKU-velocity strategy:

The automated system has much more accurate on-hand inventory data for the NFPG SKUs representing 90% of packaged goods, so there will be many fewer outof-stocks and substitutions with the SKU-density strategy than with the SKU-velocity strategy.

By performing the vast majority of P2G each—picking at night rather than during the day when customers are shopping, this model removes this process as a source of annoyance to customers.

The number of order-totes per customer order will be reduced significantly compared to the multi-order P2G zone-picking of the vast majority NFPG SKUs inherent in the SKU-velocity approach in the absence of additional order-consolidation labor. This reduction will drive reductions inreduce both the labor costs associated with order-dispensing and the transportation costs associated with delivery.

With the automated system picking all order-lines except for fresh and frozen goods, it become much more feasible to achieve a service level of having the order ready for pickup or delivery quickly, e.g. within one-hour or less.

It should further be noted that picking and from and replenishing to the G2P system as described provides benefits: 1) improved space efficiency where a higher SKU selection and SKU density can be offered from the G2P system, 2) improved labor efficiency where an operator can pick from the floor for G2P replenishment many more eaches per trip to the floor, by way of example, picking off of the floor to fulfill orders may result in 1.2-1.3 eaches per order line whereas picking from the floor to replenish may result in greater than 2 eaches per order line in comparison; here, the higher number effective eaches per operator step results in improved labor efficiency, 3) G2P replenishment from the floor can be done during off-peak shopping hours which results in an improved self-service customer experience, 4) the application offsets the need for "break pack" upstream where "break pack" is the breaking of cases at the upstream distribution center for shipping to the store in sub-case quantities for low velocity SKU's for example, and 5) elimination of redundant order totes with redundant bagging, storage, dispensing and cleaning and 6) with the G2P system being faster than manual picking, order fulfillment cycle times can be reduced to enable "in store" fulfillment while the customer shops or "same hour" delivery.

Figure 3B:
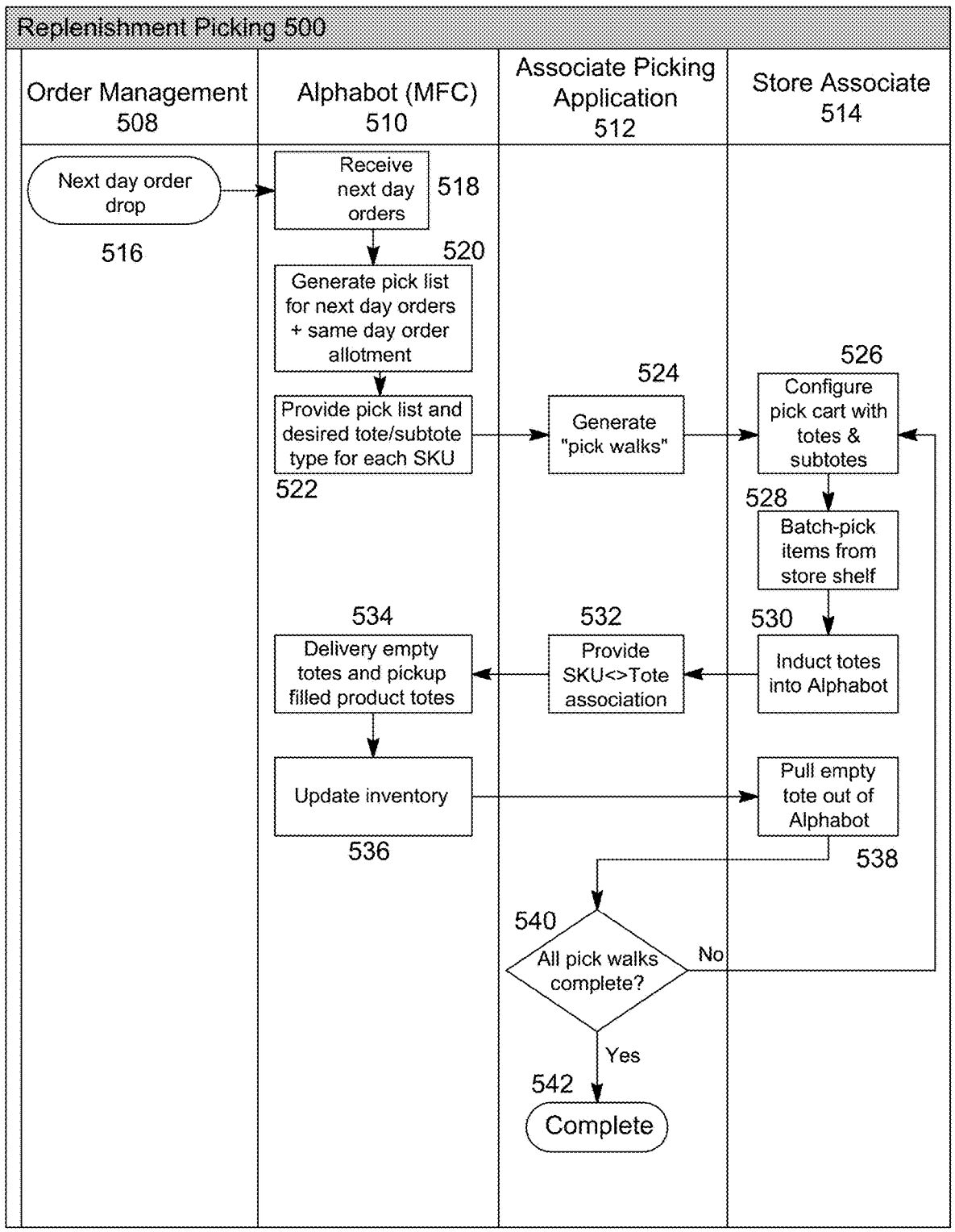

Referring now to FIG. 3B, the inventory diverted 762 to G2P storage is comprised of same day persistent inventory+ next day order-based inventory replenished by batch picking both from store floor. Fulfillment of orders occurs in two models, self-service and e-commerce models. In the "self-serve" model, customers select or pick 252 goods making up an order from sales floor area, pay for the goods and thereby fulfill 254 their respective order in a "self-serve" model. In the "e-commerce" model, customers select goods from a software application that may be computer, cellular or other device based which allows the customer to select goods in the order from the application to be fulfilled by self-service retail store 116 from inventory picked 766, 768 primarily from within the G2P system. Picked 766 for same day orders and picked 768 for next day orders where the SKU selection available to fulfill these varies as described. The customer picks up or takes delivery of the order to fulfill 770, 772 the e-commerce order after it has been compiled by the G2P system.

With the HD-MFC method, the supply chain of the store itself is utilized from floor shelves 760 for example to feed the G2P machine 762 to sell online. One of the key problems with e-commerce is selling online profitably. With the HD-MFC method, the labor that is required to pick the eaches is made sufficiently efficient to make money utilizing order based batch pick to fulfill G2P system storage as opposed to picking orders individually from the floor. With the HD-MFC method, inventory is not used in the classical sense where storage capacity is allocated as opposed to inventory allocation. Demand 748 is made to look the same for the store site as opposed to site replenishment by two separate replenishment streams of cases. One difference is the batch pick replenishment 762, 764 of the small scale G2P system in the MFC where there is much less or no persistent inventory where the method only puts in static G2P inventory that which is needed for next day orders with a certain level of in stock same day availability (subject to substitution). Here, periodically, for example, every day the system reallocates 762 the totes and sub-totes in the G2P system to allocate static inventory for next day and also the reallocation of order-based inventory to fulfill next day orders. Simply put, the HD-MFC method provides a small G2P machine within or proximate to the store to enable the store to sell products to customers to enable making a profit on the sale. Here, the store floor provides a manual fulfillment system with pickers that fill 762, 764 the G2P system which then fulfills 770, 772 the order. Here, the HD-MFC method adapts a brick and mortar store with a combined G2P system to be able to extend the brick and mortar store to sell on-line profitably. Here, the self-service store equates to being a distribution center at night for each level replenishment 764 of the G2P system for next day 768. The store operates as a self-service store during the day 252 and uses the G2P system to pick same day e-commerce orders 766 from G2P storage with a lower product mix as well as next day orders 768 from G2P storage with a very high product mix. Here, two different selections are available from the G2P system; one for same day and essentially the whole store for next day. Here, persistent G2P storage is available for same day immediate fulfillment 770 from the G2P system. Further, persistent G2P storage+all the floor inventory that flows from the floor to the G2P system from overnight batch picking is available for next day immediate fulfillment 772 from the G2P system. Here, the shelf-based floor storage acts as buffer storage for both the G2P system and the self-service floor. Although all of or the vast majority of e-commerce orders are fulfilled by the G2P system, some same day floor based picking 774 may be provided, for example picking fresh, frozen and bulky items where bulky may be bulky but toteable and where order totes for these items may be stored in chilled or frozen storage of the G2P system till the order is fulfilled. Here, the G2P picking stock is managed differently than a free standing G2P fulfillment system is. With the HD-MFC method, Alphabot or any suitable G2P system is actually a machine that creates a machine (i.e., the G2P system turning the entire store into an integrated machine). The G2P of the MFC enables the store to extend its functionality. In addition to the purely manual P2G self-serve fulfillment center that it always has been, with the customers being the "Ps", the store with the g2P system machine also serves as an automated fulfillment center for online orders.

With the HD-MFC, a primary optimization goal of this method is to minimize the size of the G2P system (more important feature with deployments going onto the sales floor) while still supporting essentially the full grocery assortment. The goal is achieved by leveraging a tote/sub-tote storage architecture to maximize SKU-density within the machine. By way of example, for a single store's demand, most totes will contain 6 or 8 SKUs, some will contain 2, 3, or 4 SKUs, and only a few will be single-SKU totes. A SKU will typically be stored in only one subtote, with instances of multiple locations for a SKU ideally lasting for less than a day.

A large majority of the subtotes will contain relatively few eaches of slow-moving SKUs, so this method may rule out replenishment by cases in many cases, for example, except for a small number of the highest-velocity SKUs which may be provided to replenish 778 the G2P system. Case-replenishment is very effective at enabling a large product assortment with affordable replenishment labor in large self-service stores, but it requires a lot of low-turnover storage space for slow-moving SKUs. It is therefore fundamentally at odds with the goal of minimizing G2P storage, especially given if online orders make up a small share of total volume. While it is very appealing and intuitive to leverage existing case-replenishment logistics to replenish the G2P machine, this approach is a driver towards both the high-velocity operating model, in order to achieve labor savings disproportionate to the number of SKUs in G2P, and also towards a centralized (hub-and-spoke) fulfillment model that aggregates demand in order to drive inventory turn and ROI on the G2P automation investment. Both of these strategies are suboptimal, compared to the high-density HD-MFC operating method with distributed fulfillment.

The HD-MFC operating method replenishes 764 the G2P system primarily by eaches that are picked 762 manually from the store's shelves during a nightly P2G batch-picking process. This approach will seem counter-intuitive because of the additional touch of most of the eaches sold, but the objective is to minimize total labor costs, not the number of touches. Compared to the manual single-touch order-picking process, replenishment batch-picking is far more labor efficient- and the cost of that additional touch will therefore be quite low-due to four example differences.

Picking density for batch-picking will be much higher than for order-picking, because all replenishment eaches for the entire day can be picked in a single pass through the store, compared to multiple waves required for order-picking.

The number of eaches per order-line will be considerably greater, probably by a factor of 2× to 2.5×.

Pickers will be able to travel much faster without customers in the aisles.

With no risk of annoying customers, larger carts can be used, resulting in fewer cart-changes and associated fixed-overhead labor costs. (Further, by using AlphaRack picking carts, the portion of this fixed-overhead associated with cart set-up and tote-induction will be effectively eliminated.)

The distinction between same-day fulfillment 770 and next-day fulfillment 772 is a factor in the effectiveness of this HD-MFC method, because it enables a minimum amount of inventory to be stored in the system and the G2P system therefore to be as small as possible. It does this by turning over the storage locations of eaches picked for known next-day orders every single day. There is a pool of totes/sub-totes that are filled up 762 at night and then emptied out throughout the next day, cycling every day. The only eaches that Alphabot G2P system needs to maintain in persistent inventory are those deemed necessary to fulfill not-yet-known same-day orders at a target service level, because all of the eaches required for known next-day orders can be batch-picked at night and then picked-to-order in the G2P machine prior to the pick-up or dispatch deadline for each order. In effect, a batch-pick is performed with a secondary sort-to-order using Alphabot as the G2P system as the sortation machine. Of course, depending on the amount of storage available, the system can always store more than this minimum amount of inventory, which reduces replenishment costs by reducing the number of replenishment transactions required by a given movement velocity, and also increasing the average number of eaches per replenishment order-line when picked.

Further, when automated decant is applied, for example, as disclosed in U.S. Patent Publication No. US2020/0039746 which is incorporated by reference herein in its entirety and the assembly of pick-ready multi-SKU totes at the DC to replenish MFCs is applied, for example, as disclosed in U.S. Patent Publication No's. U.S. Patent Publication No. 2018/0150793 and U.S. Patent Publication No. 2018/0247257 both of which are incorporated by reference herein in their entirety, the total cost of replenishing by eaches will be less than today's cost of replenishing store shelves by cases.

There may also be certain categories of SKU that might best be excluded entirely from persistent inventory, even to fill same-day orders, such as fresh goods, bulky goods, and (for example, if space needs to be minimized) frozen goods.

The HD-MFC method does have a greater reliance on the store's ability to maintain adequate on-hand inventory in the store to support both self-service and online demand, so it will be worth putting effort into ensuring high quality in the execution of store-replenishment processes already in place. For example, it would seem very prudent to equip each store with an HD-MFC with an inventory on hand checking robot, for example, as supplied by Bossa Nova type robot or the equivalent, and link that near-real-time inventory data to our nightly replenishment planning.

The HD-MFC method may have advantages as compared to the HV-MFC method. In comparing the potential labor savings of the high-density method model to the high-velocity method model, it may be recognized that there is an offset to the labor-savings from automating picks of high-velocity SKUs in the HV model. This offset results from the massive decline in P2G pick-density once the high-velocity SKUs have been removed from these picking routes. By way of example, the cost-per-each of picking the slower-movers manually will be much higher than with picking all SKUs. Once this increase has been factored into the calculations, the HD-MFC's double-touching all or many of the eaches will likely result in at least comparable and probably greater savings in labor costs than single-touching all the eaches in the high-velocity model. Although decanting into the G2P system will require less labor than replenishing the shelf for the batch-picking, that difference will be marginal and temporary, and insufficient to outweigh the very significant additional advantages of the HD-MFC model discussed below.

The above analysis may be applied to grocery. If GM SKUs are to be included in the assortment that can be ordered online, the difference between batch-picking and order-picking will favor the HD solution. For example, a relatively small increase in the size of the HD-MFC will make it possible to include a substantial assortment of GM products in persistent inventory to fulfill same-day orders. By contrast, very few (if any) of the GM SKUs will clear the velocity threshold to be picked G2P in the HV model. Moreover, picking these SKUs to order will require significantly more labor than batch-picking for replenishment.

Beyond potentially lower picking/replenishment labor costs, the HD-MFC method has four major features as compared to the HV method:

First, comparable labor savings can be achieved with a system significantly smaller in size, so capex will be lower-especially when the cost of retail floorspace is included in this calculation.

The HD method eliminates the vast majority of store associates picking eaches concurrently with customers shopping in the store, thereby eliminating a major source of dissatisfaction among self-serving customers. Here, Self-service drop revenues when the proportion of online orders exceeded a threshold of total-store sales. The HV-MFC model is not nearly as effective in removing order-pickers because it still requires the slower movers to be picked-to-order from the floor. Moreover, the number of pickers will continue to increase with demand, and the problem is further exacerbated if the picking of the slower-moving SKUs for spoke stores is being performed at the hub store (which I think is the plan). For example, it wouldn't take much loss of store sales due to this impact on self-service customer experience to cause a lower ROI from HV than from HD.

Because the transfer of all eaches from product-totes into order-totes occurs at the G2P picking station in the HD model (except for bulky eaches), the packing density of order-totes can be increased and the number of order-totes-per-order decreased significantly compared to current metrics, whereas the HV-MFC model might well increase the number of order-totes-per-order. This difference will result in lower storage/dispense costs and especially in lower transportation costs for orders being trucked to spoke stores or to customer homes with HD-MFC model. A separate order-consolidation process to combine the contents of multiple totes for the same order may prove necessary to limit transport costs with the HV-MFC model.

The HD-MFC model is simpler operationally for a number of reasons.

Since a very large majority of the manual each—picking is completely decoupled from customer pick-up or vehicle-dispatch schedules, it will be easier to meet service-level commitments to customers, and ancillary costs of dealing with scheduling variances will be reduced.

The HV-MFC model creates tremendous replenishment complexity. It will require continuous monitoring of—and changes to—the assortment that needs to be in the G2P system in order to consistently pick 80% of eaches. This will be a major challenge and will surely incur additional labor costs to manage. By comparison, the assortment in the HD-MFC model will be far more stable, essentially reflecting most of the store's native assortment, and the primary changes will be in the allocations of subtotes based on changes in SKU velocities.

With the HD-MFC model, the demand signals from the store will include most of the online volume, excluding only the few highest-velocity SKUs, so replenishment challenges will be minimized. Given the continuing complexity of a given Store to replenish the G2P successfully, the HV model could prove to be difficult to make work well enough to achieve the target 80% coverage.

The overall simplicity of the HD-MFC method model is reflected in improved financial models and where implementing the use of sub-totes for example, as disclosed in U.S. Patent Publication No. 2018/0150793 and U.S. Patent Publication No. 2018/0247257 both of which are incorporated by reference herein in their entirety, automated defrag, for example, as disclosed in U.S. Patent Publication No. 2019/0047787 and U.S. Patent Publication No. 2020/0156871, both of which are incorporated by reference herein in their entirety, and AlphaRack as disclosed in U.S. Patent Application No. 63/013,504 incorporated by reference herein in its entirety in addition to previously incorporated references for both methods improves the financial model. High-Density Operating Model Method; HD-MFC Features:
1. Objective: minimize size of structure, i.e. minimize #totes in storage array
2. Maximize SKU density by minimizing #eaches & maximizing #sub-totes per tote
3. Abandon replenishment by cases except for few highest-velocity SKUs
4. Replenish by eaches from store during nightly batch-picking process
5. Replenishment batch-picking is far more labor-efficient than order-picking
    a. One pass through store vs. many passes
    b. Pickers move faster without shoppers in their way
    c. Picking more eaches per order-line
    d. Can use larger carts Q fewer trips
6. Also improves efficiency: automated defrag
7. In future, decant will be automated upstream at DC and MFC can be replenished by subtote
8. Distinction between same-day and next-day orders
    a. Minimum "static" (persistent) inventory required=for same-day orders
    b. Concept of "virtual" inventory: eaches to fill next-day orders can be batch-picked along with replenishment picks
9. Special consideration for Fresh, Frozen, Bulky
    a. Fresh: next-day order-lines batch-picked at night (virtual inventory), same-day order-lines picked to order
    b. Bulky (but "toteable") items picked to order ("starter" totes)
    c. Frozen depends on space constraints
        I. Typically picked to order, with frozen storage in MFC only for order-totes
        II. Can be maintained in static inventory & treated like other packaged goods as space permits Features of HD-MFC vs. HV-MFC:
1. More downwardly scalable
    a. Smaller footprint and capital cost
    b. Size of MFC has minimal impact on labor savings
2. Same or lower operational cost
3. Eliminates nearly all in-store each picking and customer annoyance
4. Enables faster same-day order-completion times to improve customer experience
5. Reduces out-of-stock and substitutions, especially if tied into order-placement front-end "Freestanding" MFC with HD Operating Model (FIG. 4) features:
1. Height enables larger system, smaller footprint
2. Integrated portals reduce capex and improve delivery times
3. Faster installation times
4. Minimizes work needed inside store, disruption to operations
5. Extension to automated remote dispense Referring now to FIG. 3B there is shown a flow diagram 800 for replenishment batch picking. Although flow diagram 800 is described with respect to structure and functions such as order management 808, Alphabot G2P system (MFC) 810, Associate picking application 812 and Store associate 814, any suitable structure or functions can perform the process'. For example, the Alphabot G2P system (MFC) 810 may perform the defrag and tote sub-tote configurations for the pick cart before pre-configured totes with sub-totes are removed from the G2P system for batch picking. By way of further example, robotic picking may be applied instead of utilizing store associates. By way of further example, pre-configured racks with pre-configured totes with sub-totes may interface with the G2P system and store associates such that the pick carts are preconfigured and the entire cart interfaces with the G2P system as opposed to inducting individual totes into and from the G2P system. These examples are merely intended to be exemplary and further examples may be provided from the disclosure by those skilled in the art. Order management 508 drops 516 next day orders which may also include G2P non order (same day allotment for example) forecast. Alphabot G2P system (MFC) 510 receives 518 the orders, generates 520 pick lists for next day orders+same day order allotments and provides 522 pick list and desired tote sub-tote type for each SKU. Associate picking application 512 generates 524 pick walks. Store associates 514 configure 526 pick carts with totes and sub-totes, batch pick 528 items from the store shelf and induct 530 totes into the G2P system. Associate picking application 512 provides 532 SKU-Tote-sub-tote association. Alphabot G2P system (MFC) 510 provides 534 delivery of empty totes and pickup of filled product totes and updates 536 inventory in the G2P system while store associate 514 pulls 538 empty totes out and inducts filled totes with respect to the G2P system. Associate picking application 512 determines if 540 all pick walks are complete. If yes then the batch replenishment pick sequence is complete 542; if no then carts are further configured 526 for further batch picking of items from the store shelves.

Replenishment general rules and assumptions may be applied. For example, SKUs with average daily sales volume>threshold case qty may be replenished by case via the Decant process. As a further example, SKUs with average daily sales volume<threshold case qty may be replenished by each via the Replenishment Picking or Sub-Case Decant process. As a further example, Reference Replenishment Calculations may be provided for replenishment type and quantities by SKU. As a further example, next day orders may be dropped to Alphabot G2P system simultaneously or in batches based on dispense schedule. As a further example, Orders may not be modified by the customer after the order is dropped to Alphabot. These examples are merely intended to be exemplary and further examples may be provided from the disclosure by those skilled in the art.

Replenishment picking rules and assumptions may be applied. For example, Replenishment picking may be completed before order picking can begin. As a further example, Alphabot G2P may provide a pick-list consisting of all replenishment quantities by SKU. As a further example, Same day order allotment may be equivalent to average units per day plus a buffer to achieve a high service level. As a further example, Alphabot G2P may provide a desired tote/sub-tote type by SKU. As a further example, Associate Picking Application may generate a pick walk based on store planogram. As a further example, Associate Picking Application may track the completion of pick walks. As a further example, Associates may pull empty totes out of Alphabot G2P to configure pick carts. As a further example, Alpharack as described may be used as a removeable part of the G2P to enable higher tote induction speeds and further reduce labor. These examples are merely intended to be exemplary and further examples may be provided from the disclosure by those skilled in the art.

Referring now to FIG. 4, there is shown an exemplary store site format 410 that leverages the disclosed methods. Site format 410 resides on a given site 416 where site 416 may have inventory managed by inventory management computing device 420 and host store 418 complete with receiving area 422, storage area 424 and sales floor 428. Host store 418 may be situated along a parking lot 426 where G2P system 430 is deployed in the parking lot 426. System 430 may be sized to serve the orders for the host store 418. System 430 may be on the order of 10,000-12,000 tote positions but sized appropriately to stock nearly the entire assortment of non-frozen packaged goods of host store 418 because of the high SKU density.

The operating model for site 410 would be to set a threshold of order volume below which the site would do all manual fulfillment, and then install system 430 once order-volume hits that threshold. That threshold may be around 200 orders per day initially. Alternately, five hundred orders per day will be a relatively high single-store volume today, but demand can be expected to continue to increase.

Placing G2P system 430 inside store 418 may be an option, but site 410 is configured to construct system 430 as a standalone machine to be installed in an area of the parking 426 lot near to the side of the store 418, for example, the grocery side of the store. Here, not every store has room inside it for an each—picking system, but every store has a parking lot. Customer access portals 432 may run the length of the structure on both sides, with a pull-in parking space directly in front of each portal. At one end will be a truck dock 434 for loading vans ferrying order totes between the store and Remote Auto Dispense units. This parking-lot deployment strategy has several features:

The machine may be tall: typically about 35 feet high, but may go to 45 feet for a very busy store that needs more storage and/or throughput. Expanding vertically gives more throughput by adding tiers of deck connections at a much lower incremental cost than expanding horizontally by adding more aisles. It also minimizes footprint, which makes it quite feasible to put into the parking lot. A typical footprint will probably be on the order of 130' long×30' wide for a total 4,000 sf. There may be one basic 3-aisle topology that can be scaled to different heights and aisle-lengths to meet throughput and storage requirements.

Attaching the customer pick-up portals 432 directly to the picking system maximizes service level, i.e. minimizes delivery latency. For example, a 130' length would support at least 20 portals. Even at a dwell time of 10 minutes per order, this would yield a theoretical maximum throughput of 120 orders per hour. A more customer-friendly drive-through option may be provided as well.

System 430 may be classified as a machine rather than a building designed for general human occupancy reducing the supply of parking space by a relatively small number offset by reduced demand for parking spaces by a far greater magnitude.

System 430 may be erected in the parking lot much more quickly and at lower total cost to the retailer than inside the existing store. This design can also be readily adapted to the remote automated dispense ("RAD") application, and any RAD can be fed by any store at any time. The latter feature may prove useful in balancing workloads across a network of stores and RADs.

Customer order-lines for ambient and chilled packaged goods may be picked by G2P system 430 at ambient workstations. Optionally picking pre-packaged fresh goods (with barcoded price) may be provided and although they may be supported, some goods may be store picked, for example, store picking of frozen goods may be provided because they are the least costly SKUs to pick in the store. Here, frozen and typically fresh products (and only those products) may be picked to customer order inside the store. Customer orders of frozen SKUs may be picked into Chilled Totes and then inducted 434 into the Alphabot system to be placed into chilled or even ambient storage pending customer arrival.

Bot transit rails 434 may connect system 430 and the store 418 so that bots can receive inbound filled customer and replenishment order totes and deliver empties to associates via a single aisle of static workstations ("SWSs") 438 inside the store. These workstations may be as described in U.S. patent application Ser. No. 16/642,119 having a filing date of Jan. 14, 2020 and entitled "SYSTEM HAVING WORKSTATION WITH TOTE RETENTION AND RELEASE MECHANISM" which is incorporated by reference herein in its entirety.

The SWSs 438 may be dual-level like tote-wall because half of the tote transfers will be empty order totes being dispensed to pickers, while the other half may be filled customer/replenishment order totes being inducted. (Instead of dual-level SWS, these two functions may be performed on opposite sides of the aisle.) This aisle may include two zones: frozen and chilled (or possibly frozen and ambient). The frozen section will be where the chilled totes will be charged. The chilled (or ambient) zone will be where the limited amount of decanting is performed for the highest-velocity chilled and ambient SKUs being replenished by case. The large majority of replenishment picking stock will be inducted into the system in multi-SKU totes filled by replenishment picking. We must think through the introduction of AlphaRack and the design of these picking carts.

Chilled tote handling and automated tote-defragmentation using a Cartesian robot within system 430 may be provided as disclosed in US Patent Application Publication Number US2020/071076 having a publication date of Mar. 5, 2020 and entitled "Tote Handling for Chilled or Frozen Goods" and US Patent Application Publication Number US2019/0047787 having a publication date of Feb. 14, 2019 and entitled "UNIVERSAL GRIPPER FOR TOTE AND SUB-TOTE TRANSPORT" both of which are incorporated by reference herein in their entirety.

INCORPORATED MATERIAL

As noted above, the present technology may be used in the context of order fulfillment and automation-based technology, at least some of which is disclosed in published applications previously incorporated by reference and at least some of which is set forth below.

Figure 5:
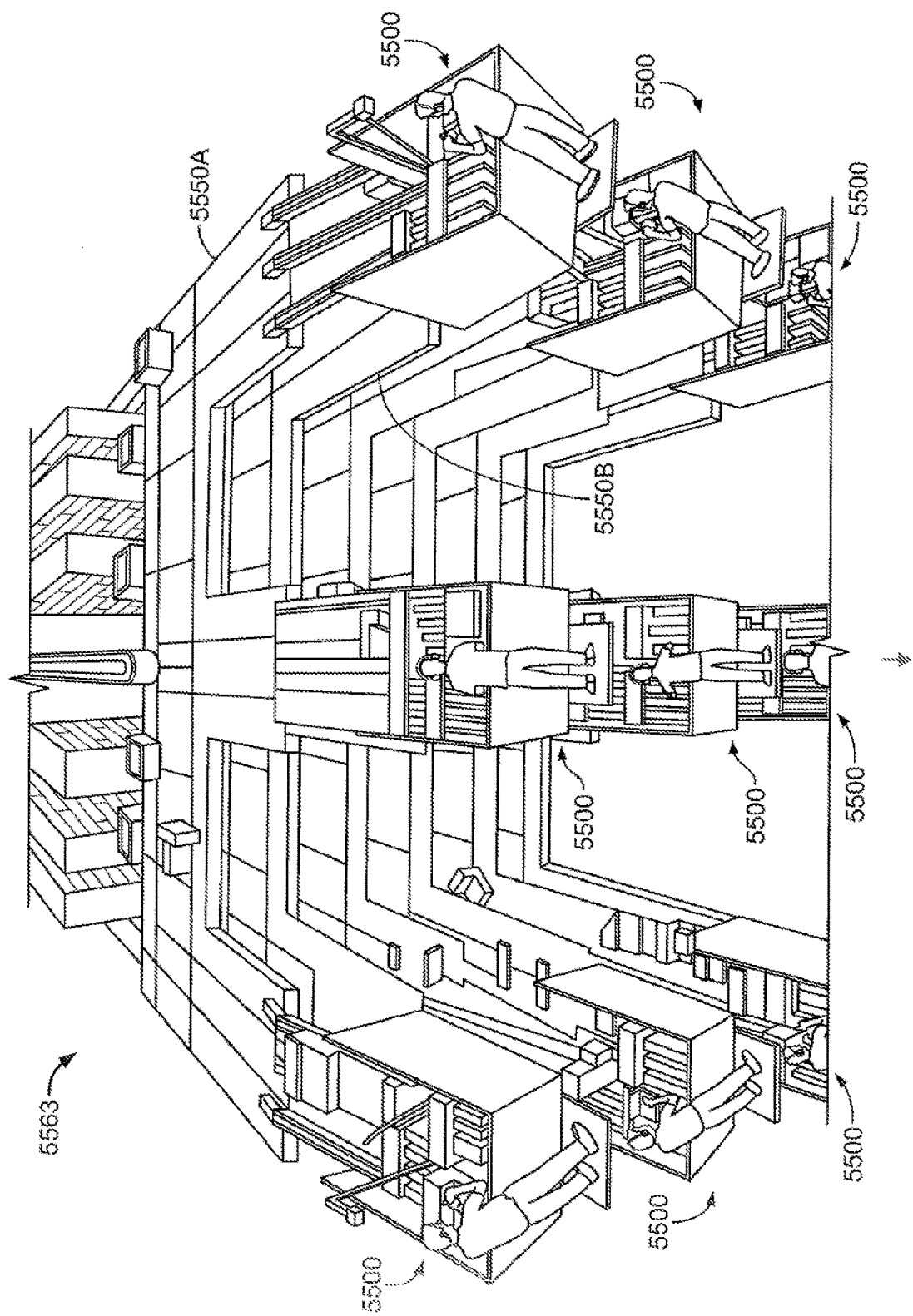
Figure 6:
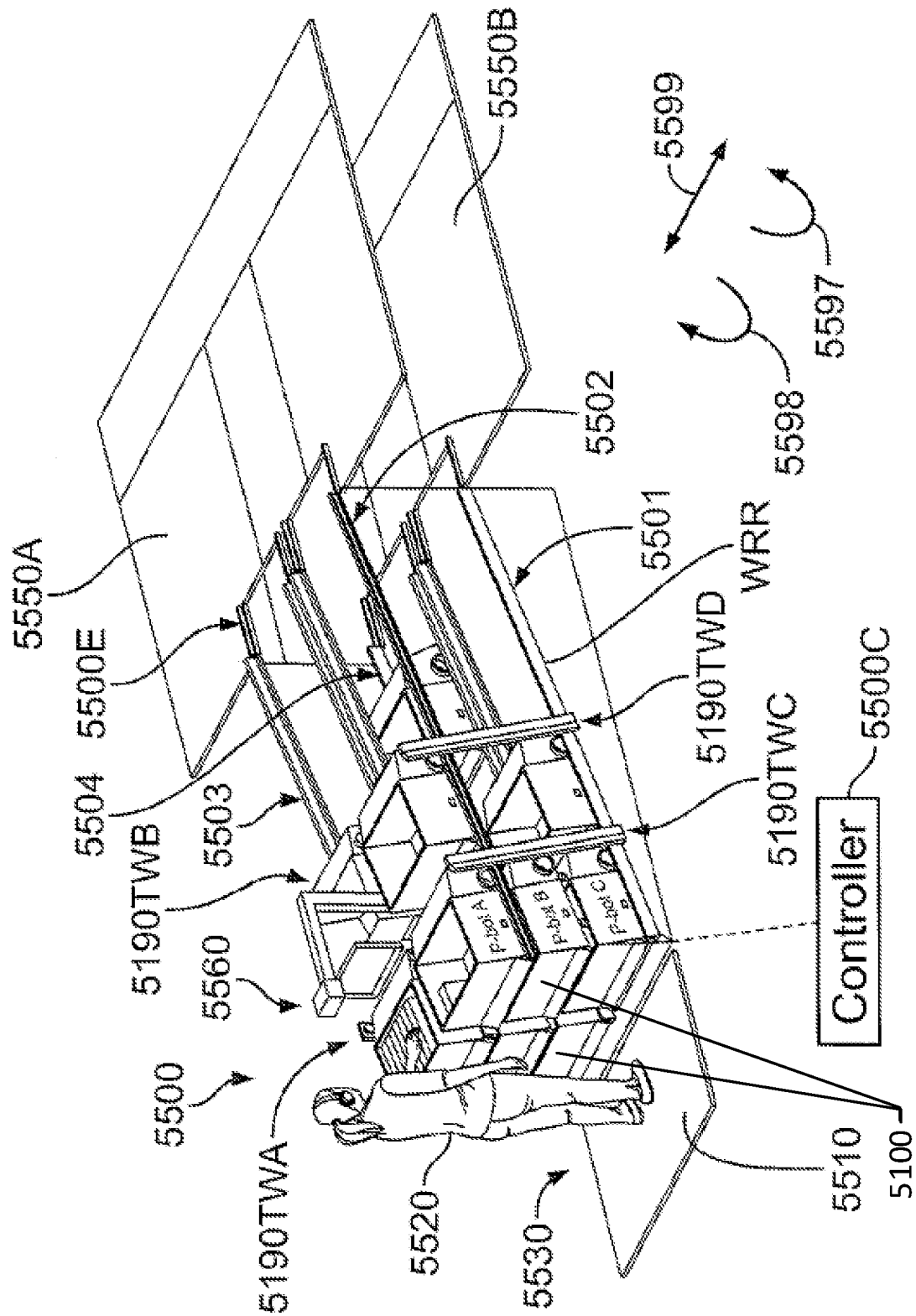

U.S. Patent Publication 2017/0313514 discloses a system including workstations, a deck and storage locations as shown in FIGS. 5 and 6. FIG. 5 illustrates an exemplary configuration of workstations 5500 where at least three workstations 5500 are disposed on each storage level, while in other aspects any suitable number of workstations may be disposed on each storage level. The workstations 5500 for the different levels may be vertically offset from one another such as being stacked one above the other or stacked in a staggered arrangement. In one aspect, each workstation 5500 is communicably connected to two transit decks 5550A, 5550B, while in other aspects each workstation 5500 may be communicably connected to any suitable number of transit decks. In one aspect, each transit deck 5550A, 5550B may correspond to a respective storage level while in other aspects the transit decks 5550A, 5550B may correspond to a common storage level (e.g. there is more than one transit deck associated with each storage/picking level). In another aspect, there may be towers that are located on or otherwise connected to (or disposed within) the transit decks (or aisles) that communicably connect one or more of the transit decks 5550A, 5550B (or aisles) of the different storage levels to from a travel loop with another tower so that bots 5100 (FIG. 6) may travers between the stacked transit decks 5550A, 5550B (or aisles) to any desired/predetermined level of the storage structure. The workstations 5500 are configured to accommodate a picker 5520 that transports one or more eaches from a tote (e.g. a P-tote) on one of the bots 5100 to a "put" location in a tote (e.g. an O-tote) on another one of the bots 5100. The workstations 5500 may be arrayed at multiple elevations where human or robotic pickers remove eaches from product Totes (P-totes) and place them into either order Totes (O-totes) or a mobile robot, depending on the system configuration and in a manner substantially similar to that described above. A workstation 5500 is disposed at each transit deck level so that bots 5100 on each transit deck have access to a workstation 5500. In the exemplary aspect illustrated in FIG. 5, six transit deck levels are shown, with two levels each being connected to a common workstation 5500. However, in other aspects any suitable number of transit deck levels may be connected to a common workstation 5500.

FIG. 6 shows a workstation 5500. Each of the conveyance lanes 5501, 5502, 5503, 5504 has a respective entry and/or exit 5500E in communication with a respective transit deck 5550A, 5550B. As can be seen in FIG. 54 conveyance lanes 5501, 5504 have entry/exits 5500E in communication with transit deck 5550B while conveyance lanes 5502, 5503 have entry/exits 5500E in communication with transit deck 5550A. The conveyance lanes 5501-5504 include rails WRR. As can also be seen in FIG. 6 elevation towers 5190TWA-5190TWD connect stacks of conveyance lanes to each other. As an example, elevation towers 5190TWA, 5190TWB connect conveyance lanes 5503, 5504 so that bots 5100 can traverse between the conveyance lanes 5503, 5504. Elevation towers 5190TWC, 5190TWD connect conveyance lanes 5501, 5502 so that bots 5100 can traverse between the conveyance lanes 5501, 5502.

In one aspect, one or more of the conveyance lanes 5501-5504 and towers 5190TWQ-5190TWD may be angled (e.g. tilted or raked) relative to the transit decks 5550A, 5550B and the operator platform 5510 so that when the P-totes and O-totes are presented to the picker 5520 by the respective P-bot and O-bot, the P-totes and O-totes are angled so that the picker 5520 can view and access the P-totes and O-totes for picking and placing eaches from pick/place positions defined by the towers 5190TWQ, 5190TWC adjacent the pick station 5530. In other aspects, the conveyance lanes 5501-5504 and towers 5190TWA-5190TWD may have any spatial relationship with the pick station 5530 and/or transit decks 5550A, 5550B for presenting the totes to the picker 5520 in any suitable spatial orientation.

In one aspect, the conveyance lanes 5501-5504, the elevation towers 5190TWA-5190TWD and the pick station 5530 have a symmetric structure with independent product bots (P-bots) and order bots (O-bots) paths and positions. In this aspect there may be lateral symmetry (in direction 5599) so that there is a left/right symmetrical arrangement. For example, the left/right symmetrical arrangement may be such that P-bots carrying P-totes are arranged on the right side of the workstation 5500 while O-bots carrying O-totes are arranged on the left side of the workstation 5500. In other aspects, the P-bots and P-totes may be on the left side of the workstation 5500 while the O-bots and O-totes are on the right side of the workstation 5500.

In one aspect, there are dedicated bot flow entry and exit conveyance lanes for both the P-bots and O-bots. For example, the flow of bots to the pick station 5530 may be such that the bots travel from lower conveyance lanes to upper conveyance or in other aspects, from upper conveyance lanes to lower conveyance lanes. For example, where bots travel from lower conveyance lanes to upper conveyance lanes, P-bots carrying eaches to be picked enter one or more lower/bottom conveyance lane(s) 5501, traverse tower 5190TWC to one or more upper conveyance lane(s) 5502 so that the each(es) can be picked where the P-bot exits the workstation using the one or more upper conveyance lane(s) 5502. Similarly, e.g., O-bots carrying O-totes to which eaches are to be placed enter one or more lower/bottom conveyance lane 5504, traverse tower 5190TWA to one or more upper conveyance lane(s) 5503 so that the each(es) can be placed where the O-bot exits the workstation using the one or more upper conveyance lane(s) 5503. In other aspects, the entrance of bots to the workstation may be timed such that the bots can enter and exit from both the upper conveyance lanes 5502, 5503 and the lower conveyance lanes 5501, 5504 where the towers 2190TWA-5190TWD are employed to route bots past one another such as when bots are entering and exiting a common conveyance lane 5501-5504. In the examples, described above, the flow of P-bots carrying P-totes and the flow of O-bots carrying O-totes are both generally in a common direction, such as both in the direction of arrow 5598 from lower conveyance lanes to upper conveyance lanes or both in the direction of arrow 5597 from upper conveyance lanes to lower conveyance lanes. However, in other aspects, the flow of one or more of the P-bots and O-bots may be in the direction of arrow 5597 from upper conveyance lanes to lower conveyance lanes. For example, the flow of P-bots and P-totes may be in the direction 5598 while the flow of O-bots and O-totes may be in the direction 5597 or vice versa.

In one aspect, each side of the workstation 5500 (e.g. the product side and the order side) has dedicated flow direction elevation towers. For example, elevation tower 5190TWC on the product side of the workstation 5500 may be dedicated to the upward flow of bots while elevation tower 5190TWD on the product side of the workstation 5500 may be dedicated to the downward flow of bots or vice versa. Similarly, elevation tower 5190TWA on the order side of the workstation 5500 may be dedicated to the upward flow of bots while elevation tower 5190TWB on the order side of the workstation 5500 may be dedicated to the downward flow of bots or vice versa. The dedicated flow of bots for each tower 5190TWA-5190TWD on the respective order or product side of the workstation 5500 generates, for example, an elevation flow loop in one or more of directions 5597, 5598 between the levels of conveyance lanes 5501-5504 on the respective order and product sides of the workstation 5500 in a manner substantially similar to that described above. As noted above, while only two conveyance lanes are shown stacked one above the other on each side of the workstation, in other aspects, each side of the workstation may have any suitable number of conveyance lanes stacked one above the other, such as more or less than two conveyance lanes. Where more than two conveyance lanes are provided, stacked one above the other, on the product side and/or the order side of the workstation 5500 the towers 5190TWA-5190TWD may have intermediate entrance and exits that allow bots to enter/exit the towers from the intermediate conveyance lanes disposed between the uppermost and lowermost conveyance lanes 5502, 5501 of the stack of conveyance lanes.

Figure 7A:
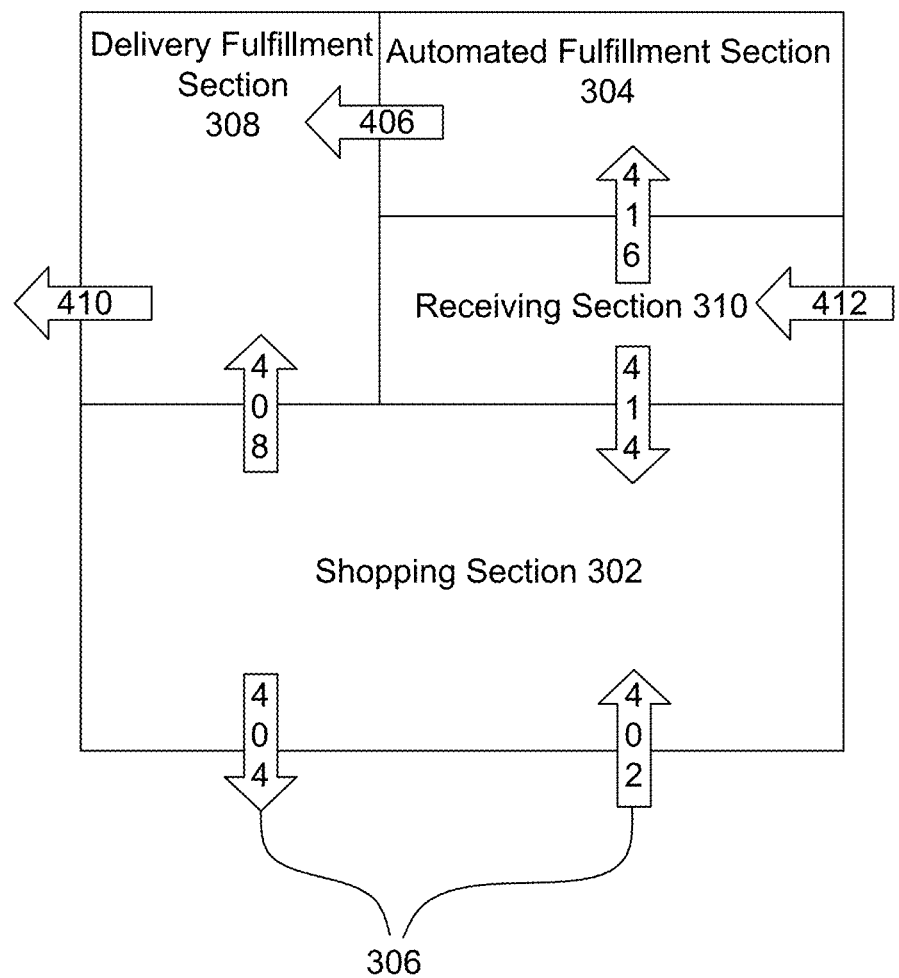

Referring to U.S. Patent Publication No. US2018/0134492, FIG. 7A depicts a representative conceptual internal layout of the store 300 and how each of the areas of the store 300 relates to one another. In particular, FIG. 7A depicts the shopping section 302, the automated fulfillment section 304, a delivery fulfillment section 308, and a receiving section 310. Although the different areas represented in FIG. 7A are represented within a single plane, the areas can be divided on multiple floors of a store 300. During operation of the store 300, all transactions occur through one or more of these areas. In accordance with an example embodiment of the present invention, customers utilize the entrances 306 to enter 402 and exit 404 the shopping section of the store 300. Once inside the shopping section 302 of the store 300, customers can place orders for goods to be fulfilled by the automated order fulfillment and can shop for non-fungible goods within the non-fungible goods fulfillment section of the store, as discussed in greater detail herein.

Customer orders to be fulfilled by the automated order fulfillment will be processed by the automated system within automated fulfillment section 304, as discussed in greater detail herein. When the automated order fulfillment has been completed, the automated picked goods will be provided 406 to the delivery fulfillment section 308, as discussed in greater detail herein. Similarly, when customers have completed picking non-fungible goods within the shopping section 302, the customers will provide 408 the goods to the delivery fulfillment section 308, as discussed in greater detail herein. For example, the customers can place a tote or basket with their goods through a window to the delivery fulfillment section 308. At the delivery fulfillment section 308 goods provided 406 from the automated fulfillment section 304 and goods provided 408 from the shopping section 302 will be combined into a single order for delivery 410 to the customer, as discussed in greater detail herein.

Continuing with FIG. 7A, the store 300 can include the receiving section 310 for receiving goods from various suppliers and/or manufacturers. The receiving section 310 can be included within a "back end" of the store that is not seen by customers. When goods are delivered to the receiving section 310 the goods are identified as non-fungible goods for storage within the shopping section 302 or fungible goods for storage within the automated fulfillment section 304. The non-fungible goods will be transferred 414 to the shopping section and stored in a manner to provide non-fungible goods fulfillment. Similarly, the fungible goods will be transferred 416 and stored in a manner suitable for automated order fulfillment (e.g., stored in totes and place into a storage rack).

Figure 7B:
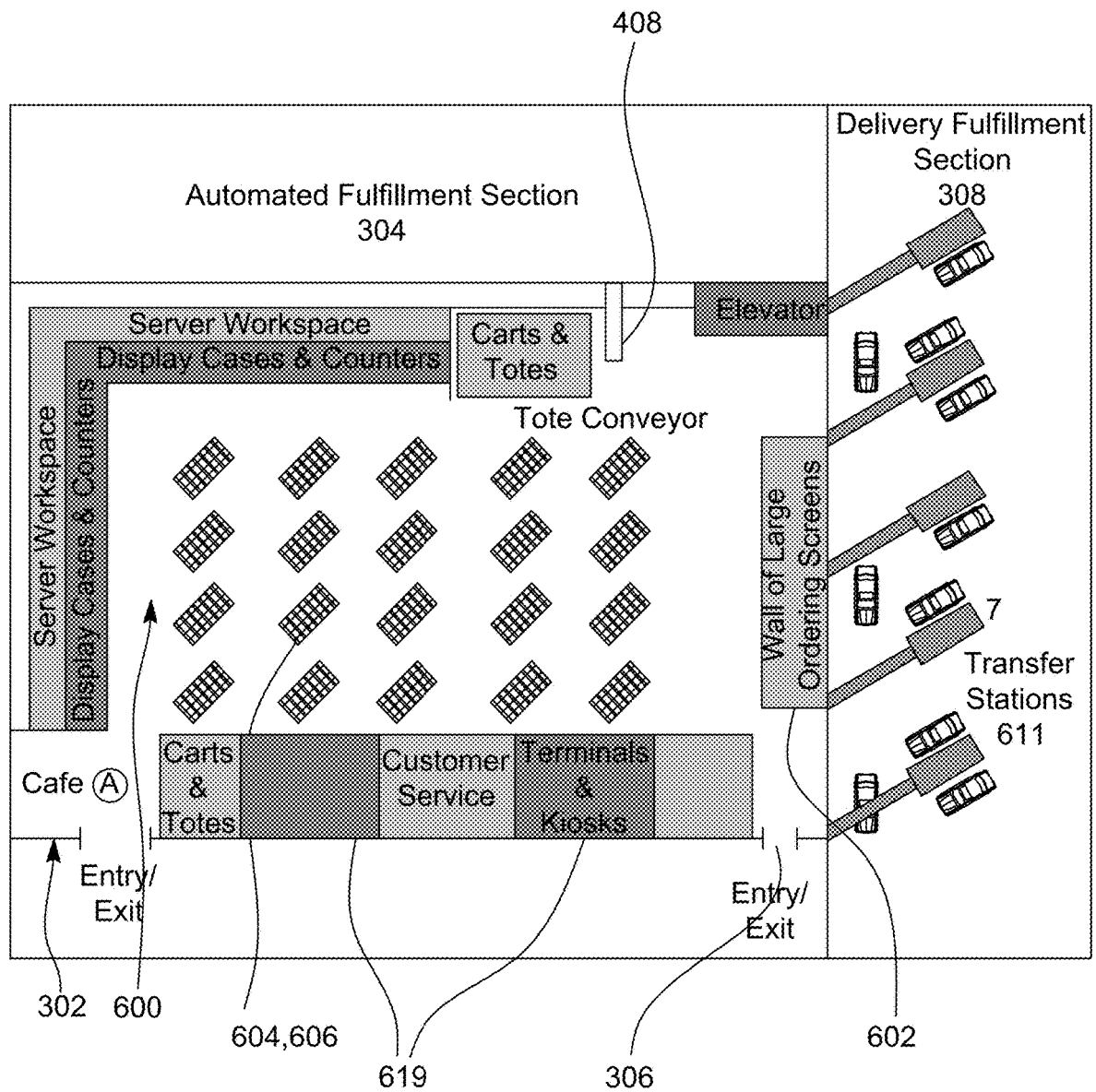

FIG. 7B depicts a more detailed view of the internal structure of the store 300 as discussed with respect to FIG. 7A. In particular, FIG. 7B depicts a detailed view of the shopping section 302, the delivery fulfillment section 308, a plan view of the automated fulfillment section 304, and how those sections relate to one another. The shopping section 302, as depicted in FIG. 7B, includes entry and exit points 306, a mock market 600, and a pass through 408 to the automated fulfillment section 304. The mock marketplace 600 includes a wall of ordering screens 602, a plurality of physical shelving units 604 and display cases of stands 606, and a plurality of shopping terminals and checkout kiosks 619. As would be appreciated by one skilled in the art, the mock marketplace 600 can include any combination of the elements depicted in FIGS. 7A-7C. Additionally, FIG. 7B depicts the delivery fulfillment section 308 of the store 300. The delivery fulfillment section 308 includes a plurality of transfer stations 611 which completed orders of goods are delivered for acceptance by customers.

Figure 7C:
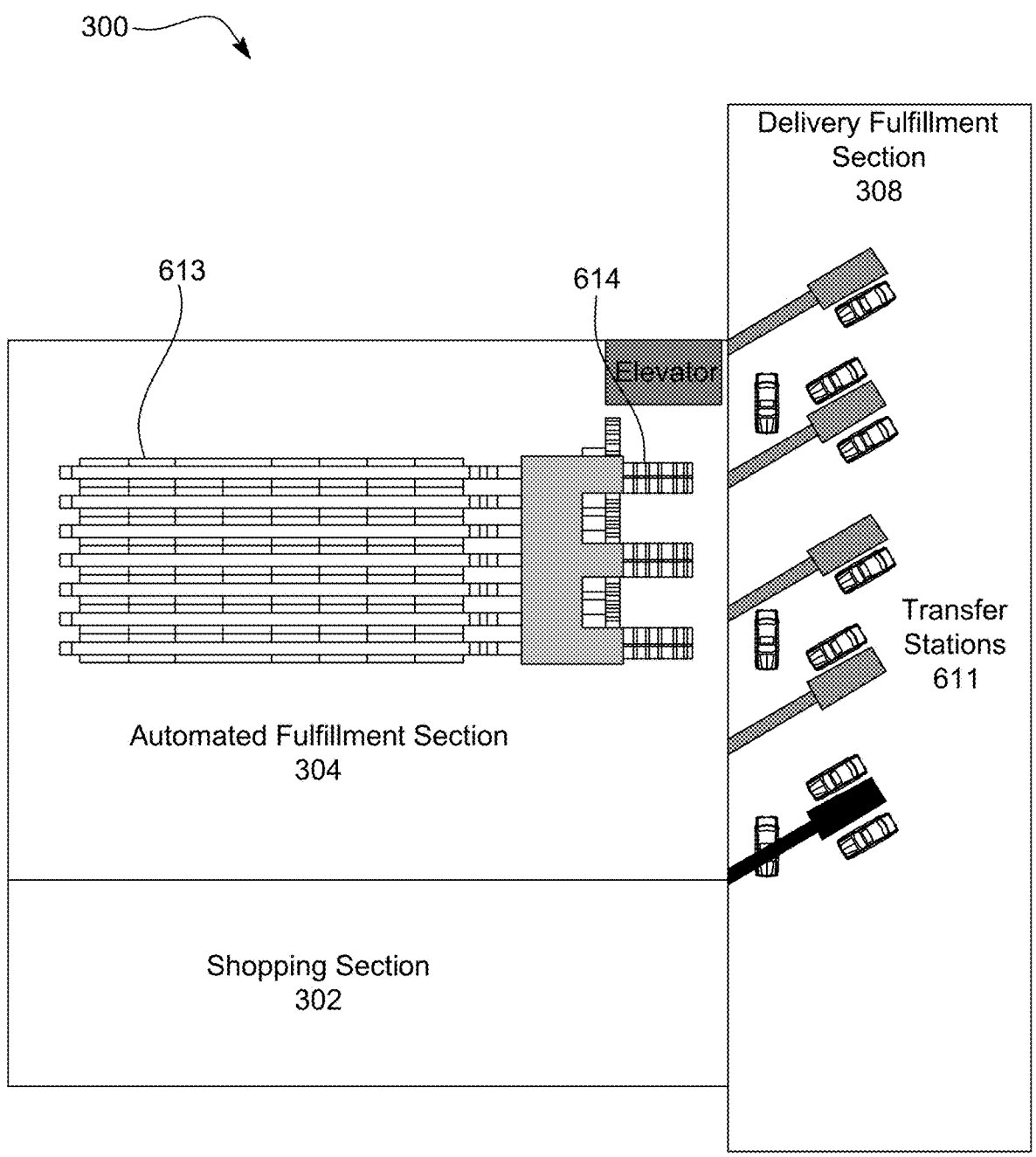

FIG. 7C depicts a more detailed view of the automated fulfillment section 304, the delivery fulfillment section 308, a basic view of the shopping section 302, and how those sections relate to one another. The automated fulfillment section 304 includes the storage rack 613 system configured to hold totes of inventory accessible by the robots and further configured to enable the robots to pull inventory totes and deliver the totes to pickers at picking workstations 614 for automated order fulfillment. In accordance with an example embodiment of the present invention, the delivery fulfillment section 308 includes a consolidation section in which goods from the automated fulfillment section 304 and goods from the shopping section 302 are combined and consolidated into order totes for delivery to customers at the transfer stations 611. As would be appreciated by one skilled in the art, the consolidation can occur within the same physical space as the automated fulfillment section 304 or in a separate physical space.

In accordance with an example embodiment of the present invention, the store 300 of the automated-service model 100 includes a "front end" including an entry lobby, the shopping section 302 for non-fungible-goods, and associated work areas. As would be appreciated by one skilled in the art, the front end does not necessarily need to be located at a front of the store 300 or on a ground level of the store 300. The vast majority of floor space within the shopping section 302 is devoted to a non-fungible-goods market (e.g., produce, fresh goods and other non-fungible goods) and associated work spaces, which can be the focal point of the store 300 from a customer perspective. The shopping section 302 includes "non-fungible" goods such as produce, meat, seafood, many cheeses (primarily random-weight), deli, floral, bakery, and prepared foods. Typically, non-fungible goods will be sold from display fixtures or stands 606 with as many as three different pricing methods, including but not limited to "random dollar" (fungible with a price barcode), random weight (loose items, especially produce, priced based on item weight), and random count (loose items priced based on number of eaches). These non-fungible goods can also be sold at service counters that offer the customer more opportunity to customize ordered products according to their individual tastes and preferences.

In accordance with an example embodiment of the present invention, the shopping section 302 of the store 300 is similar in appearance to perimeter departments within traditional self-service grocery stores with technology enhancements, related to the automated-service model, to improve customer convenience and reduce retailer operating costs. The technological improvements for the shopping section 302 are primarily related to how customers shop for goods and exchange funds for those goods. One such technological improvement is the implementation of shopping terminals to be utilized in combination with the automated-service model. The shopping terminals are devices utilized by customers as the primary interface to select, scan, enter, and/or store goods for an order to be placed during shopping trip, including an exchange of funds for the order. In particular, the shopping terminals can be utilized to place orders for both fungible goods (to be picked by the automated order fulfillment) and non-fungible goods within the non-fungible goods fulfillment.

As would be appreciated by one skilled in the art, the shopping terminals can be any device configured to identify a particular good (e.g., via scan, photo, etc.) to be added to a shopping list. For example, the shopping terminals can be a portable scanning device or one or more fixed touch screens located within the shopping section 302.

Referring to U.S. Patent Publication Nos. US2018/0150793 and US2018/0194556, FIGS. 8A, 8B, 8C and 8D show an example embodiment of the present invention where customer orders for fungible goods are fulfilled by an automated system within automated fulfillment section 204. When the order for automated fulfillment has been completed, the totes 1232 containing the fungible goods picked by the automated mobile robots 122 and pickers 1234 will be provided to the delivery fulfillment section 208 (e.g., via path 408). Similarly, when customers have completed picking non-fungible goods within the shopping section 202, the customers will provide the goods to the delivery fulfillment section 208 (e.g., via path 410). In accordance with an example embodiment of the present invention, the delivery fulfillment section 208 includes a consolidation section 240 in which goods from the automated fulfillment section 204 and goods from the shopping section 202 are combined and consolidated into order totes 1232 for delivery to customers at one or more transfer stations 1242.

At the consolidation section 240 of the delivery fulfillment section 208, the fungible goods provided from the automated fulfillment section 204 and non-fungible "fresh goods" provided from the shopping section 202 will be combined into a single order for delivery to the customer at a transfer station 1242. In particular, the consolidation section 240 includes a merge module that combines eaches of goods picked from the automated fulfillment section 204 with eaches of goods picked from the shopping section 202 deposited at the one or more goods drop-off transfer stations 1242. The combined eaches of goods from both sections 202, 204 form a delivery bundle (e.g., one or more totes 1232 of goods) and the automated mobile robots 122 transfer the completed delivery bundle to transfer station 1242 which receives and stores a delivery bundle in a designated location until a customer arrives to take possession of the delivery bundle.

In accordance with an example embodiment of the present invention, during consolidation, a plurality of automated mobile robots 122 are tasked to retrieve totes 1232 of goods from the various sections 202, 204, and transfer those totes 1232 to the merge module of the consolidation section 240. Based on the quantity of goods, one or more of the plurality of automated mobile robots 122 or one or more new automated mobile robot(s) 122 can retrieve the delivery bundle and transfer the bundle to the appropriate transfer station 1242. Each of the tasks as it related to FIG. 8A is carried out within the delivery mode of operation with different task demands provided to each of the automated mobile robots 122 performing each specific task (e.g., delivering goods from the shopping section 202, delivering goods from the automated fulfillment section 204, delivering the completed delivery bundle to the transfer station 1242, etc.). As would be appreciated by one skilled in the art, the consolidation can occur within the same physical space as the automated fulfillment section 204, the delivery section 208, or in a separate physical space.

Figure 8B:
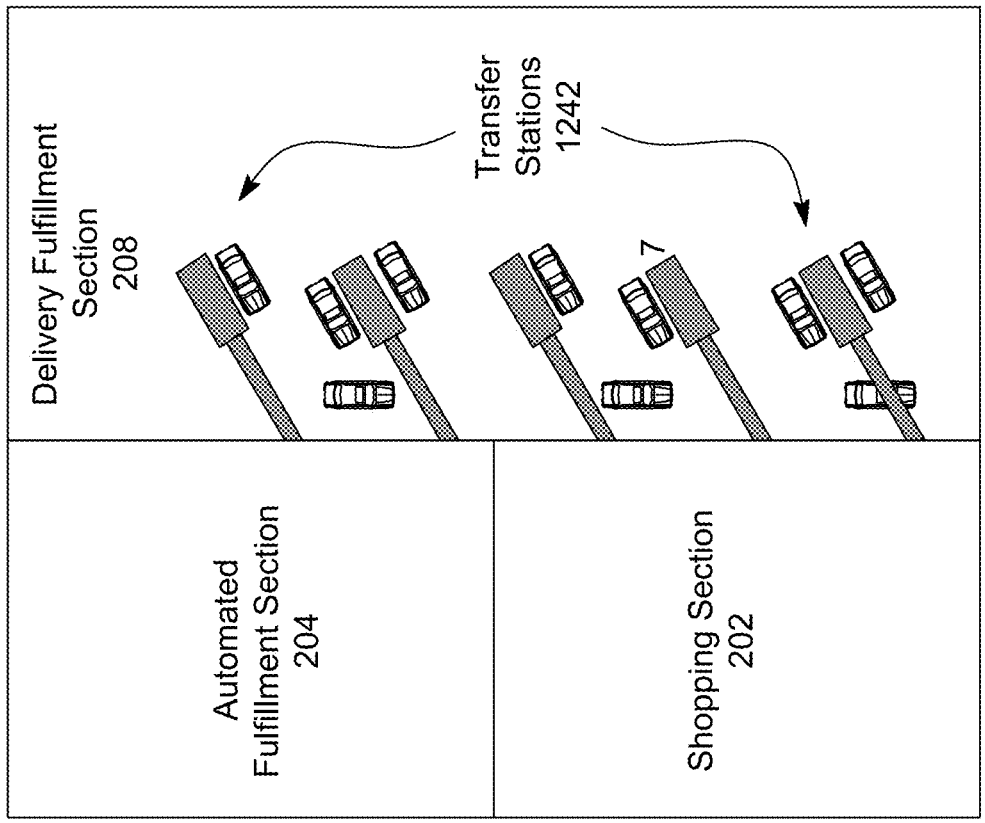

FIG. 8B depicts an exemplary view of the delivery fulfillment section 208 and a conceptual relation of the delivery fulfillment section 208 to the automated fulfillment section 204 and the shopping section 202. In accordance with an example embodiment of the present invention, the delivery fulfillment section 208 includes a plurality of transfer stations 1242 configured for customers to pick-up their orders. The transfer stations 1242 are configured for the delivery of the goods directly to a customer or customer vehicle in a variety of ways.

Figure 8C:
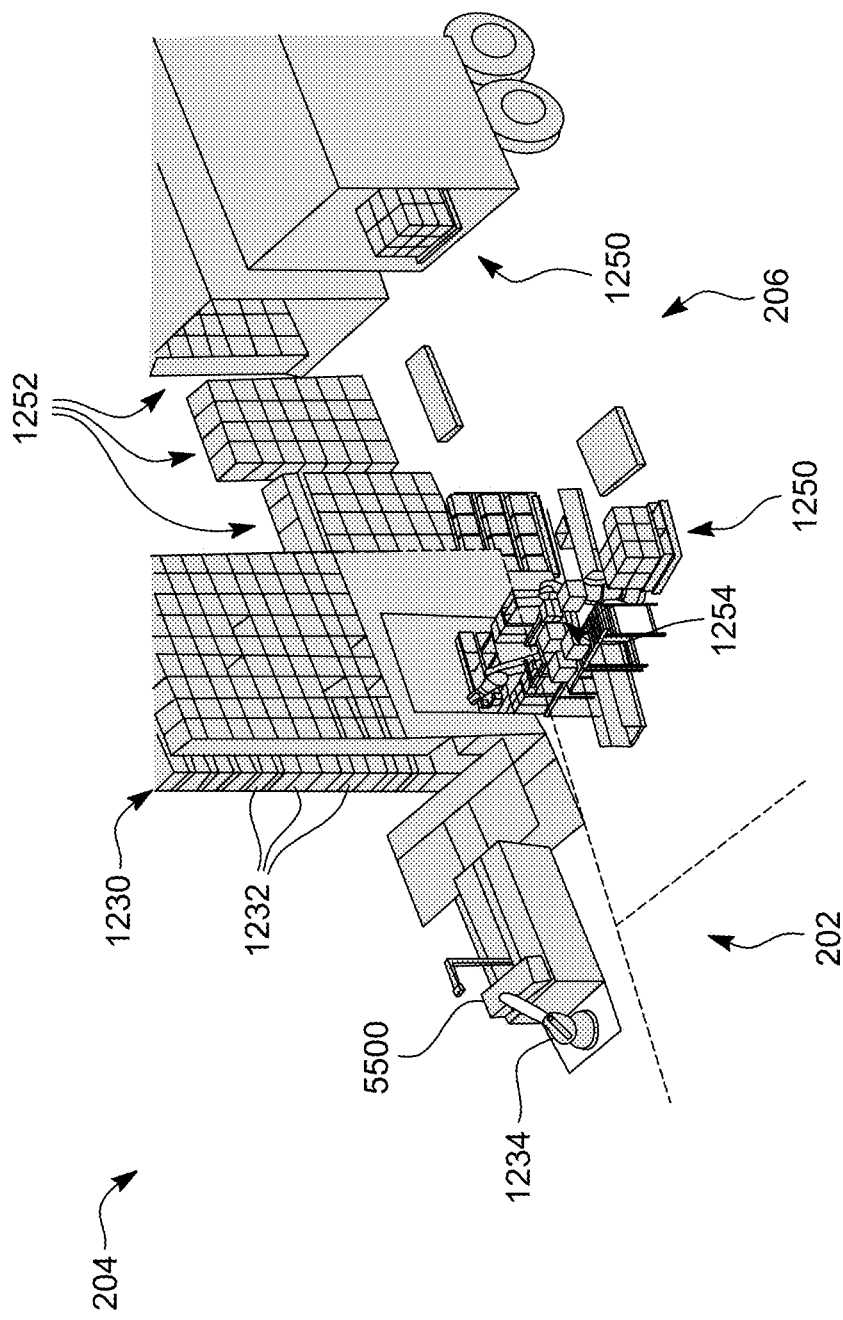

In accordance with an example embodiment of the present invention, the replenishment section 206 of the automated store 300 is configured to receive shipments of goods from various suppliers and/or manufacturers. The replenishment section 206 is included within a "back end" of the store that is not typically seen by customers. FIG. 8C depicts an exemplary view of the replenishment section 206 and the relation of the replenishment section 206 to the other sections of the automated store 300. In particular, FIG. 8C depicts the replenishment section 206 including a docking area for receiving cases of goods (e.g., via truck). In accordance with an example embodiment of the present invention, the cases of goods can be received either as pallets of cases 1250 or as portable racks of totes 1232 with goods stored therein. The portable racks 1252 of totes 1232 can be received from a distribution center designed for implementation with the automated store 300. Initially, regardless of shipping method, when goods are delivered to the replenishment section 206 the goods are identified as non-fungible goods for storage within the shopping section 202 or fungible goods for storage within the automated fulfillment section 204. Based on the determination of fungible goods or non-fungible goods, the received items will be allocated to the designated areas accordingly. In particular, the non-fungible goods will be transferred to the shopping section 202 (e.g., via path 406) and the fungible goods will be transferred (e.g., via path 404) and stored in a manner suitable for automated order fulfillment (e.g., stored in totes 1232 and placed into the storage rack 1230).

Figure 8D:
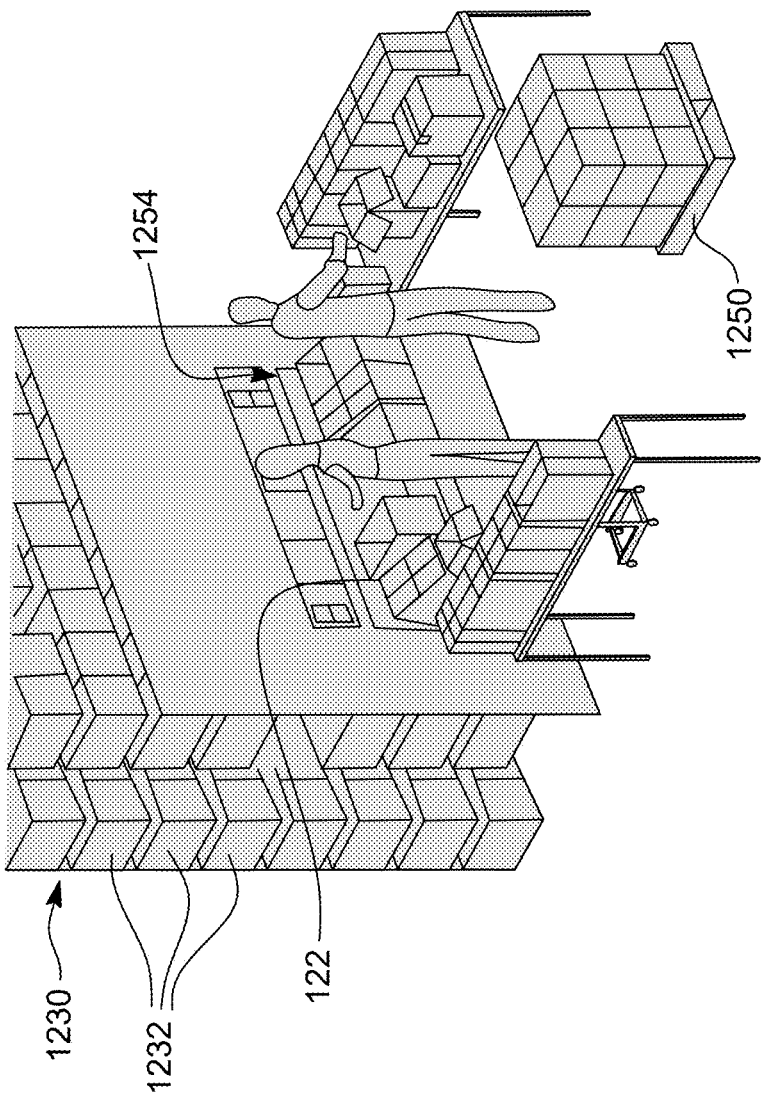

As would be appreciated by one skilled in the art, depending on if the goods are received by pallets of cases 1250 of portable racks 1252 or totes, the items will be received into inventory of the automated fulfillment section 204 through different methodologies. In accordance with an example embodiment of the present invention, the replenishment section 206 includes a decanting station 1254 configured to replenish goods to the automated fulfillment section 204, as depicted in FIG. 8D. The decanting station 1254 can be utilized to replenish goods received from manufacturers, suppliers, and returns from customers. The decanting process includes transferring products from pallets of cases 1250 and/or customer returns into totes 1232 to be stored within the storage rack 1230 of the automated fulfillment section 204.

In operation, the automated mobile robots 122 are configured to assist and/or carry out various operations throughout the automated store 300. Each of the various operations is carried out by allocating (e.g., via the central controller) the automated mobile robots 122 in one or more modes of operation. The modes of operation include, but are not limited to, a replenishment mode, a defragmentation mode, an order fulfillment mode, and a delivery mode. The replenishment mode includes receiving eaches of goods and depositing the eaches of goods in designated storage totes and/or storage locations within the storage rack 1230, the defragmentation mode includes organizing totes 1232 and consolidating sub-totes stored within totes 1232, the order fulfillment mode includes retrieving order totes from the storage rack 1230 and delivering the order totes to the delivery section 208, and the delivery mode includes receiving delivery bundles and transporting the delivery bundles to designated locations at the pick-up transfer stations 1242. In accordance with an example embodiment of the present invention, each of the different modes of operation is executed by an automated mobile robot 122 of the same design. In other words, a single automated mobile robot 122 is capable of carrying out the tasks required by each of the modes of operation without modification.

In accordance with an example embodiment of the present invention, the totes 1232 are interchangeable and are designated with different identifiers for the automated mobile robots 122. That is, while the totes 1232 are the same structurally such that they are interchangeable in the tasks that the totes 1232 can be utilized for based on the designation associated therewith. The totes 1232 are designated based on their capacity as well as the mode of operation in which they are being utilized. In particular, the interchangeable totes 1232 are designated as empty storage totes when empty (e.g., no items included therein), designated as storage totes 1232 or product totes 1232 when containing eaches of goods (e.g., inventory), designated as order totes when containing eaches of goods for customer orders, or combinations thereof. In operation, the system 100 provides the designations and the designations assist the automated mobile robots 122 to identify which totes 1232 are to be utilized for which mode of operation. For example, if an automated mobile robot 122 is instructed to retrieve and empty tote 1232 as part of a mode of operation, the automated mobile robot 122 will know or be instructed to the location of a tote 1232 designated as an empty tote (s) 1232.

In accordance with an example embodiment of the present invention, the central controller can identify and track the locations of all the automated mobile robots 122, the totes 1232, the respective designations (e.g., modes or operation or tote designation) in the system and eaches within each sub-totes contained within each tote 1232. The identification of the locations for all of the automated mobile robots 122 and totes 1232 can further be utilized by the central controller when allocating automated mobile robots 122 to different modes of operations. In particular, the central controller can identify all of the automated mobile robots 122 that are located within a particular section and instruct those automated mobile robots 122 to perform a particular mode of operation within that section. The central controller attempts to level-load the automated mobile robots 122 to ensure all necessary store 300 operations are completed with the fewest number of automated mobile robots 122.

When the central controller wants to assign a mode of operation to one or more automated mobile robot(s) 122, the central controller will transmit a task demand to the one or more automated mobile robot(s) 122, instructing what tasks to carry out in accordance with a mode of operation. In particular, the task commands include instructions related to a destination and picking or placing a tote at the destination. Additionally, the task demand can include specifying one or more totes 1232 to utilize during the mode of operation and the origination/destination locations for the one or more totes 1232. As would be appreciated by one skilled in the art, although the present invention is discussed with respect to providing instructions, demands, etc. via the central controller, some or all of the control elements may be distributed throughout the system including logic stored within the automated mobile robots 122 themselves.

In accordance with an example embodiment of the present invention, the replenishment mode includes an automated mobile robot 122 propelling itself through the storage rack 1230, delivering a partially filled or empty tote 1232 to the decanting station, receiving a tote 1232 (e.g., a storage tote or product tote) with goods for replenishment, and/or transporting the replenished tote 1232 of goods to a storage location within the storage rack 1230. As would be appreciated by one skilled in the art, the totes 1232 are interchangeable and can be utilized within the modes of operation interchangeably, such that product totes can be utilized for replenishment, storage, and delivering product to workstations for order fulfillment. The particular tote designation relates to the function the tote is performing at the time, based at least in part on the contents of the tote. When operating in replenishment mode, the automated mobile robot 122 will receive multiple task demands related to where to traverse for receiving the tote 1232 of goods for replenishment, where to traverse to deposit the replenished tote 1232 of goods within the storage rack 1230. As would be appreciated by one skilled in the art, the task demands will repeat these steps for each new tote 1232 for replenishment.

Additionally, depending on how the goods are provided at the replenishment section 206, the automated mobile robots 122 may execute the same mode of operation in a different manner as influenced by different task demands. For example, the mobile robots 122 will be instructed to traverse different sections within the replenishment section 206/automated fulfillment section 204 when receiving goods originating from pallets of cases 1250 than when receiving goods originating from portable racks 1252 of totes 1232. FIG. 8C depicts how the initial location for receiving totes 1232 for replenishment will vary based on shipping methodology. In particular, when goods are received via pallets of cases 1250, the pallet of cases 1250 will be unloaded, either through an automated process or via a human operator, and transported to a decanting station 1254.

Figure 9:
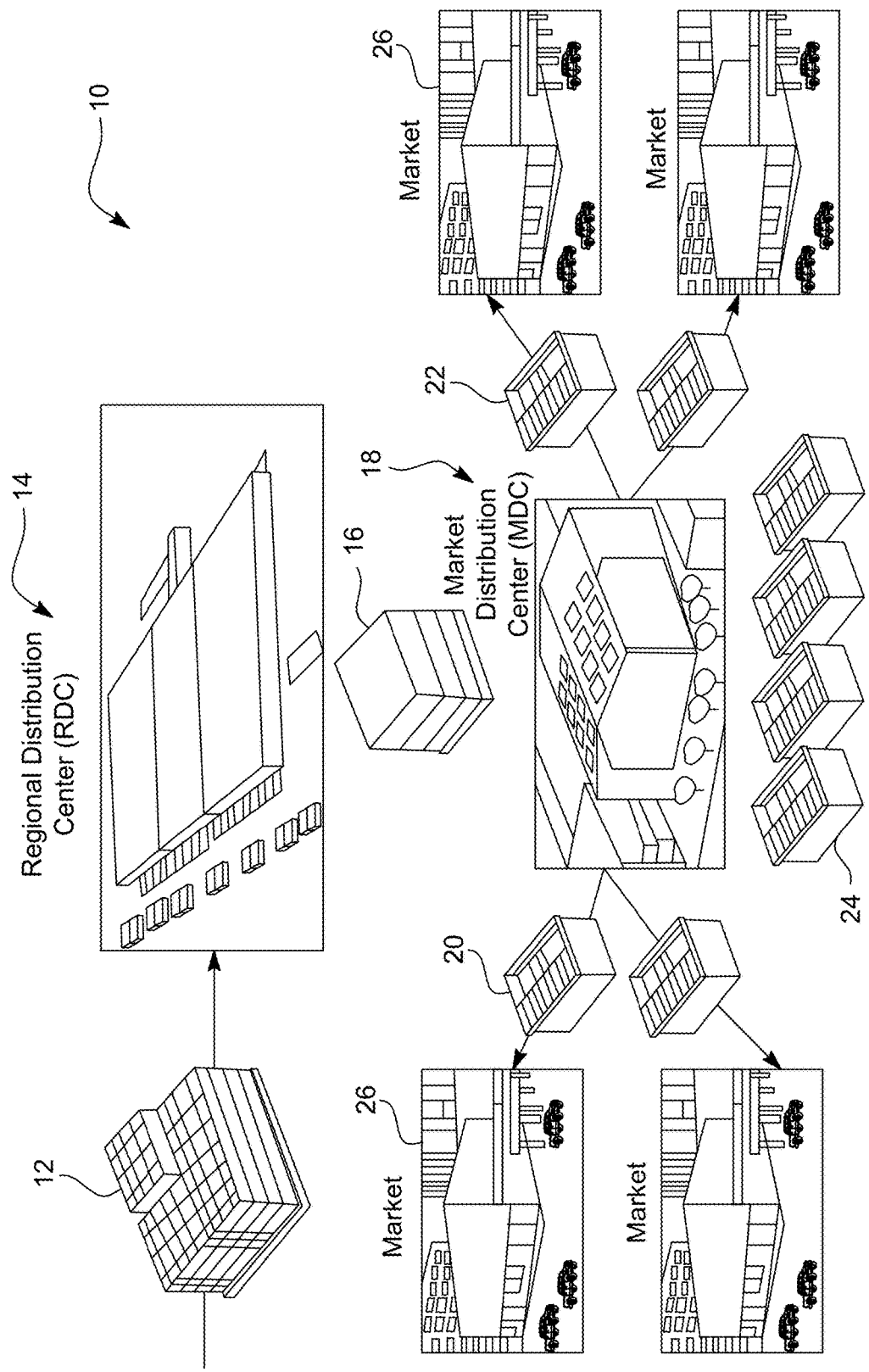

Referring to U.S. Patent Publication No. US2018/0247257, FIG. 9 shows an illustrative system 10 for implementing the steps in accordance with the aspects of the present technology. As seen in FIG. 9, palletized cases of goods 12 are received at one or more regional distribution center (RDC) 14 where the regional distribution center supplies palletized mixed cases of goods 16 to market distribution center (MDC) 18 where the market distribution center decants and stores like eaches in various sized subtotes 24 and supplies totes containing mixed each subtotes 20, 22 to market 26 as will be described in greater detail below. As an alternative, shipments may be made to stores or markets in Totes directly from the distribution center with no market distribution center or the function of the regional distribution center and market distribution centers may be combined. The market distribution center enables sufficient scale to afford automated decanting, as well as limits the cost of transporting eaches in totes and subtotes to a localized, for example metropolitan area. The more efficient shipping of eaches in densely pack cases on pallets can be maintained between the regional distribution center and the market distribution center. The market distribution center further offers the capability to store a large selection of goods that a customer may order to be delivered to their market on the next rapid replenishment delivery, that is not regularly stored at the market.

Figure 10A:
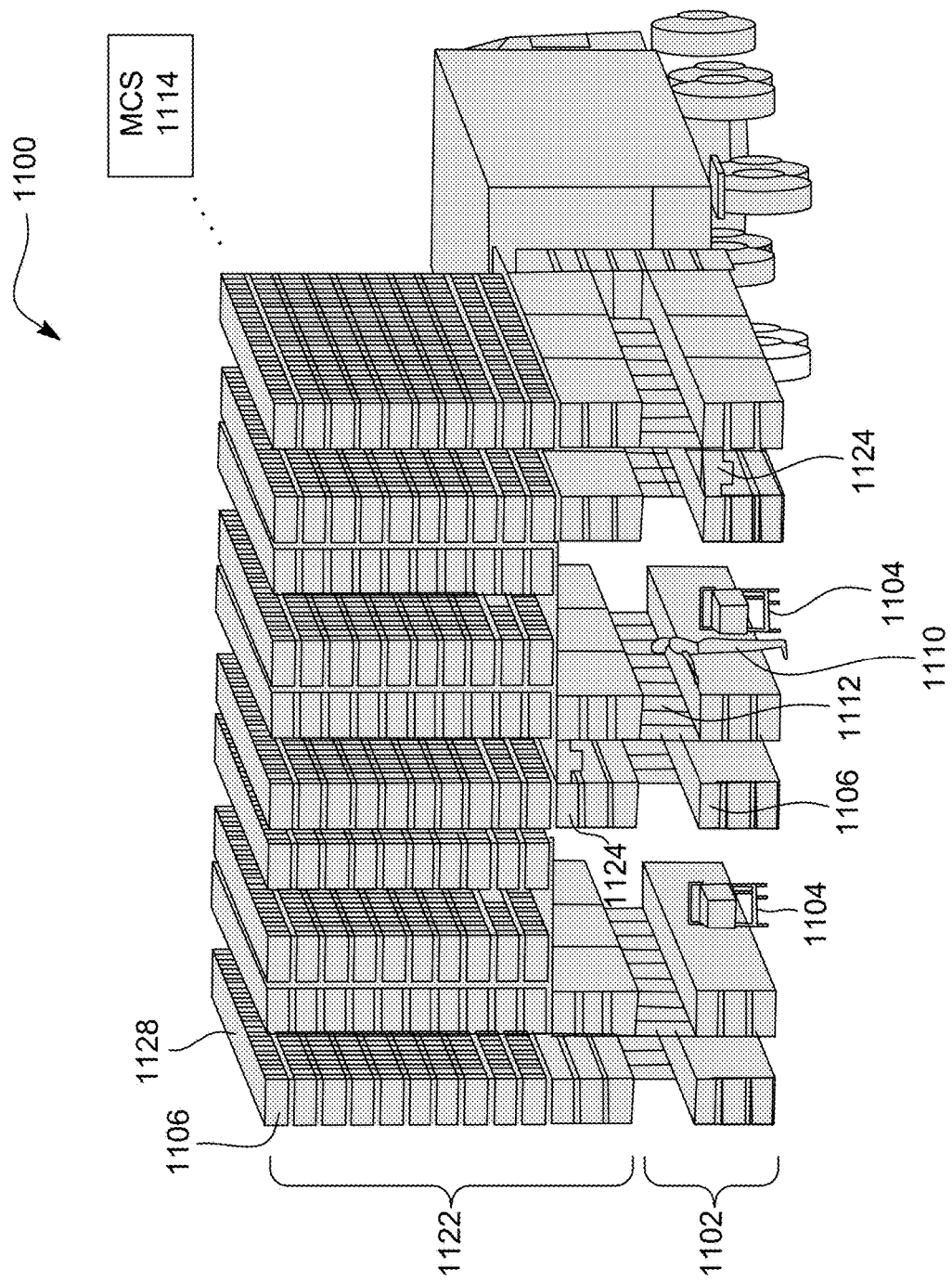
Figure 10B:
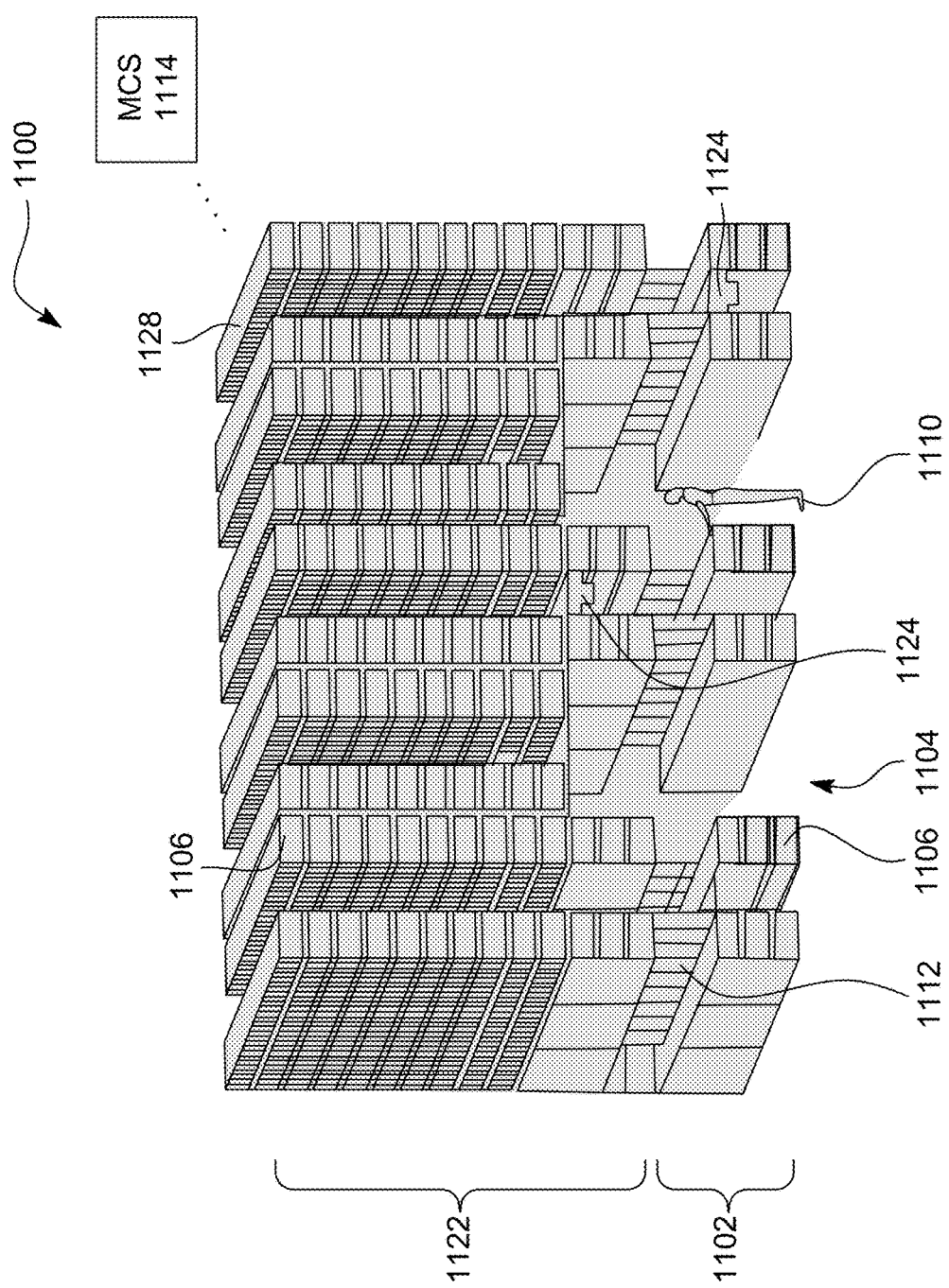

Referring to U.S. Patent Publication No. US2018/0341908, FIGS. 10A and 10B show a portion of an automated self-service retail store 1100. The store 1100 includes a shopper-accessible area 1102 including multiple aisles 1104 having totes 1106 from which a shopper 1110 can select eaches for placement in her shopping cart. The aisles 1104 may include flat panel monitors 1112 describing the eaches within a tote 1106. The flat panel monitors may be other input terminals, such as displays, or interactive touch-screens, providing the price and information about items in the totes beneath them.

The store 1100 may further include an item storage and replenishment area 1122 positioned above the shopper-accessible area 1102. The item storage and replenishment area 1122 stores totes 1106 in storage racks 1128 for replenishing totes 1106 in the shopper-accessible area 1102. The storage racks are in turn connected to rails along which the mobile robots 1124 travel. The totes 1106 are automatically delivered by mobile robots 1124 to the shopper-accessible area 1102, for example when a tote in shopper-accessible area 1102 is empty. At the same time, the item information above the tote is updated on the flat panel monitor. The robot 1124 may replenish an empty tote 1106 with the same or a different item. A central Material Control System (MCS) 1114 controls the mobile robots and also updates the information above the totes. The MCS 1114 may control when totes 1106 in the shopper-accessible area 1102 are replenished and with what. The MCS may also keep track of items removed from totes 1106 by a shopper 1110 as explained below.

FIGS. 10A and 10B show a single shopper-accessible area 1102 positioned beneath the item storage and replenishment area 1122. However, in further embodiments, the item storage and replenishment area 1122 may be below, or on the same level as the shopper-accessible area 1102. Additionally, in further embodiments, there may be multiple levels of shopper-accessible areas 1102, each replenished from totes stored in the item storage and replenishment area 1122.

FIGS. 10A and 10B show a system where inventory is maintained in totes 1106 at the shopper-accessible level 1102. However, in further embodiments, the shopper-accessible level 1102 may not store inventory. Instead, the shopper-accessible level may include stations, (shopper stations) and display screens 1112. In this embodiment, the shopper can select their desired items from the display screen, and totes containing those items are brought to the user by mobile robots 1124. Once a shopper picks their desired item from a tote 1106, the tote 1106 may be carried away by the mobile robot 1124, and additional totes brought to the shopper 1110 with their selected items. The shopper's selected items may be brought to the user in totes carried by several different robots, whose movements are coordinated by the MCS 1114.

Figure 11:
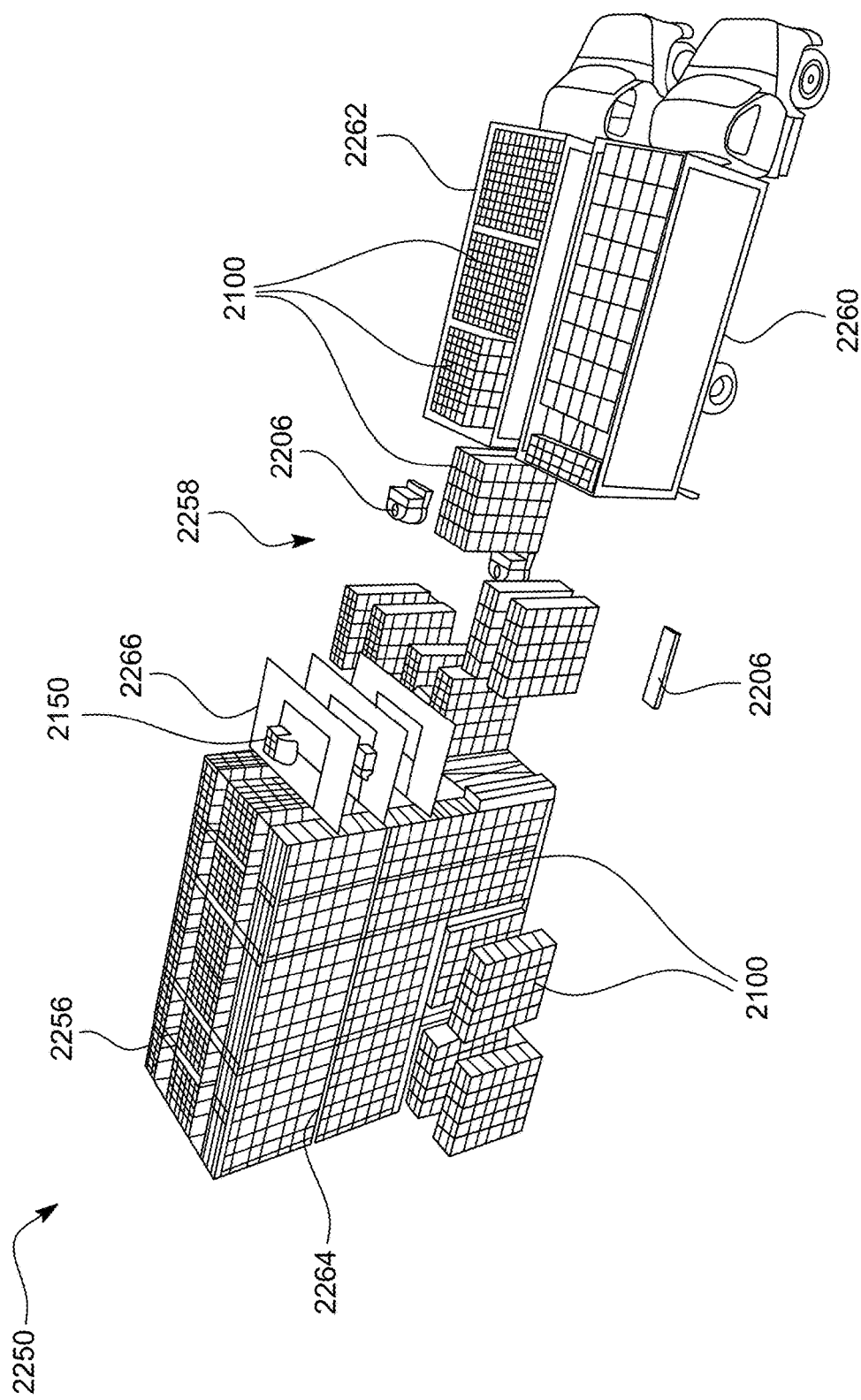

Referring to U.S. patent application Ser. No. 17/236,082 (claiming priority to U.S. Provisional Patent Application 63/013,504), FIG. 11 shows a top view of exemplary system 2250 that utilizes width wise insertion and extraction from a storage structure and both width wise and length wise insertion and extraction from shipping truck boxes. System 2250 has storage structure 2256, dock staging area 2258 and trucks 2260, 2262. Storage structure 2256 has racks 2264 that may have rails and verticals to allow Bots 2150 to traverse along the aisles on the support rails or from aisle to aisle vertically (level to level). Storage structure 2256 has transit decks 2266 that allow Bots to move horizontally from aisle to aisle. Collapsible rack 2100 is shown being removed from or inserted into rack structure 2264 widthwise. Alternately, collapsible rack 2100 may be made up of two racks or more racks where they are combined in a single collapsible rack with more than two tote supporting structures that collapse as shown. Collapsible rack 2100 is shown being removed from or inserted into truck 2260 widthwise and truck 2262 lengthwise. Alternately, a combination of lengthwise and widthwise racks may be provided in a collapsible, collapsed or open/un-collapsed configuration. An automated motorized robot (AMR) 2206 may be utilized to transport racks 2100 to and from the storage structure where automated motorized robot (AMR) 2206 may be an automated robot that acts autonomously. Alternately, automated motorized robot (AMR) 2206 may be a human operated power assisted transport drive, and automated guided vehicle, automated fork truck or other suitable drive adapted to transport racks 2100 from destination to destination. Alternately, racks 2100 may be manually transported where no automated motorized robot (AMR) 2206 would be provided. In the embodiment shown, racks 2100 are collapsed and inserted into truck 2260 widthwise and truck 22622 lengthwise. Alternately, racks 2100 may be partially collapsed, for example, where Bots 2150 are intended to be transported as shown. In the embodiment shown, racks 2100 may be shunted widthwise or moved linearly directly to/from the rack structure 2256 and then transported lengthwise as shown or widthwise from/to trucks 2262, 2260.

Figure 12:
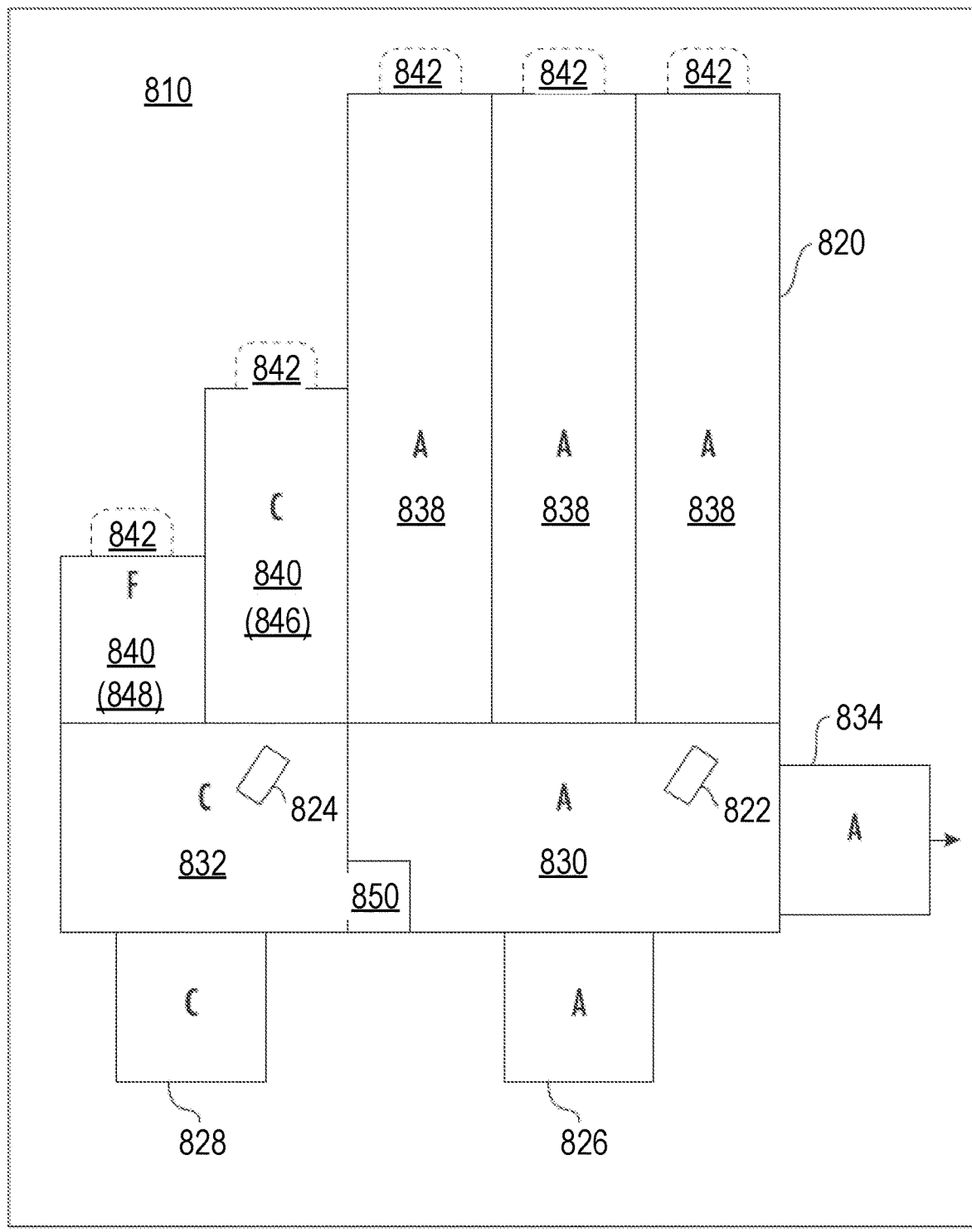

Referring to U.S. Patent Application No. U.S. Ser. No. 16/831,468, FIG. 12 shows a schematic plan view of order fulfillment system 810. Order fulfillment system 810 has multilevel tote storage and retrieval structure 820, ambient and chilled autonomous robotic vehicles or robots capable of working in ambient and chilled environments 822, 824 configured to pick, transport and place one or more tote within the order fulfillment system, ambient 826 and chilled 828 workstations configured to accommodate a picker (human, automated or otherwise) that transports one or more eaches from a tote, for example a product tote containing multiple common eaches to be picked, on one of the autonomous mobile robots to a put location, for example an order tote that has a combination of different eaches that reflects a full or partially fulfilled order, that may be on another of the autonomous mobile robots at the workstation, ambient and chilled transit decks 830, 832 configured to support, stage and buffer the autonomous robots 822, 824 between the storage and retrieval structure 820 and the workstations 826, 828, dispense station 834 where totes containing fulfilled orders are discharged from the order fulfillment apparatus and a decant or input interface (not shown) configured to replenish the apparatus. Here, the ambient static workstation(s) 826 may be co-located with ambient storage 838 and chilled static workstation 828 may be co-located with chilled storage 840. Further, ambient and/or chilled storage may occupy one or more full aisle. Tote storage and retrieval structure 820 may have ambient and chilled storage and retrieval structures 838, 840 that may be located adjacent as shown or otherwise placed, for example, the chilled storage may be located at an elevation below the ambient storage locations where frozen locations may be at a lowest level(s) in elevation and with chilled storage at the next level(s) in elevation and ambient at the next level(s) in elevation or otherwise. Alternately, the chilled and ambient storage may be arranged in any suitably appropriate way. Further, a rear mezzanine 842 may be provided for ambient and chilled storage and retrieval 838, 840 to allow a robot to be removed from the system to ambient, for example, bagged or isolated from chilled to ambient to prevent condensation on or within the robot. Alternately a hot box transition may be provided. Chilled tote storage and retrieval structure 840 may have chilled storage area 846 and frozen storage area 848 where chilled storage area and frozen storage area may be independently refrigerated and insulated, for example to 34 degrees F. and 0 degrees F. respectively. Alternately, chilled storage area 846 and frozen storage area 848 may be further segregated with different temperature levels or with temperature gradients sufficient to satisfy a broad range of chilled and frozen goods. Chilled transit deck 832 may be segregated and insulated from the ambient transit deck 830. Similarly, the interior of chilled workstation 828 may be isolated from the picker, who may be in an ambient environment picking and placing eaches from product totes to order totes in the chilled interior of the chilled workstation. Autonomous robots 822 may move freely between the chilled transit deck and ambient deck as will be described where the two are separated by insulated or and suitable door(s) or divider(s) that isolate the two areas as will be described.

The autonomous robotic vehicles or robots 822, 824 may be wholly or substantially identical and separated into specific robot types. To allow robots to place a tote near the next pick up tote location during peak periods, robots may be exposed to long durations in chilled storage or retrieval areas. As such, robots may to be segregated into A-Bots 822 and C-Bots 824 where A-Bots are Ambient Bots primarily located in ambient storage and retrieval areas and C-Bots are Chilled Bots primarily located in chilled storage and retrieval areas. An MCS (material control system) may be provided and manages A-Bot and C-Bot watermarks with soft dedications. By way of example, the MCS may be configured such that idle A-Bots may be stored in rear ambient towers of the storage and retrieval system or otherwise. Similarly, the MCS may be configured such that idle C-Bots may be stored in rear chilled towers of the storage and retrieval system or otherwise. In the embodiment shown, storage and retrieval system may accommodate three temperature zones; Ambient, Chilled, and Frozen as previously described. Similarly, totes may be identical or substantially similar but may be segregated into types, for example, to avoid condensation on products, totes may be segregated into Chilled totes and Ambient totes.

TABLE 1

A-Bot and C-Bot domains

| Bot Type | Static WS Decant | Storage | Deck | Dynamic WS | Static WS Dispense |
|---|---|---|---|---|---|
| A-Bot | Ambient | Ambient Chilled* Frozen* | Ambient Chilled* | Ambient | Ambient |
| C-Bot | Chilled | Chilled Frozen* | Chilled | Chilled | NA |

(*indicates dash moves)

As noted, robots may to be segregated into A-Bots 822 and C-Bots 824 where A-Bots are Ambient Bots primarily located in ambient storage and retrieval areas and C-Bots are Chilled Bots primarily located in chilled storage and retrieval areas where "primarily" denotes where the robot spends the majority but not all of the robotic vehicles time. By way of example, A-Bots 822 may dash into frozen and chilled storage zones to retrieve order-totes for dispense. Similarly, C-Bots 824 may dash into frozen for product-tote retrieval and storage. As a further option, C-Bots 824 may deliver o-totes near a zone transition point (pass-through interlock) to limit the duration an A-Bot is in a chilled or frozen zone. Bot temperature may be monitored for Bot Transitions Between Zones (*). Here, the MCS may track and manage bots based on feedback from internal and external temperature sensors and humidity sensors on the bot. For example, the MCS may calculate dew points (DP) from bot feedback in each temperature zone. In one aspect, bot sensors may indicate critical surfaces are above dewpoint. When dewpoint is neared, the MCS may direct the bot to exit back into ambient. Here, the MCS may manage the transitions, for example, with the following exemplary rules based on such configurable attributes as minimum entrance temperature delta for dash moves (ex: +10 C), move abort temperature offset for canceling dash moves (ex: +5 C), minimum exit temperature delta for bots to enter a warmer temperature zone (ex: +2 C above DP), allowable (minimum or maximum) dwell time(s) within given zone(s) as a function of bot type or otherwise any suitable configurable attribute(s).

Condensation mitigation may be required for the robots. For example, when going from ambient to chilled no special process may be needed. However when going from chilled to ambient there may be a need to mitigate condensation by heating the bot, for example in hot box 850. Here, hot box 850 may be a hot plate, external heaters in a "garage bay" or alternately exercising motors in a tower or otherwise. Similarly, Condensation mitigation may be required for the totes. For example, when transitioning between tote types ambient to chilled then no special process may be needed. However when transitioning between tote types chilled to ambient there may be a need to mitigate condensation by allowing the tote to heat up to or close to ambient temperature, for example, by letting the tote sit for a duration before allowing use.

Figure 13A:
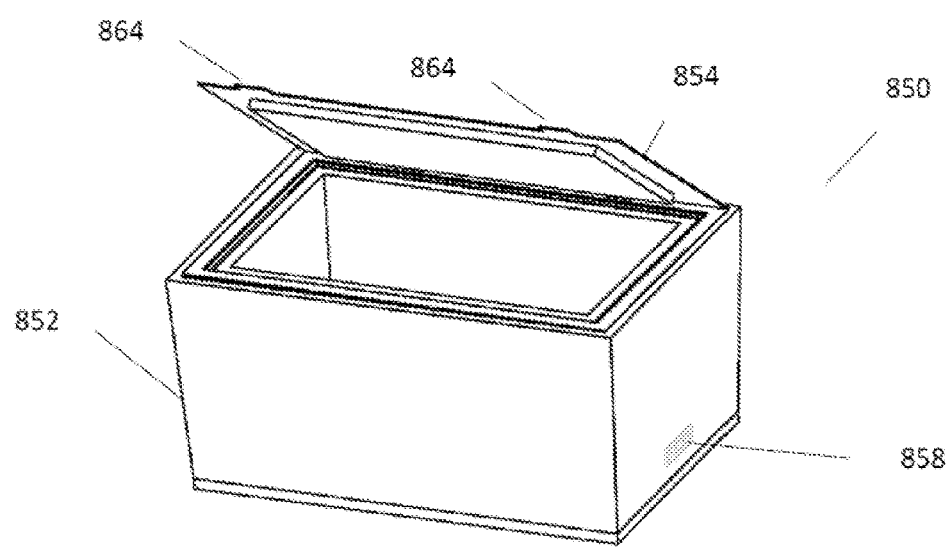
Figure 13B:
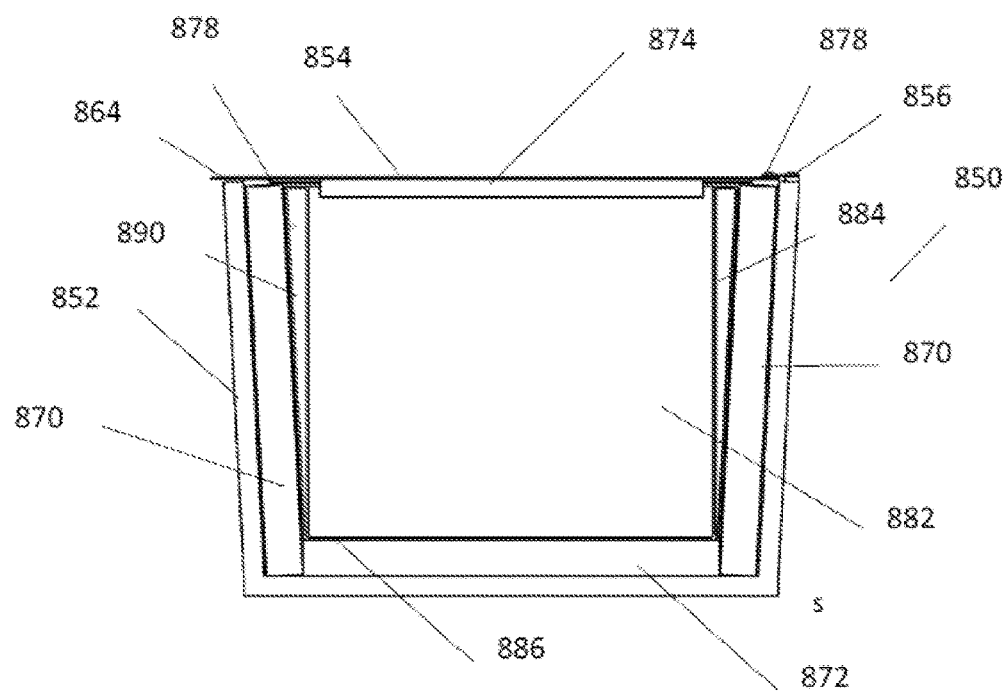
Figure 13C:
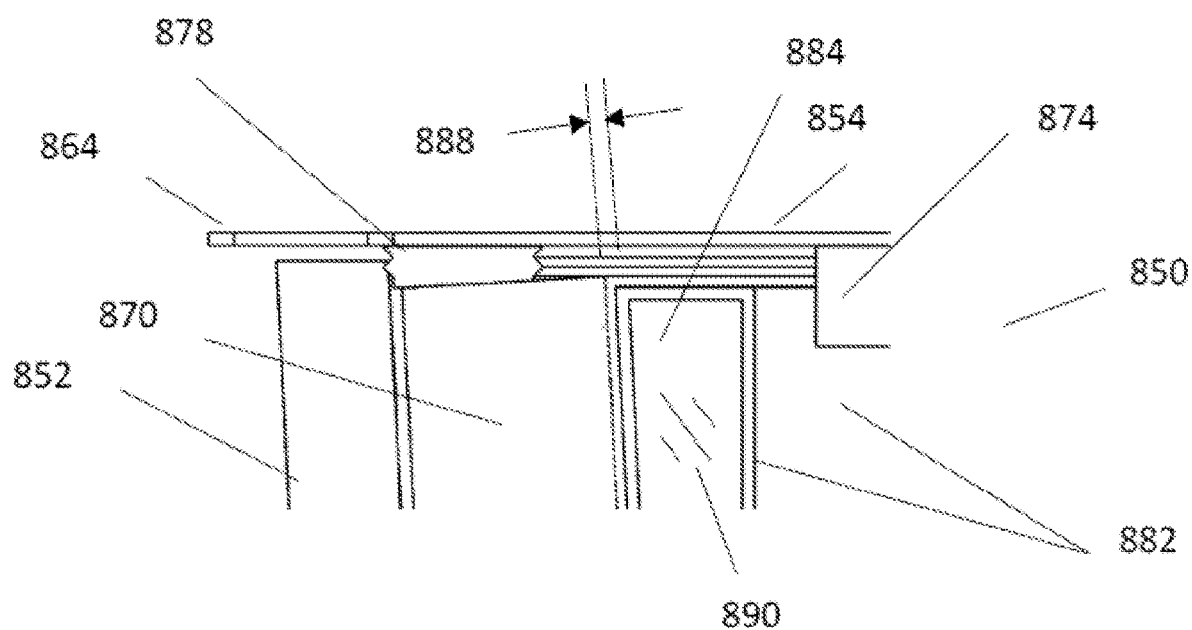

Referring still to U.S. patent application Ser. No. 16/831, 468, FIGS. 13A, 13B and 13C show views of tote 850. While the term "tote" is used herein, it is understood that the tote 850 may be any of various receptacles, canisters or other containers for transporting and storing goods, including goods to be transported and stored at different temperatures as explained below. Tote 850 has tote enclosure 852, tote lid 854 and insulated interior as will be described in greater detail. Lid 854 may be hinged with hinges 856 as shown with respect to enclosure 852. In alternate aspects, lid 854 may be hinged or have no hinge. Lid 854 and enclosure 852 may be insulated such that heat losses from ambient may be minimized and condensation on the exterior may be minimized as will be described in greater detail. The insulation may be conventional, by vacuum enclosure or otherwise. By way of example, the insulation may be provided as an insulated insert to insulate a conventional plastic tote and further accept a chilled or passive liner as will be described in greater detail. RFID temperature sensors 858 may be provided on the tote. In the embodiment shown, RFID sensors 858 are shown at opposing ends of tote 850 where a Bot with an RFID reader may read the RFID sensor for tote identification and/or for other purposes, for example, for reading temperature within or outside of tote 850 where RFID sensor 858 may be a passive temperature sensor enabled by the RFID reader on the Bot. Such a passive temperature sensor may sense temperature with a thermistor or other temperature sensor connected to circuitry and the RFID antenna. Such sensors are commercially available from RFID suppliers such as Metalcraft located in Mason City, IA. In alternate aspects, one or more passive RFID tags and/or sensors may be provided, for example, for temperature, identification, humidity, moisture detection or otherwise within or external to the tote assembly. Tabs 864 are provided as part of lid 854 for the purpose of opening the lid, either by a person or in an automated fashion as will be described in greater detail. Tabs 864 may be formed of the same material as lid 854 or may alternately be rollers that interact with a cam or other active or passive mechanism to open lid 854. Although two tabs 864 are shown, more or less may be provided.

FIG. 13B shows a cross section view of tote 850. FIG. 13C shows a partial cross section view of the upper left-hand corner of tote 850 as shown in FIG. 13B. Tote 850 further has insulating wall panels 870, insulating floor panel 872 and insulating lid panel 874. Insulating panels may also be provided on the two opposing ends of the tote 850 such that the contents within tote 850 are completely or substantially surrounded by insulating panels or insulation. Although panels 870, 872 are shown as separate panels, a unitary construction may be provided for insulation where separate panels need not be provided. Panels 870 are shown of a uniform thickness where in alternate embodiments the thickness may vary, for example from top to bottom. Although panels 870, 872 are shown the same thickness, panels 870, 872 may be of differing thicknesses. Similarly, panels 870, 872 and 874 may all be of differing thicknesses or the same thickness. Gasket 878 is shown bonded or fastened to the top portion of insulating panel 870 where gasket 878 substantially or completely seals the circumference of lid 854 to the insulated enclosure to prevent heat leakage when lid 854 is closed. Gasket 878 may be a refrigerator type or any suitable type of gasket made from EPDM, neoprene or other suitable material that seals against lid 854 by compression, magnetic attraction or otherwise. In the case of magnetic attraction, a metallic insert (not shown) may be provided with lid 854 that interfaces with seal or gasket 878. In alternate aspects, gasket 878 may be bonded or otherwise fastened to lid 854 and seal against panel 870. Tote 850 further comprises a thermal insert 882, also referred to herein as simply insert 882. Insert 882 has a cavity 884 within the insert 882. An insert 882 with cavity 884 is provided on and covers each of the panels 870 so that the inserts 882 and cavities 884 substantially surround an interior of the tote 850. Insert 882 is shown having floor 886 that protects panel 872 against damage, for example from eaches within the tote 850. A gap 888 (FIG. 13C) may be provided between the exterior surface(s) of insert 882 and the interior surfaces of insulating panel(s) 870, 872. This gap may be any suitable size and is provided to promote air circulation around the exterior and interior surfaces of insert 882 such that when the phase change material contained within insert 882 is regenerated, chilled air is exposed to the surfaces of insert 882 that surround the phase change material to minimize the amount of time it takes to regenerate the phase change material within insert 882. Insert 882 may be made from any suitable material, for example, aluminum, PVC or polypropylene. The cavity 884 in insert 882 may be filled with a suitable material 890 such as a phase change material to maintain a given set temperature point or range within tote 850. The phase change material may be tailored to have a phase transition temperature of 1 degree F. for a frozen storage temperature window of 0 to 5 degrees F. Similarly, the phase change material may be tailored to have a phase transition temperature of 35 degrees F. for a chilled storage temperature window of 34 to 40 degrees F. Alternately any suitable phase transition temperature and storage temperature window may be provided. In alternate aspects, insert 882 may not contain a phase change material and instead may be made in whole or in part of suitable material with sufficient thermal capacity to maintain temperature within tote 850. Insert 882 in combination with a suitable material 890 such as a phase change material has among others, features of note:

1. As the phase change material is positioned between the eaches and the insulation, thus exposing the eaches directly to the phase change material temperature, the phase transition temperature may be set equal to the setpoint temperature within the tote;
2. Provides a uniform media to maintain uniform temperature within tote 850;

3. Provides a large surface area to facilitate efficient regeneration of material 890;
4. Provides for a removeable liner or insert that is easily cleaned and disinfected; and
5. Protects the insulation, for example vacuum insulated panels 870 from damage by the contents within tote 850.

Regarding point 1 above, by putting the phase transition material at substantially all insulated panels, the eaches are only exposed to the phase transition temperature of the inserts on all such panels. Any gradient to the ambient is isolated external to the inserts (across the insulating panels). This enables the use of the phase transition temperature as the setpoint. Conventionally, heat which enters a tote across insulated panels does not hit the "phase transition" barrier, and thus the temperature of the eaches is exposed to these internal gradients. Although material 890 is shown surrounding the interior walls of tote 850, in alternate aspects material 890 may also surround or cover other areas of the interior, for example as will be described.

Referring to U.S. Patent Publication No. US2020/0039746, FIG. 14A shows a plan view of an automated decant workstation 910. FIG. 14B shows a side elevation view of automated decant workstation 910. There are two positions 912, 914 where pallets 916 of cases 918 to be decanted are positioned for processing. Only one pallet may be processed at a time, which allows an empty pallet to be replaced with a full pallet while the second pallet is being processed. Pallets supply layers of cases 918 to be processed by the workstation, one SKU at a time; cases of multiple layers can be combined for processing, for example if they are the same SKU, and loading of all of the eaches from a given SKU may be completed before any eaches from a different SKU are loaded.

Pallet Lift 920 may be provided to elevate the input pallet so that the top layer of cases can be transferred onto Case-Singulation Table 922 to be processed. The singulation table feeds cases in single-file onto two conveyors 924, 926, each of which feed cases into case stripping machine 928, 930 that removes the case packaging materials from each case. Once the packaging materials have been removed, the contained eaches can then be manipulated in groups and bulk-loaded into totes and subtotes. First, the eaches move onto Accumulation Table 932, which accumulates eaches 52 of the same SKU from multiple cases. At the opposite end of the accumulation table, sets of eaches are moved one at a time onto a Load-Staging table 934. There they are separated into subtote groupings by a Load Organizer using Divider/Manipulators 936 that mirror the configuration of subtote walls. Dividers 936 may include multiple dividers that are selectively movable and positionable from the sides of the accumulated eaches where some may be moveable vertically and horizontally on a gantry from above to selectably form any suitable pattern of dividers to match the walls of the tote and/or subtotes that the eaches are to be deposited or loaded into.

The inbound bots travel to tower 970 to descend to the lower level to deposit empty totes onto a tote handler 940. Directly under the load-staging table is the tote to be loaded 938, supported by the Tote Handler 940 and precisely aligned with the load of eaches, i.e. the subtotes 954 are positioned precisely below the subtote groupings of eaches. Tote handler 940 may be any suitable vertical indexer where position and velocity can be suitably controlled. Tote handler 940 may also positively grasp the tote in the event it needs to exceed >1 g or otherwise. Once the load of eaches is organized properly, the surface 942 of the staging table 934 abruptly disappears very rapidly (far faster than 1 g), while also retracting completely into an adjacent housing 944. Here staging table may be a single table or split as shown. Further staging table 934 may be simply laterally moved very quickly, moved rapidly at a downward angle, or alternately be lowered and then or simultaneously be laterally moved out of the way. Alternately staging table 934 may be hinged horizontally or vertically or otherwise moved out of the way of the dropping eaches. Alternately a multi piece iris may be used. In the event the staging table is moved vertically or otherwise, it may further be perforated to prevent suction from the rapid separation from the eaches. Staging table 934 may be moved by actuators including pneumatic, electric or any suitable actuation.

The tote-handler 940 brings the tote to a stop between and aligned with the Inbound 948 and Outbound 950 Tote Conveyors (for example, inbound and outbound mobile robots), with transfer mechanisms interfacing those conveyors with the tote handler. If the tote is to receive another layer of eaches in a second load, it would return to the receiving position just under the staging table, and the process would be repeated. Otherwise, the filled tote is transferred onto the outbound conveyor, and an empty tote is transferred onto the tote handler, which returns to the receive position to be loaded. Because the organization of a next load of eaches overlaps in time with the drop-loading of the previous set of eaches, the load cycle can be initiated as soon as the receiving tote 38' is in load position.

Figure 15:
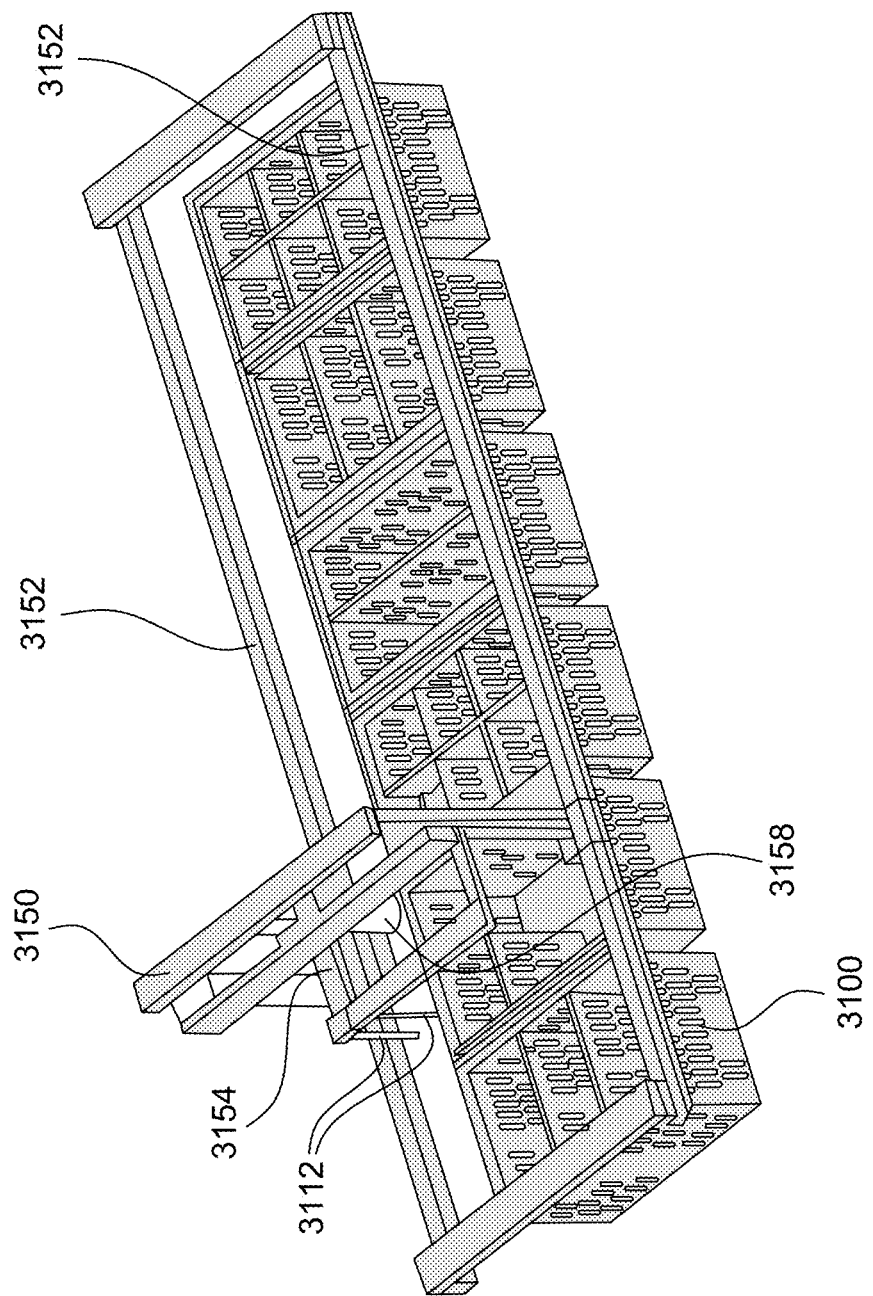

Regarding U.S. Patent Publication No. US2019/0047787, FIG. 15 illustrates a universal gripper 3110 mounted to a Cartesian robot 3150. The robot 3150 is driven along a pair of rails 3152 by a pair of motors 3154 on the robot 3150. For example, each rail 3152 may include toothed timing belt drives, driven by one through-shaft servo motor 3154. The through shaft is attached to the two parallel drives to ensure the two sides are driven uniformly.

The robot 3150 further includes a shaft 3158 which affixes within hub 3118 of the gripper 3110 to translate and/or rotate the gripper 3110. FIG. 15 is a perspective view of the robot 3150 and gripper 3110 transferring a sub-tote 3102 (such as sub-tote 3102a) from one tote to another tote. The Cartesian robot and gripper may be mounted within the storage racking to enable in-storage transfers of sub-totes between the full totes. This is used to defragment the storage; i.e. combine empty sub-totes together in full totes, and thereby increase storage density within the system.

FIG. 15 shows the gripper 3110 in a fully raised position. Depending on tine length, gripper does not need to be raised to full height position when not carrying a sub-tote. The figures also show a second one-sixth sub-tote 3102a in the position to be transferred. The second pair of gripper tines on the opposite side penetrate through the slots in the top exterior flanges of this opposite side sub-tot. However, the second pair of tines are not driven apart thereby allowing the second pair of tines to be lifted without lifting the opposite side sub-tote. If the one-sixth, or one-half sub-totes on opposite sides of the full tote are desired to be lifted together, then all tines are driven apart to position the lifting tabs underneath the top exterior flanges of both sub-totes.

The foregoing detailed description has been presented for purposes of illustration and description. It is not intended to be exhaustive or to limit the description to the precise form disclosed. Many modifications and variations are possible in light of the above teaching. The described embodiments were chosen in order to best explain the principles of the claimed system and its practical application to thereby enable others skilled in the art to best utilize the claimed system in various embodiments and with various modifications as are suited to the particular use contemplated. For example, all or any subset of products, not just picking all of NFPG products in the G2P system may be applied to picking in the G2P system.

What is claimed is:

1. A store for fulfilling orders of goods, the store comprising:
    a self-service area including shelves of goods configured to fulfill self-service orders by in-store shoppers; and
    an automated goods-to-person (G2P) system having a G2P area including storage areas for storing containers with goods and mobile robots to store and retrieve the containers with goods and one or more picking station to fulfill received orders of goods from containers with goods transported to the one or more picking station by the mobile robots; and
    an inventory management system comprising a computing system comprising a processor executing software instructions to implement a replenishment algorithm to determine replenishment of the self-service area and the automated G2P area, wherein the inventory management system is configured to:
        receive, for each of a plurality of cases received at the store having goods to replenish the automated G2P area, a velocity rate of sale for goods in each of the plurality of cases; and
        determine a replenishment plan based on at least the velocity rate of sale for the goods, wherein the replenishment plan comprises:
    goods having the velocity rate of sale below a first threshold are first replenished to the self-service area by the case and second replenished to the G2P area by eaches of the goods from the self-service area to the G2P area, wherein the eaches of the goods will be stored in containers of the G2P area, the containers transported by the mobile robots; and
    goods having the velocity rate of sale above a second threshold are replenished to the G2P area by the case, wherein cases of the goods are decanted into containers having eaches of the goods and stored in containers of the G2P area, the containers transported by the mobile robots.

2. The store of claim 1, wherein replenishment of the G2P area with goods from the self-service area enables containers to be filled to a higher density than replenishing the G2P area with goods from cases.

3. The store of claim 1, wherein the replenishing the goods having the velocity rate of sale below a first threshold from the self-service area to the G2P area enables the G2P area to efficiently operate with both high velocity goods and low velocity goods below the first threshold.

4. The store of claim 1, wherein the containers comprise one or more of a tote, and wherein the goods replenished to the G2P area from the self-service area are transferred in sub-totes taking up ⅓ to ⅙ of the tote.

5. The store of claim 1, wherein the replenishment algorithm is configured to define identities of the goods to be replenished, a shelf-position within the store where the goods are located, a desired number of each good to be picked from the shelf, and a size of the compartment into which the goods are to be placed.

6. The store of claim 5, further comprising a scanner for scanning identities of the goods as they are picked from the shelves of the self-service area for replenishing the G2P area, the number of each good picked from a shelf, and the compartment into which the goods are placed.

7. The store of claim 1, wherein the first threshold is the same as the second threshold.

8. The store of claim 1, wherein the goods are non-frozen packaged-goods.

9. A method of replenishing goods in a store, the store comprising:
    a self-service area including shelves of goods configured to self-service orders by in-store shoppers; and
    a.
    an automated goods-to-person (G2P) system having a G2P area including storage areas for storing containers with goods and mobile robots to store and retrieve the containers with goods and one or more picking station to fulfill received orders of goods from containers with goods transported to the one or more picking station by the mobile robots;
    the method comprising the steps of:
        receiving, at an inventory management system comprising a computing system comprising a processor executing software instructions to implement a replenishment algorithm, a velocity rate of sale for goods in each of a plurality of cases having goods to replenish the automated G2P area; and
        determining, by the inventory management system implementing the replenishment algorithm, a replenishment plan based on at least the velocity rate of sale for the goods, wherein the replenishment plan comprises:
            goods having the velocity rate of sale below a first threshold are first replenished to the self-service area by the case and second replenished to the G2P area by eaches of the goods from the self-service area to the G2P area, wherein the eaches of the goods will be stored in containers of the G2P area, the containers transported by the mobile robots; and
            goods having the velocity of rate of sale above a second threshold are replenished to the G2P area by the case, wherein cases of the goods are decanted into containers having eaches of the goods and stored in containers of the G2P area, the containers transported by the mobile robots.

10. The method of claim 9, wherein goods are depleted from the self-service area by replenishing the G2P area and by customers shopping in the self-service area.

11. The method of claim 9, wherein the replenishment plan enables the goods having the velocity rate of sale below the second threshold to be packed with a high density in the containers stored in the G2P area.

12. The method of claim 9, wherein the replenishment algorithm defines identities of the goods to be replenished, a shelf-position within the store where the goods are located, a desired number of each good to be picked from the shelf, and a size of the compartment into which the goods are to be placed.

13. The method of claim 9, wherein the replenishment algorithm is implemented at times when the self-service area is closed to customers.

14. The store of claim 1,
    wherein the storage areas of the G2P area comprise a static storage area and a transient storage area; and
    wherein the replenishment plan comprises:
        the goods having the velocity of rate of sale above the second threshold are replenished to the static storage area of the G2P area by the case;

goods having the velocity rate of sale below the first threshold are replenished from the self-service area to the static storage area of the G2P area;

goods suitable for storage in the G2P area allocated to non-same day orders that otherwise would have been picked from the self service area to make up same day orders are replenished from the self service area to the transient storage area of the G2P area; and goods for non-same day orders are picked from both the static and the transient storage areas of the G2P area and wherein goods for same day orders are picked from the static storage area of the G2P area and the self-service area.

15. The store of claim 14, wherein the replenishment plan further comprises:

goods for non-same day orders that do not fit into the containers of the G2P area are picked from the self-service area.

16. The store of claim 15, wherein the replenishment plan further comprises:

one or more fresh goods for non-same day orders that would otherwise fit into the containers of the G2P area are picked from the self-service area.

17. The store of claim 1, wherein the automated G2P system is configured to fulfill non-same day orders; and wherein the replenishment plan comprises:

goods for the non-same day orders are batch picked to order overnight from the self-service area and stored in the containers in the G2P area.

18. The store of claim 1 wherein the replenishment plan comprises:

batches of one or more of same-SKU goods are replenished from the self-service area to the G2P area in response to multiple orders; and the automated G2P system comprises a control system, wherein the control system is configured to instruct individual orders to be picked at the one or more picking stations from the batches of the one or more same SKU goods replenished from the self-service area.

* * * * *